United States Patent
Takasu et al.

(10) Patent No.: US 10,108,949 B2
(45) Date of Patent: *Oct. 23, 2018

(54) PRINTER COMMUNICATING WITH A COMPUTING DEVICE THAT HAS ACCESS TO A TARGET-DEVICE SCRIPT THAT INITIATES A CONTROL OBJECT TO CONTROL A TARGET DEVICE

(71) Applicant: Seiko Epson Corporation, Tokyo (JP)

(72) Inventors: Kazuhiro Takasu, Shiojiri (JP); Koichiro Tsutsumi, Matsumoto (JP); Shigeo Ikeda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/979,291

(22) Filed: Dec. 22, 2015

(65) Prior Publication Data

US 2016/0110139 A1   Apr. 21, 2016

Related U.S. Application Data

(63) Continuation of application No. 14/702,362, filed on May 1, 2015, now Pat. No. 9,274,730, which is a
(Continued)

(51) Int. Cl.
*G06F 3/12* (2006.01)
*G06Q 20/20* (2012.01)
(Continued)

(52) U.S. Cl.
CPC ......... *G06Q 20/209* (2013.01); *G06F 3/1204* (2013.01); *G06F 3/1205* (2013.01);
(Continued)

(58) Field of Classification Search
CPC .... G06F 3/1236; G06F 3/1209; G06F 3/1298; G06F 3/1286; G06F 3/1297;
(Continued)

(56) References Cited

U.S. PATENT DOCUMENTS 5,594,920 A   1/1997   Ebina et al.
5,707,162 A   1/1998   Kasai et al.
(Continued)

FOREIGN PATENT DOCUMENTS

CN   1574843 A   2/2005
EP   0991227 A2   4/2000
(Continued)

OTHER PUBLICATIONS

Software Incompatibility; Retrieved by the Examiner on Mar. 6, 2018 from https://en.wikipedia.org/w/index.php?title=Software_incompatibility&diff=429333928&oldid=348596605.*
(Continued)

*Primary Examiner* — Eric A Rust
(74) *Attorney, Agent, or Firm* — Foley & Lardner LLP

(57) ABSTRACT

A device control system has a terminal 3 with a web browser 31, and a printer 5 that controls a connected device. The terminal 3 calls an object that controls a device and is instantiated by the device API 33 to support the device, and sends a request to the printer 5, by the web application 32; and the printer 5 executes a device control script 502 that controls the device, receives requests sent through the device API 33, and controls the device.

3 Claims, 87 Drawing Sheets

Related U.S. Application Data continuation of application No. 14/140,268, filed on Dec. 24, 2013, now Pat. No. 9,052,853.

(60) Provisional application No. 61/748,232, filed on Jan. 2, 2013.

(51) Int. Cl.
*H04N 1/32* (2006.01)
*G06K 15/02* (2006.01)
*H04N 1/00* (2006.01)
*G07G 1/14* (2006.01)

(52) U.S. Cl.
CPC .......... *G06F 3/1207* (2013.01); *G06F 3/1209* (2013.01); *G06F 3/1236* (2013.01); *G06F 3/1246* (2013.01); *G06F 3/1253* (2013.01); *G06F 3/1279* (2013.01); *G06F 3/1284* (2013.01); *G06F 3/1286* (2013.01); *G06F 3/1291* (2013.01); *G06F 3/1292* (2013.01); *G06F 3/1294* (2013.01); *G06F 3/1297* (2013.01); *G06F 3/1298* (2013.01); *G06K 15/02* (2013.01); *G06Q 20/202* (2013.01); *G06Q 20/208* (2013.01); *G07G 1/14* (2013.01); *H04N 1/00334* (2013.01); *H04N 1/32* (2013.01)

(58) Field of Classification Search
CPC ..... G06F 3/1291; G06F 3/1284; G06K 15/02; G06Q 20/202; H04N 1/32
USPC .......................... 358/1.13, 1.15; 705/16, 21
See application file for complete search history.

(56) References Cited

U.S. PATENT DOCUMENTS

| | | | |
|---|---|---|---|
| 5,752,880 A | 5/1998 | Gabai et al. | |
| 5,794,214 A | 8/1998 | Ebina et al. | |
| 5,927,878 A | 7/1999 | Kasai et al. | |
| 6,022,273 A | 2/2000 | Gabai et al. | |
| 6,075,195 A | 6/2000 | Gabai et al. | |
| 6,128,415 A * | 10/2000 | Hultgren, III | G06T 1/00 345/600 |
| 6,289,371 B1 | 9/2001 | Kumpf et al. | |
| 6,368,177 B1 | 4/2002 | Gabai et al. | |
| 6,519,048 B1 | 2/2003 | Tanaka | |
| 7,369,257 B2 | 5/2008 | Enomoto et al. | |
| 2001/0021669 A1 | 9/2001 | Gabai et al. | |
| 2001/0031652 A1 | 10/2001 | Gabai et al. | |
| 2002/0097408 A1 | 7/2002 | Chang et al. | |
| 2004/0105126 A1 | 6/2004 | Minowa et al. | |
| 2004/0266479 A1 | 12/2004 | Oak | |
| 2005/0046887 A1 | 3/2005 | Shibata et al. | |
| 2006/0164550 A1 | 7/2006 | Yoshimoto et al. | |
| 2006/0279773 A1 | 12/2006 | Sakurai et al. | |
| 2007/0058194 A1 | 3/2007 | Itoh et al. | |
| 2007/0198999 A1 | 8/2007 | Ohhashi | |
| 2007/0276763 A1 | 11/2007 | Kleinman et al. | |
| 2008/0010389 A1 * | 1/2008 | Iwata | G06F 13/385 710/29 |
| 2008/0218777 A1 * | 9/2008 | Matsuzawa | H04N 1/6033 358/1.9 |
| 2009/0188972 A1 * | 7/2009 | Koakutsu | G06Q 10/0832 235/375 |
| 2010/0027065 A1 | 2/2010 | Koakutsu | |
| 2010/0085601 A1 | 4/2010 | Urakawa | |
| 2010/0100606 A1 | 4/2010 | Nakamura et al. | |
| 2010/0153225 A1 * | 6/2010 | Ferro | B42D 15/0053 705/24 |
| 2010/0177343 A1 | 7/2010 | Shapiro et al. | |
| 2011/0194123 A1 | 8/2011 | Sweet et al. | |
| 2011/0292447 A1 | 12/2011 | Oak | |
| 2013/0332520 A1 | 12/2013 | Nakamura et al. | |
| 2014/0058869 A1 | 2/2014 | Argue et al. | |

FOREIGN PATENT DOCUMENTS

| | | |
|---|---|---|
| EP | 2631808 A1 | 8/2013 |
| JP | 2000-500376 | 1/2000 |
| JP | 2004-152256 | 5/2004 |
| JP | 2006-135982 | 5/2006 |
| JP | 2007-188468 | 7/2007 |
| JP | 2007-328558 | 12/2007 |
| JP | 2010-134906 | 6/2010 |
| JP | 2011-124914 | 6/2011 |
| JP | 2012-173910 | 9/2012 |
| KR | 10-0172460 B1 | 3/1999 |

OTHER PUBLICATIONS

NPL—The Transport Layer Security (TLS) Protocol Version 1.2, Aug. 2008.

Office Action dated Oct. 19, 2017 in related U.S. Appl. No. 15/269,172 (20 pgs.)

* cited by examiner

List of KeyCode

| Constant | Code | Constant | Code | Constant | Code |
|---|---|---|---|---|---|
| VK_BACK | 0x08 | VK_8 | 0x38 | VK_MULTIPLY | 0x6A |
| VK_TAB0 | x09 | VK_9 | 0x39 | VK_ADD | 0x6B |
| VK_RETURN | 0x0 | DVK_A | 0x41 | VK_SUBTRACT | 0x6D |
| VK_SHIFT | 0x10 | VK_B | 0x42 | VK_F1 | 0x70 |
| VK_CONTROL | 0x11 | VK_C | 0x43 | VK_F2 | 0x71 |
| VK_MENU | 0x12 | VK_D | 0x44 | VK_F3 | 0x72 |
| VK_ESCAPE | 0x1B | VK_E | 0x45 | VK_F4 | 0x73 |
| VK_CONVERT | 0x1C | VK_F | 0x46 | VK_F5 | 0x74 |
| VK_NONCONVERT | 0x1D | VK_G | 0x47 | VK_F6 | 0x75 |
| VK_SPACE | 0x20 | VK_H | 0x48 | VK_F7 | 0x76 |
| VK_PRIOR | 0x21 | VK_I | 0x49 | VK_F8 | 0x77 |
| VK_NEXT | 0x22 | VK_J | 0x4A | VK_F9 | 0x78 |
| VK_END | 0x23 | VK_K | 0x4B | VK_F1 | 00x79 |
| VK_HOME | 0x24 | VK_L | 0x4C | VK_F1 | 10x7A |
| VK_LEFT | 0x25 | VK_M | 0x4D | VK_F1 | 20x7B |
| VK_UP | 0x26 | VK_N | 0x4E | VK_OEM_1 | 0xBA |
| VK_RIGHT | 0x27 | VK_O | 0x4F | VK_OEM_PLUS | 0xBB |
| VK_DOWN | 0x28 | VK_P | 0x50 | VK_OEM_COMMA | 0xBC |
| VK_INSERT | 0x2D | VK_Q | 0x51 | VK_OEM_MINUS | 0xBD |
| VK_DELETE | 0x2E | VK_R | 0x52 | VK_OEM_PERIOD | 0xBE |
| VK_0 | 0x30 | VK_S | 0x53 | VK_OEM_2 | 0xBF |
| VK_1 | 0x31 | VK_T | 0x54 | VK_OEM_3 | 0xC0 |
| VK_2 | 0x32 | VK_U | 0x55 | VK_OEM_4 | 0xDB |
| VK_3 | 0x33 | VK_V | 0x56 | VK_OEM_5 | 0xDC |
| VK_4 | 0x34 | VK_W | 0x57 | VK_OEM_6 | 0xDD |
| VK_5 | 0x35 | VK_X | 0x58 | VK_OEM_7 | 0xDE |
| VK_6 | 0x36 | VK_Y | 0x59 | VK_OEM_ATTN | 0xF0 |
| VK_7 | 0x37 | VK_Z | 0x5A | | |

FIG. 9

1. Network Settings

Configure the system and printer 5 network settings.

For the printer 5 network settings, use the same procedure for Windows network settings.

2. Registration of Web Content

Register Web content to printer 5 from a Web browser.

3. Connection of Device to printer 5

Connect a device to printer 5. For the devices that can be connected, refer to Operating Environment.

(Though printer 5 has only one port for serial communication device, USB connection is available with a serial-USB conversion cable and driver.)

4. Registration of Device Control Script

To enable control a non-Epson device from printer 5, register the device control script prepared by the user. Make registration using a Web browser.

5. Registration of Device

Register the device to be connected into printer 5. Make registration using a Web browser.

Necessary step

Optional step

FIG. 10

[1]:http://[IP address of printer 5]/epsonsample.html
[2]:http://[IP address of printer 5]/webpage/epsonsample.html
[1]: 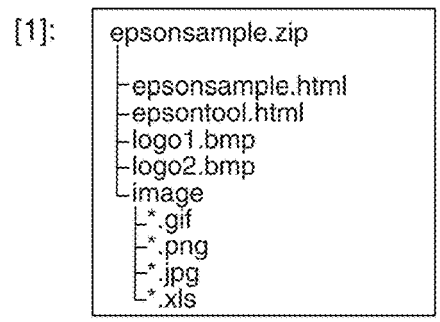
[2]: 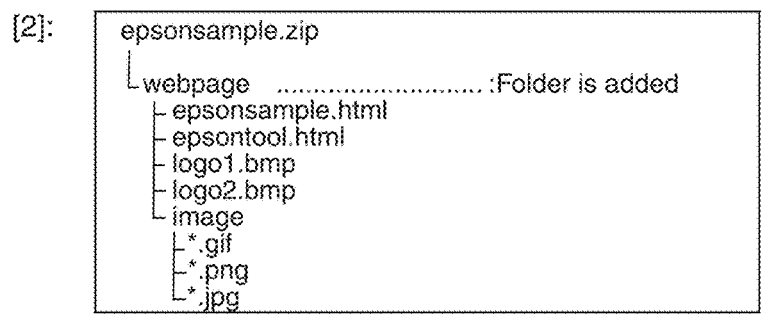
FIG. 11

FIG. 14

| Item | Description |
|---|---|
| Printer | Used to set a TM printer to be controlled by printer 5. |
| Display | Used to set a customer display to be controlled by printer 5. |
| Key input device | Used to set a key input device to be controlled by printer 5. |
| Serial communications | Used to set a serial communication device to be controlled by printer 5. |
| Other | Used to set other device to be controlled by printer 5. |

FIG. 15

| Item | Description |
|---|---|
| Device ID | Enter the ID (any character string) of the printer to be controlled. |
| Type | Select "Network printer". |
| Model no. | Select the model of the printer to be controlled. |
| IP Address | Specify the IP address of the printer for each device ID. |
| Retry interval | Specify the retry interval after timeout. |

FIG. 16

| Item | Description |
|---|---|
| Communications settings | Set the communication speed, data bit and parity. |
| Brightness settings | Set the brightness of the customer display. |

FIG. 17

| Item | Description |
|---|---|
| Device ID | Enter the device ID (any character string). |
| Device name | Select the device name of the key input device. |
| Control Script | Select the device control script to be used for the key input device. |

FIG. 18

| Item | Description |
| --- | --- |
| Device ID | Enter the device ID (any character string). |
| Device name | Select the device name of the serial communication device. The name can be selected from the product names and ports. |
| Control script | Select the device control script to be used for the serial communication device. |
| Communication speed(bps) | Set the communication speed of the device. |
| Data bit | Set the data bit. |
| Parity | Set the parity. |
| Stop bit | Set the stop bit. |
| Flow control | Set the flow control. |

FIG. 19

| Item | Description |
| --- | --- |
| Device ID | Enter the device ID (any character string). |
| Control script | Select the device control script to be used for the connected device. |

FIG. 20

| Element | | API | Description |
|---|---|---|---|
| Constructor | | | |
| | Initialization | ePOSDevice | Initializes an ePOSDevice object. |
| Method | | | |
| | Communication Path | connect | Establishes a communication path. |
| | | disconnect | Disconnects a communication path. |
| | | isConnected | Obtains communication path status. |
| | Device | createDevice | Obtains a device object. |
| | | deleteDevice | Deletes a device object. |
| | Administration Information | getAdmin | Obtains the administrator information. |
| | | getLocation | Obtains the installation location information. |
| Event | | | |
| | Disconnection | ondisconnect | Network disconnection event |
| Constant | | | |
| | | DEVICE_TYPE_* | Value to specify the device type. Used for the createDevice parameter. |

FIG. 22

| Element | | API | Description |
|---|---|---|---|
| Method | | | |
| | Event Call | callEvent | Calls any event on the device control script according to the device object. (SimpleSerial object is not supported.) |

FIG. 23

| Element | | API | Description |
|---|---|---|---|
| Method | | | |
| | Initialization | reset | Reset |
| | Window | createWindow | Define the display area. |
| | | destroyWindow | Destroys the display area. |
| | | setCurrentWindow | Switches the display area. |
| | | clearWindow | Clears the current display area. |
| | Cursor | setCursorPosition | Moves the cursor position. |
| | | moveCursorPosition | Moves the cursor position in the current display area. |
| | | setCursorType | Changes the cursor display. |
| | Text Display | addText | Displays text. |
| | | addReverseText | Displays reversed text. |
| | | addMarquee | Displays marquee. |
| | Display Attribute | setBlink | Display blinking |
| | | setBrightness | Changes the display brightness. |
| | Clock | showClock | Displays the clock. |
| | Send Command | addCommand | Executes a command. |
| | Send | send | Sends a control instruction. |
| Event | | | |
| | Receive Result | onreceive | Control result receipt event |
| Constant | | | |
| | SCROLL_* | | Specifies the window scroll mode. |
| | MOVE_* | | Specifies the cursor destination. |
| | CURSOR_* | | How to display the cursor |
| | BRIGHTNESS_* | | Display brightness |
| | MARQUEE_* | | How to display marquee |

FIG. 24

| Element | | API | Description |
|---|---|---|---|
| Method | | | |
| | String settings | setPrefix | Specifies the conditions for handling input as a series of strings |
| Event | | | |
| | Detect Key | onkeypress | Key press detection event |
| | Detect String | onstring | String detection event |

FIG. 25

| Element | | API | Description |
|---|---|---|---|
| Method | | | |
| | Text | addTextAlign | Adds the text alignment settings to the command buffer. |
| | | addTextLineSpace | Adds the line feed space settings to the command buffer. |
| | | addTextRotate | Adds the text rotation print settings to the command buffer. |
| | | addText | Adds text printing to the command buffer. |
| | | addTextLang | Adds the target language settings to the command buffer. |
| | | addTextFont | Adds the text font settings to the command buffer. |
| | | addTextSmooth | Adds the text smoothing settings to the command buffer. |
| | | addTextDouble | Adds the double-sized text settings to the command buffer. |
| | | addTextSize | Adds the text scale settings to the command buffer. |
| | | addTextStyle | Adds the text style settings to the command buffer. |
| | | addTextPosition | Adds the print position settings to the command buffer. |
| | Paper Feed | addFeedUnit | Adds paper feeding (in dots) to the command buffer. |
| | | addFeedLine | Adds paper feeding (in lines) to the command buffer. |
| | Graphic | addImage | Adds raster image printing to the command buffer. |
| | | addLogo | Adds NV logo printing to the command buffer. |
| | Barcode | addBarcode | Adds barcode printing to the command buffer. |
| | | addSymbol | Adds two-dimensional symbol printing to the command buffer. |

FIG. 26A

| Element | | API | Description |
|---|---|---|---|
| Method | | | |
| | Ruled Line | addHLine | Adds horizontal line printing to the command buffer. |
| | | addVLineBegin | Adds vertical line start to the command buffer. |
| | | addVLineEnd | Adds vertical line end to the command buffer. |
| | Page Mode | addPageBegin | Adds page mode start to the command buffer. |
| | | addPageEnd | Adds page mode end to the command buffer. |
| | | addPageArea | Adds the print area settings in the page mode to the command buffer. |
| | | addPageDirection | Adds the print direction settings in the page mode to the command buffer. |
| | | addPagePosition | Adds the print position settings in the page mode to the command buffer. |
| | | addPageLine | Adds drawing a line in the page mode to the command buffer. |
| | | addPageRectangle | Adds drawing a rectangle in the page mode to the command buffer. |
| | Cut | addCut | Adds paper cut to the command buffer. |
| | Drawer | addPulse | Adds drawer kick-out to the command buffer. |
| | Buzzer | addSound | Adds turning on the buzzer to the command buffer. |
| | Send Command | addCommand | Adds a command to the command buffer. |
| | Send | send | Sends a print document. |
| | | print | Prints HTML5 Canvas. |
| | Status Monitoring | startMonitor | Enables a status event. |
| | | stopMonitor | Disables a status event. |
| Property | | | |
| | Image | halftone | Raster image halftone processing method |
| | | brightness | Raster image brightness correction value |
| | Timeout | timeout | Sending timeout time |
| | Monitoring Interval | interval | Printer status update interval |

FIG. 26B

| Element | | API | Description |
|---|---|---|---|
| Event | | | |
| | Receive Result | onreceive | Response document receipt event |
| | | onerror | Communication error event |
| | | onstatuschange | Status change event |
| | | ononlineOnline event | Online event |
| | | onoffline | Offline event |
| | | onpoweroff | Non-response event |
| | | oncoverok | Cover close event |
| | | oncoveropen | Cover open event |
| | | onpaperok | Paper remaining event |
| | | onpaperend | Paper end event |
| | | onpapernearend | Paper near end event |
| | | ondrawerclosed | Drawer close event |
| | | ondraweropen | Drawer open event |
| Constant | | | |
| | | FONT_* | Font |
| | | ALIGN_* | Alignment |
| | | COLOR_* | Color specification |
| | | HALFTONE_* | Halftone type |
| | | MODE_* | Color mode |
| | | BARCODE_* | Bar code type |
| | | HRI_* | HRI position |
| | | SYMBOL_* | two-dimensional symbol type |
| | | LEVEL_* | Error correction level |
| | | LINE_* | Line style |
| | | DIRECTION_* | Page mode print direction |
| | | CUT_* | Paper cut type |
| | | DRAWER_* | Drawer kick-out connector |
| | | PLUSE_* | Drawer kick-out pulse length |
| | | PATTERN_* | Buzzer sound pattern |
| | | ASB_* | Response document status |

FIG. 26C

| Element | | API | Description |
|---|---|---|---|
| Event | | | |
| | Detect Data | ondata | Barcode data detection event |

FIG. 27

| Element | | API | Description |
|---|---|---|---|
| Method | | | |
| | String settings | sendCommand | Sends a command. |
| Event | | | |
| | Detect Response | oncommandreply | Command sending result notification event |

FIG. 28

| String | Description |
|---|---|
| "OK" | Connected successfully. |
| "ERROR_TIMEOUT" | A timeout occurred. |
| "ERROR_PARAMETER" | Parameter error |

FIG. 29

| Return value | Description |
|---|---|
| true | Connected |
| false | Not connected |

FIG. 30

| String | Description |
|---|---|
| DEVICE_TYPE_DISPLAY | Specifies the display for the device type. |
| DEVICE_TYPE_KEYBOARD | Specifies the keyboard for the device type. |
| DEVICE_TYPE_PRINTER | Specifies the printer for the device type. |
| DEVICE_TYPE_SCANNER | Specifies the scanner for the device type. |
| DEVICE_TYPE_SIMPLE_SERIAL | Specifies the serial communication device for the device type. |

FIG. 31

| String | Description |
|---|---|
| "OK" | Obtained the device object successfully. |
| "DEVICE_NOT_FOUND" | Device is not found. |
| "DEVICE_IN_USE" | Device is in use. |
| "DEVICE_OPEN_ERROR" | Failed to open the device. |
| "DEVICE_CATEGORY_INVALID" | Invalid device type. |
| "SYSTEM_ERROR" | Other error occurred. |

FIG. 32

| String | Description |
|---|---|
| "OK" | Device close succeeded. |
| "DEVICE_NOT_OPEN" | Device not open. |
| "DEVICE_CLOSE_ERROR" | Failed to close the device. |
| "SYSTEM_ERROR" | Other error occurred. |

FIG. 33

| Set value | Description |
|---|---|
| SCROLL_OVERWRITE | When characters are displayed while the display position is at the upper right end, the display position moves to the lower left end. When characters are displayed while the display position is at the lower right end, the position moves to the upper left end. |
| SCROLL_VERTICAL | When characters are displayed while the display position is at the upper right end, the display position moves to the lower left end. When characters are displayed while the display position is at the lower right end, the characters already displayed in the lower row are scrolled to the upper row and the lower row is cleared. |
| SCROLL_HORIZONTAL | When characters are displayed while the display position is at the right end, all the characters already displayed in the row where the cursor exists are scrolled one character to the left and a new character is displayed at the right end. |

FIG. 34

| Set value | Description |
| --- | --- |
| MOVE_TOP_LEFT | Sets the destination at the top left. |
| MOVE_TOP_RIGHT | Sets the destination at the top right. |
| MOVE_BOTTOM_LEFT | Sets the destination at the bottom left. |
| MOVE_BOTTOM_RIGHT | Sets the destination at the bottom right. |

FIG. 35

| Set value | Description |
| --- | --- |
| CURSOR_NONE | No cursor display |
| CURSOR_UNDERLINE | Underline |

FIG. 36

| Set value | Description |
| --- | --- |
| "en"(???) | Specifies English for the display language. |
| "ja" | Specifies Japanese for the display language. |

FIG. 37

| Set value | Description |
| --- | --- |
| "en"(Default) | Specifies English for the display language. |
| "ja" | Specifies Japanese for the display language. |

FIG. 38

| Set value | Description |
| --- | --- |
| MARQUEE_WALK | Displays the string from the right end of the window. |
| MARQUEE_PLACE | Displays the string from the left end of the window. |

FIG. 39

| Set value | Description |
| --- | --- |
| "en"(Default) | Specifies English for the display language. |
| "ja" | Specifies Japanese for the display language. |

FIG. 40

| Set value | Description |
| --- | --- |
| BRIGHTNESS_20 | Set the display brightness to "20%". |
| BRIGHTNESS_40 | Set the display brightness to "40%". |
| BRIGHTNESS_60 | Set the display brightness to "60%". |
| BRIGHTNESS_100 | Set the display brightness to "100%". |

FIG. 41

| Property | Name | Object type |
|---|---|---|
| success | Command execution result | Boolean |
| code | Error code string | String |

FIG. 42A

| Set value | Description |
|---|---|
| ture/1 | Process succeeded. |
| false/0 | Process failed. |

FIG. 42B

| Set value | Description |
|---|---|
| "EDSP_NOT_FOUND" | Device is not found. |
| "EDSP_NOT_OPEN" | Failed to open the device. |
| "EDSP_INVALID_WINDOW" | The specified window is not registered. |
| "EX_BADPORT" | An internal communication error with the device occurred. |
| "EX_TIMEOUT" | A timeout error occurred in communication with the device. |
| "EX_INVALID_VALUE" | An invalid parameter is detected. |

FIG. 42C

| Property | Description |
| --- | --- |
| keycode | Keycode |
| ascii | Character corresponding to the keycode. "undefined" is applied when no characters corresponding to the keycode (F1 key, for example) exist. |

FIG. 43

| Property | Description |
| --- | --- |
| input | Detected string |
| prefix | Keycode identified as the beginning of a string |

FIG. 44

| Constant(align) | Description |
|---|---|
| ALIGN_LEFT (default) | Alignment to the left |
| ALIGN_CENTER | Alignment to the center |
| ALIGN_RIGHT | Alignment to the right |

FIG. 45A

| Return value | Object type |
|---|---|
| Printer Object | Printer |

FIG. 45B

| Exception | Object type |
|---|---|
| Parameter " ... " is invalid | Error |

FIG. 45C

| Return value | Object type |
|---|---|
| Printer Object | Printer |

FIG. 46A

| Exception | Object type |
|---|---|
| Parameter " ... " is invalid | Error |

FIG. 46B

| Setting | Description |
| --- | --- |
| true/1 | Specifies rotated printing of text. |
| false/0 (default) | Cancels rotated printing of text. |

FIG. 47A

| Return value | Object type |
| --- | --- |
| Printer Object | Printer |

FIG. 47B

| Exception | Object type |
| --- | --- |
| Parameter " ... " is invalid | Error |

FIG. 47C

| String | Description |
|---|---|
| \t | Horizontal tab(HT) |
| \n | Line feed (LF) |
| \\ | Carriage return |

FIG. 48A

| Return value | Object type |
|---|---|
| Printer Object | Printer |

FIG. 48B

| Exception | Object type |
|---|---|
| Parameter " ... " is invalid | Error |

FIG. 48C

| Setting | Language |
|---|---|
| en(default) | English(ANK) |
| ja | Japanese |

FIG. 49A

| Return value | Object type |
|---|---|
| Printer Object | Printer |

FIG. 49B

| Exception | Object type |
|---|---|
| Parameter " ... " is invalid | Error |

FIG. 49C

| Constant (font) | Language |
|---|---|
| FONT_A (default) | Font A |
| FONT_B | Font B |
| FONT_C | Font C |

FIG. 50A

| Return value | Object type |
|---|---|
| Printer Object | Printer |

FIG. 50B

| Exception | Object type |
|---|---|
| Parameter " ... " is invalid | Error |

FIG. 50C

| Setting | Description |
| --- | --- |
| true/1 | Specifies smoothing. |
| false/0 (default) | Cancels smoothing |

FIG. 51A

| Return value | Object type |
| --- | --- |
| Printer Object | Printer |

FIG. 51B

| Exception | Object type |
| --- | --- |
| Parameter " ... " is invalid | Error |

FIG. 51C

| Setting | Description |
| --- | --- |
| true/1 | Specifies the double-sized width. |
| false/0 (default) | Cancels the double-sized width |
| undefined (When not specified) | Retains the current setting for double-sized width. |

FIG. 52A

| Setting | Description |
| --- | --- |
| true/1 | Specifies the double-sized height |
| false/0 (default) | Cancels the double-sized height |
| undefined (When not specified) | Retains the current setting for double-sized height |

FIG. 52B

| Return value | Object type |
| --- | --- |
| Printer Object | Printer |

FIG. 52C

| Exception | Object type |
| --- | --- |
| Parameter " ... " is invalid | Error |

FIG. 52D

| Setting | Description |
|---|---|
| Integer from 1 to 8 | Horizontal scale (default : 1) |
| undefined (When not specified) | Retains the current setting for the horizontal scale. |

FIG. 53A

| Setting | Description |
|---|---|
| Integer from 1 to 8 | Vertical scale (default : 1) |
| undefined (When not specified) | Retains the current setting for the vertical scale. |

FIG. 53B

| Return value | Object type |
|---|---|
| Printer Object | Printer |

FIG. 53C

| Exception | Object type |
|---|---|
| Parameter " ... " is invalid | Error |

FIG. 53D

| Setting | Description |
| --- | --- |
| true/1 | Specifies the inversion of black and white parts of characters. |
| false/0 (default) | Cancels the inversion of black and white parts of characters. |
| undefined (When not specified) | Retains the current setting for inversion of black and white. |

FIG. 54A

| Setting | Description |
| --- | --- |
| true/1 | Specifies underlining. |
| false/0 (default) | Cancels underlining. |
| undefined (When not specified) | Retains the current underlining setting. |

FIG. 54B

| Setting | Description |
| --- | --- |
| true/1 | Specifies emphasized printing of characters. |
| false/0 (default) | Cancels emphasized printing of characters. |
| undefined (When not specified) | Retains the current setting for emphasized printing. |

FIG. 54C

| Setting | Description |
|---|---|
| COLOR_NONE | Characters are not printed. |
| COLOR_1 (default) | First color |
| COLOR_2 | Second color |
| COLOR_3 | Third color |
| COLOR_4 | Fourth color |
| undefined (When not specified) | Retains the current color setting |

FIG. 54D

| Return value | Object type |
|---|---|
| Printer Object | Printer |

FIG. 54E

| Exception | Object type |
|---|---|
| Parameter " ... " is invalid | Error |

FIG. 54F

| Return value | Object type |
|---|---|
| Printer Object | Printer |

FIG. 55A

| Exception | Object type |
|---|---|
| Parameter " ... " is invalid | Error |

FIG. 55B

| Return value | Object type |
|---|---|
| Printer Object | Printer |

FIG. 56A

| Exception | Object type |
|---|---|
| Parameter " ... " is invalid | Error |

FIG. 56B

| Return value | Object type |
|---|---|
| Printer Object | Printer |

FIG. 57A

| Exception | Object type |
|---|---|
| Parameter " ... " is invalid | Error |

FIG. 57B

| Setting | Description |
|---|---|
| COLOR_NONE | Characters are not printed. |
| COLOR_1 (default) | First color |
| COLOR_2 | Second color |
| COLOR_3 | Third color |
| COLOR_4 | Fourth color |
| undefined (When not specified) | First color |

FIG. 58A

| Setting | Description |
|---|---|
| MODE_MONO | Monochrome (two-tone) |
| MODE_GRAY16 | Gray scale (16-tone) |
| undefined (When not specified) | Monochrome (two-tone) |

FIG. 58B

| Return value | Object type |
|---|---|
| Printer Object | Printer |

FIG. 58C

| Exception | Object type |
|---|---|
| Parameter " ... " is invalid | Error |

FIG. 58D

| Return value | Object type |
|---|---|
| Printer Object | Printer |

FIG. 59A

| Exception | Object type |
|---|---|
| Parameter " ... " is invalid | Error |

FIG. 59B

| Barcode type | Description |
|---|---|
| UPC-A | When an 11-digit number is specified, a check digit is automatically added.<br>When a 12-digit number is specified, the 12th digit is processed as a check digit but the check digit is not validated. |
| UPC-E | Specify 0 as the first digit.<br>Specify the manufacturer code in the digits 2 to 6.<br>Specify (right-align) the item code in the digits 7 to 11. The number of item code digits varies depending on the manufacturer code. Specify 0s in empty digits.<br>When an 11-digit number is specified, a check digit is automatically added.<br>When a 12-digit number is specified, the 12th digit is processed as a check digit but the check digit is not validated. |
| EAN13<br>JAN13 | When an 12-digit number is specified, a check digit is automatically added.<br>When a 13-digit number is specified, the 12th digit is processed as a check digit but the check digit is not validated. |
| EAN8<br>JAN8 | When a 7-digit number is specified, a check digit is automatically added.<br>When an 8-digit number is specified, the 8th digit is processed as a check digit but the check digit is not validated. |
| CODE39 | When the first character is *, the character is processed as the start character. In other cases, a start character is automatically added. |
| ITF | Start and stop codes are automatically added.<br>Check digits are not added or validated. |

FIG. 60A

| Barcode type | Description |
|---|---|
| CODABAR | Specify a start character (A to D, a to d).<br>Specify a stop character (A to D, a to d).<br>Check digits are not added or validated. |
| CODE93 | Start and stop characters are automatically added.<br>A check digit is automatically calculated and added. |
| CODE128 | Specify a start character (CODE A, CODE B, CODE C).<br>A stop character is automatically added.<br>A check digit is automatically calculated and added.<br>To encode each of the following characters, specify two characters starting with the character "{":<br><br>FNC1:     {1<br>FNC2:     {2<br>FNC3:     {3<br>FNC4:     {4<br>CODE A:  {A<br>CODE B:  {B<br>CODE C:  {C<br>SHIFT:    {S<br>{:          {{ |
| GS1-128 | A start character, FNC1, a check digit, and a stop character are automatically added.<br>To automatically calculate and add a check digit for an application identifier (AI) and the subsequent data, specify the character "*" in the position of the check digit.<br>You can enclose an application identifier (AI) in parentheses. The parentheses are used as HRI print characters and are not encoded as data.<br>You can insert spaces between an application identifier (AI) and data. The spaces are used as HRI print characters and are not encoded as data.<br>To encode each of the following characters, specify two characters starting with the character "{":<br><br>FNC1:    {1<br>FNC3:    {3<br>(:         {(<br>):         {)<br>*:         {*<br>{:         {{ |
| GS1 DataBar Omnidirectional<br>GS1 DataBar Truncated<br>GS1 DataBar Limited | Specify a 13-digit global trade item number (GTIN) not including an application identifier (AI) or a check digit. |

FIG. 60B

| Barcode type | Description |
|---|---|
| BARCODE_GS1_DATABAR_EXPANDED | You can enclose an application identifier (AI) in parentheses. The parentheses are used as HRI print characters and are not encoded as data.<br>To encode each of the following characters, specify two characters starting with the character "{":<br>FNC1: {1<br>(: {(<br>): {) |

FIG. 60C

| String | Description |
|---|---|
| \xnn | Control code |
| \\ | Back slash |

FIG. 60D

| Constant (type) | Barcode type |
|---|---|
| BARCODE_UPC_A | UPC-A |
| BARCODE_UPC_E | UPC-E |
| BARCODE_EAN13 | EAN13 |
| BARCODE_JAN13 | JAN13 |
| BARCODE_EAN8 | EAN8 |
| BARCODE_JAN8 | JAN8 |
| BARCODE_CODE39 | CODE39 |
| BARCODE_ITF | ITF |
| BARCODE_CODABAR | CODABAR |
| BARCODE_CODE93 | CODE93 |
| BARCODE_CODE128 | CODE128 |
| BARCODE_GS1_128 | GS1-128 |
| BARCODE_GS1_DATABAR_OMNIDIRECTIONAL | GS1 DataBar Omnidirectional |
| BARCODE_GS1_DATABAR_TRUNCATED | GS1 DataBar Truncated |
| BARCODE_GS1_DATABAR_LIMITED | GS1 DataBar Limited |
| BARCODE_GS1_DATABAR_EXPANDED | GS1 Databar Expanded |

FIG. 60E

| Constant (hri) | Description |
|---|---|
| HRI_NONE (default) | HRI not printed |
| HRI_ABOVE | Above the bar code |
| HRI_BELOW | Below the bar code |
| HRI_BOTH | Both above and below the bar code |

FIG. 60F

| Constant (font) | Language |
|---|---|
| FONT_A(default) | Font A |
| FONT_B | Font B |
| FONT_C | Font C |

FIG. 60G

| Return value | Object type |
|---|---|
| Printer Object | Printer |

FIG. 60H

| Exception | Object type |
|---|---|
| Parameter " ... " is invalid | Error |

FIG. 60I

| 2D-Code type | Description |
|---|---|
| Standard PDF417 | Convert the character string to the string in UTF-8, apply the escape sequence, and then encode the string. |
| Truncated PDF417 | The data area can contain up to 928 code words in a maximum of 90 rows, each of which can contain up to 30 code words. |
| QR Code Model 1 | Convert the character string to the string in Shift-JIS, apply the escape sequence, and then encode the string based on the data type as shown below. |
| QR Code Model 2 | Number:0 to 9<br>Alphanumeric character:<br>0 to 9, A to Z, space, $, %, *, +, -, ., /, :<br>Kanji character:Shift-JIS value<br>8-bit, byte data:<br>0x00 to 0xff |

FIG. 61A

| 2D-Code type | Description |
|---|---|
| MaxiCode Mode 2 | Convert the character string to the string in UTF-8, apply the escape sequence, and then encode the string. |
| MaxiCode Mode 3 | In Modes 2 and 3, when the first piece of data is [)>\ x1e01\x1dyy (where yy is a two-digit number), this is processed as the message header, and the subsequent data is processed as the primary message. In other primary message. In other cases, from the first piece of data, data is processed as the primary message. |
| MaxiCode Mode 4 | |
| MaxiCode Mode 5 | |
| MaxiCode Mode 6 | In Mode 2, specify the primary message in the following format: Postal code (1- to 9-digit number) GS:(\x1d) ISO country code (1- to 3-digit number) GS:(\x1d) Service class code (1- to 3-digit number) In Mode 3, specify the primary message in the following format: Postal code (1 to 6 pieces of data convertible by Code Set A) GS:(\x1d) ISO country code (1-to 3-digit number) GS:(\x1d) Service class code (1- to 3-digit number) |
| GS1 DataBar Stacked | Convert the character string to the string in UTF-8, apply the escape sequence, and then encode the string. Specify a 13-digit global trade item number (GTIN) not including an application identifier(AI) or a check digit. |
| GS1 DataBar Stacked Omnidirectional | |
| GS1 DataBar Expanded Stacked | Convert the character string to the string in UTF-8, apply the escape sequence, and then encode the string. You can enclose an application identifier (AI) in parentheses. The parentheses are used as HRI print characters and are not encoded as data. To encode each of the following characters, specify two characters starting with the character "{": FNC1:   {1 (:       {( ):       {) |

FIG. 61B

| String | Description |
|---|---|
| \xnn | Control code |
| \\ | Back slash |

FIG. 61C

| Constant (type) | 2D-Code type |
|---|---|
| SYMBOL_PDF417_STANDARD | Standard PDF417 |
| SYMBOL_PDF417_TRUNCATED | Truncated PDF417 |
| SYMBOL_QRCODE_MODEL_1 | QR Code Model 1 |
| SYMBOL_QRCODE_MODEL_2 | QR Code Model 2 |
| SYMBOL_MAXICODE_MODE_2 | MaxiCode Mode 2 |
| SYMBOL_MAXICODE_MODE_3 | MaxiCode Mode 3 |
| SYMBOL_MAXICODE_MODE_4 | MaxiCode Mode 4 |
| SYMBOL_MAXICODE_MODE_5 | MaxiCode Mode 5 |
| SYMBOL_MAXICODE_MODE_6 | MaxiCode Mode 6 |
| SYMBOL_GS1_DATABAR_STACKED | GS1 DataBar Stacked |
| SYMBOL_GS1_DATABAR_STACKED_OMNIDIRECTIONAL | GS1 DataBar Stacked Omnidirectional |
| SYMBOL_GS1_DATABAR_EXPANDED_STACKED | GS1 DataBar Expanded Stacked |

FIG. 61D

| Constant (level) | Description |
|---|---|
| LEVEL_0 | PDF417 error correction level 0 |
| LEVEL_1 | PDF417 error correction level 1 |
| LEVEL_2 | PDF417 error correction level 2 |
| LEVEL_3 | PDF417 error correction level 3 |
| LEVEL_4 | PDF417 error correction level 4 |
| LEVEL_5 | PDF417 error correction level 5 |
| LEVEL_6 | PDF417 error correction level 6 |
| LEVEL_7 | PDF417 error correction level 7 |
| LEVEL_8 | PDF417 error correction level 8 |
| LEVEL_L | QR Code error correction level L |
| LEVEL_M | QR Code error correction level M |
| LEVEL_Q | QR Code error correction level Q |
| LEVEL_H | QR Code error correction level H |
| LEVEL_DEFAULT | Default level |

FIG. 61E

| Return value | Object type |
|---|---|
| Printer Object | Printer |

FIG. 61F

| Exception | Object type |
|---|---|
| Parameter " ... " is invalid | Error |

FIG. 61G

| Constant (style) | Description |
|---|---|
| LINE_THIN | Solid line: Thin |
| LINE_MEDIUM | Solid line: Medium |
| LINE_THICK | Solid line: Thick |
| LINE_THIN_DOUBLE | Double line: Thin |
| LINE_MEDIUM_DOUBLE | Double line: Medium |
| LINE_THICK_DOUBLE | Double line: Thick |
| undefined (When not specified) | Solid line: Thin |

FIG. 62A

| Return value | Object type |
|---|---|
| Printer Object | Printer |

FIG. 62B

| Exception | Object type |
|---|---|
| Parameter " ... " is invalid | Error |

FIG. 62C

| Constant (style) | Description |
|---|---|
| LINE_THIN | Solid line: Thin |
| LINE_MEDIUM | Solid line: Medium |
| LINE_THICK | Solid line: Thick |
| LINE_THIN_DOUBLE | Double line: Thin |
| LINE_MEDIUM_DOUBLE | Double line: Medium |
| LINE_THICK_DOUBLE | Double line: Thick |
| undefined (When not specified) | Solid line: Thin |

FIG. 63A

| Return value | Object type |
|---|---|
| Printer Object | Printer |

FIG. 63B

| Exception | Object type |
|---|---|
| Parameter " ... " is invalid | Error |

FIG. 63C

| Constant (style) | Description |
|---|---|
| LINE_THIN | Solid line: Thin |
| LINE_MEDIUM | Solid line: Medium |
| LINE_THICK | Solid line: Thick |
| LINE_THIN_DOUBLE | Double line: Thin |
| LINE_MEDIUM_DOUBLE | Double line: Medium |
| LINE_THICK_DOUBLE | Double line: Thick |
| undefined (When not specified) | Solid line: Thin |

FIG. 64A

| Return value | Object type |
|---|---|
| Printer Object | Printer |

FIG. 64B

| Exception | Object type |
|---|---|
| Parameter " ... " is invalid | Error |

FIG. 64C

| Return value | Object type |
|---|---|
| Printer Object | Printer |

FIG. 65

| Return value | Object type |
|---|---|
| Printer Object | Printer |

FIG. 66

| Return value | Object type |
|---|---|
| Printer Object | Printer |

FIG. 67A

| Exception | Object type |
|---|---|
| Parameter " ... " is invalid | Error |

FIG. 67B

| Constant (dir) | Description |
|---|---|
| DIRECTION_LEFT_TO_RIGHT (default) | Left to right (No rotation. Data is printed from the top left corner to the right.) |
| DIRECTION_BOTTOM_TO_TOP | Bottom to top (Counterclockwise rotation by 90 degrees. Data is printed from the bottom left corner to the top.) |
| DIRECTION_RIGHT_TO_LEFT | Right to left (Rotation by 180 degrees. Data is printed from the bottom right corner to the left.) |
| DIRECTION_TOP_TO_BOTTOM | Top to bottom (Clockwise rotation by 90 degrees. Data is printed from the top right corner to the bottom.) |

FIG. 68A

| Return value | Object type |
|---|---|
| Printer Object | Printer |

FIG. 68B

| Exception | Object type |
|---|---|
| Parameter " ... " is invalid | Error |

FIG. 68C

| Return value | Object type |
|---|---|
| Printer Object | Printer |

FIG. 69A

| Exception | Object type |
|---|---|
| Parameter " ... " is invalid | Error |

FIG. 69B

| Constant (style) | Description |
|---|---|
| LINE_THIN | Solid line: Thin |
| LINE_MEDIUM | Solid line: Medium |
| LINE_THICK | Solid line: Thick |
| LINE_THIN_DOUBLE | Double line: Thin |
| LINE_MEDIUM_DOUBLE | Double line: Medium |
| LINE_THICK_DOUBLE | Double line: Thick |
| undefined (When not specified) | Solid line: Thin |

FIG. 70A

| Return value | Object type |
|---|---|
| Printer Object | Printer |

FIG. 70B

| Exception | Object type |
|---|---|
| Parameter " ... " is invalid | Error |

FIG. 70C

| Constant (style) | Description |
|---|---|
| LINE_THIN | Solid line: Thin |
| LINE_MEDIUM | Solid line: Medium |
| LINE_THICK | Solid line: Thick |
| LINE_THIN_DOUBLE | Double line: Thin |
| LINE_MEDIUM_DOUBLE | Double line: Medium |
| LINE_THICK_DOUBLE | Double line: Thick |
| undefined (When not specified) | Solid line: Thin |

FIG. 71A

| Return value | Object type |
|---|---|
| Printer Object | Printer |

FIG. 71B

| Exception | Object type |
|---|---|
| Parameter " ... " is invalid | Error |

FIG. 71C

| Setting | Description |
|---|---|
| CUT_NO_FEED | Cut without feeding<br>(The paper is cut without being fed.) |
| CUT_FEED | Feed cut<br>(The paper is fed to the cut position and then is cut.) |
| CUT_RESERVE | Cut reservation<br>(Printing continues until the cut position is reached, at which the paper is cut.) |
| undefined<br>(When not specified) | Feed cut<br>(The paper is fed to the cut position and then is cut.) |

FIG. 72A

| Return value | Object type |
|---|---|
| Printer Object | Printer |

FIG. 72B

| Exception | Object type |
|---|---|
| Parameter " ... " is invalid | Error |

FIG. 72C

| Setting | Description |
|---|---|
| DRAWER_1 | Pin 2 of the drawer kick-out connector |
| DRAWER_2 | Pin 5 of the drawer kick-out connector |
| undefined (When not specified) | Pin 2 of the drawer kick-out connector |

FIG. 73A

| Setting | Description |
|---|---|
| PULSE_100 | 100 ms |
| PULSE_200 | 200 ms |
| PULSE_300 | 300 ms |
| PULSE_400 | 400 ms |
| PULSE_500 | 500 ms |
| undefined (When not specified) | 100 ms |

FIG. 73B

| Return value | Object type |
|---|---|
| Printer Object | Printer |

FIG. 73C

| Exception | Object type |
|---|---|
| Parameter " ... " is invalid | Error |

FIG. 73D

| Setting | Description |
|---|---|
| PATTERN_NONE | Stop |
| PATTERN_A | Pattern A |
| PATTERN_B | Pattern B |
| PATTERN_C | Pattern C |
| PATTERN_D | Pattern D |
| PATTERN_E | Pattern E |
| PATTERN_ERROR | Error sound pattern |
| PATTERN_PAPER_END | Pattern when there is no paper |
| undefined (When not specified) | Pattern A |

FIG. 74A

| Setting | Description |
|---|---|
| 0 | The buzzer does not stop. |
| 1 to 255 | Number of repeats |
| undefined (When not specified) | One time |

FIG. 74B

| Return value | Object type |
|---|---|
| Printer Object | Printer |

FIG. 74C

| Exception | Object type |
|---|---|
| Parameter " ... " is invalid | Error |

FIG. 74D

| Return value | Object type |
|---|---|
| Printer Object | Printer |

FIG. 75A

| Exception | Object type |
|---|---|
| Parameter " ... " is invalid | Error |

FIG. 75B

| Setting | Decription |
|---|---|
| true or 1 | Cuts the paper after printing |
| false or 0 | Does not cut the paper after printing |
| undefined | Does not cut the paper after printing |

FIG. 76A

| Setting | Decription |
|---|---|
| MODE_MONO | Monochrome (two-tone) |
| MODE_GRAY16 | Multiple tones (16-tone) |
| undefined | Monochrome (two-tone) |

FIG. 76B

| Exception | Object type |
|---|---|
| Parameter " ... " is invalid | Error |
| XMLHttpRequest is not supported | Error |
| Canvas is not supported | Error |

FIG. 76C

| Constant | Description |
|---|---|
| HALFTONE_DITHER (default) | Dithering, suitable for printing graphics only. |
| HALFTONE_ERROR_DIFFUSION | Error diffusion, suitable for printing text and graphics together. |
| HALFTONE_THRESHOLD | Threshold, suitable for printing text only. |

FIG. 77

| Property | Name | Object type |
|---|---|---|
| success | Print result | Boolean |
| code | Error code | String |
| status | Status | Number |

FIG. 78A

| Value | Description |
|---|---|
| true or 1 | Printing succeeded. |
| false or 0 | Printing failed. |

FIG. 78B

| Value | Description |
|---|---|
| 'EPTR_AUTOMATICAL' | An automatically recoverable error occurred |
| 'EPTR_COVER_OPEN' | A cover open error occurred |
| 'EPTR_CUTTER' | An autocutter error occurred |
| 'EPTR_MECHANICAL' | A mechanical error occurred |
| 'EPTR_REC_EMPTY' | No paper in roll paper end sensor |
| 'EPTR_UNRECOVERABLE' | An unrecoverable error occurred |
| 'SchemaError' | The request document contains a syntax error |
| 'DeviceNotFound' | The printer with the specified device ID does not exist |
| 'PrintSystemError' | An error occurred on the printing system |
| 'EX_BADPORT' | An error was detected on the communication port |
| 'EX_TIMEOUT' | A print timeout occurred |

FIG. 78C

| Constant (status) | Description |
| --- | --- |
| ASB_NO_RESPONSE | No response from the TM printer |
| ASB_PRINT_SUCCESS | Printing is successfully completed |
| ASB_DRAWER_KICK | Status of the 3rd pin of the drawer kick-out connector = "H" |
| ASB_OFF_LINE | Offline |
| ASB_COVER_OPEN | The cover is open |
| ASB_PAPER_FEED | Paper is being fed by a paper feed switch operation |
| ASB_WAIT_ON_LINE | Waiting to be brought back online |
| ASB_PANEL_SWITCH | The paper feed switch is being pressed (ON) |
| ASB_MECHANICAL_ERR | A mechanical error occurred |
| ASB_AUTOCUTTER_ERR | An autocutter error occurred |
| ASB_UNRECOVER_ERR | An unrecoverable error occurred |
| ASB_AUTORECOVER_ERR | An automatically recoverable error occurred |
| ASB_RECEIPT_NEAR_END | No paper in roll paper near end sensor |
| ASB_RECEIPT_END | No paper in roll paper end sensor |
| ASB_BUZZER | A buzzer is on (only for applicable devices) |
| ASB_SPOOLER_IS_STOPPED | The spooler has stopped |

FIG. 78D

| Property | Name | Object type |
|---|---|---|
| status | HTTP Status | Number |
| responseText | Response text | String |

FIG. 79

| Property | Description |
|---|---|
| input | Detected string |

FIG. 80

| Object | Description |
|---|---|
| ClientConnection | Object used to send data to a device object on the browser. |
| DeviceConnection | Object used to send/receive data to/from the device. |

FIG. 82

| Set value | Description |
|---|---|
| type_keyboard | Specify this to use a keyboard device. |
| type_scanner | Specify this to use a barcode scanner. |
| type_simple_serial | Specify this to perform simple serial communication. |

FIG. 83

| Set value | Description |
|---|---|
| group_hid | Specify this to use an input device that can run with an HID driver. |
| group_serial | Specify this to use a serial communication device. |
| group_other | Specify this to use other device. |

FIG. 84

```
exports.Keyboard_Generic = Keyboard_Generic;       // Exports declaration function Keyboard_Generic(clientConn, deviceConn){ // Having two arguments
                                                   //    and the same name as the
                                                   //    file name
    this.DEVICE_TYPE = 'type_keyboard';            // Having the
                                                   //    "DEVICE_TYPE" property
    this.DEVICE_GROUP = 'group_hid';               // Having the
                                                   //    "DEVICE_GROUP" property this.clientConn = clientConn;
    this.deviceConn = deviceConn;
    ......
    ......
}

Keyboard_Generic.prototype = {
    onDeviceData : function(event, keycode, ascii){...},  // Having the
                                                          //    "onDeviceData" method
    setprefix : function(data){...}                       // Having the method
                                                          //    corresponding to the
                                                          //    device object
}
```

FIG. 85

| Element | API | Description |
|---|---|---|
| Method | | |
| | send | Sends data to a device object that can run with a browser. |

FIG. 86

| Element | API | Description |
|---|---|---|
| Method | | |
| | send | Sends data to a serial communication device. |

FIG. 87

| Element | API | Description |
|---|---|---|
| Event | | |
| | onDeviceData | Key input receipt event |
| | onDeviceData | Data receipt event from a serial communication device |
| | Any event | API execution result receipt event of a device object that runs with a browser |

FIG. 88

```
data = {'keycode' : 49, 'ascii' : '1'};
clientConn.send('onkeypress', data)
```

FIG. 89

| Value | Description |
|-------|-------------|
| 1     | Key down    |
| 2     | Key up      |

FIG. 90

| Device | Device ID | Device name | Control script |
|---|---|---|---|
| POS keyboard | local_keyboard | Select the relevant device from the list. | Keyboard_Generic.js |
| Barcode scanner | local_scanner | | Scanner_Generic.js |

FIG. 97

| | | Device Setting | |
|---|---|---|---|
| Connection settings | IP address 192.168.192.168  Port 8008  Device ID local_disply  ☐ Encryption | | Connect |

| | Console |
|---|---|
| | connected to ePOS Device Service Interface.<br>you can use display. |

| | | ePOS-Device API Display Object | |
|---|---|---|---|
| Window | Define display area | Window No. 1  X-coordinate 1  Y-coordinate 1  Width 10  Height 1  Scroll Mode OVERWRITE | Add |
| | Discard display area setting | Window No. to discard 1 | Add |
| | Switch display area | Window No. to move 1 | Add |
| | Clear current display area | | Add |
| | Set cursor position | X-coodinate 1  Y-coodinate 1 | Add |

FIG. 99A

|        |                                   |                                                                                                                                                  |     |
|--------|-----------------------------------|--------------------------------------------------------------------------------------------------------------------------------------------------|-----|
| Window | Define display area               | Window No. [1] X-coordinate [1] Y-coordinate [1] Width [10] Height [1] Scroll Mode [OVERWRITE]                                                    | Add |
|        | Discard display area setting      | Window No. to discard [1]                                                                                                                        | Add |
|        | Switch display area               | Window No. to move [1]                                                                                                                           | Add |
|        | Clear current display area        |                                                                                                                                                  | Add |
| Cursor | Set cursor position               | X-coodinate [1] Y-coodinate [1]                                                                                                                  | Add |
|        | Move cursor position in current window | Top left                                                                                                                                    | Add |
|        | Cursor Type                       | No cursor                                                                                                                                        | Add |
| Text   | Display text                      | String<br>Hello world!<br>Language [None] X-coodinate [None] Y-coodinate [None]                                                                  | Add |
|        | Display inverted text             | String<br>Hello world!<br>Language [None] X-coodinate [None] Y-coodinate [None]                                                                  | Add |
|        | Display marquee                   | String<br>Hello world!<br>Format [Start from right-edge] Display interval(100~2,000)(ms) [100] Repeat interval(100~2,000)(ms) [100] Repeat count(0~127) [0] Language [None] | Add |

FIG. 99B

|            |                    |                                                                                                                                                                           |     |
|------------|--------------------|---------------------------------------------------------------------------------------------------------------------------------------------------------------------------|-----|
|            | Display marquee    | Hello world!<br>Format [Start from right-edge] Display interval(100~2,000)(ms) [100] Repeat interval(100~2,000)(ms) [100] Repeat count(0~127) [0] Language [None]          | Add |
| Properties | Blinking display   | Blinking interval(0~12,700)(ms) [0]                                                                                                                                       |     |
|            | Brightness         | 20%                                                                                                                                                                       |     |
| Others     | Display clock command | 12345                                                                                                                                                                  |     |
|            | Reset display      |                                                                                                                                                                           |     |

Display Object Sample Code

```
        alert (retcode) ;
    }
{
function executeAddedCoad()   {
display.addText ( ' Hello World! ' ) ;
display.addReverseText ( ' Hello World! ' ) ;
display.send ( ) ;
}
```

Clear

Test display                                                                                                                                                              Send

FIG. 99C

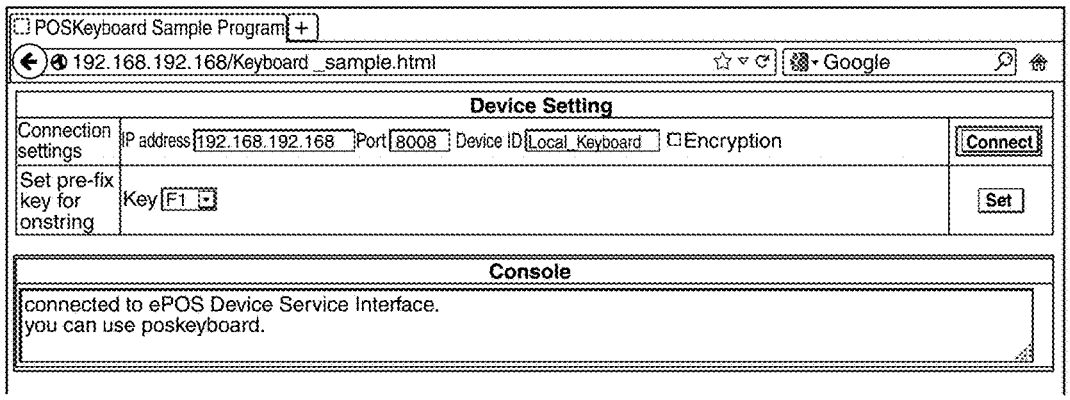
FIG. 100A
| Input | Result |
|---|---|
| When a string is directly input | Displayed in the onkeypress box. |
| When a string set to the POS key is input | When the key to which a string is set is pressed, the result will be displayed the onstring box. |
FIG. 100B
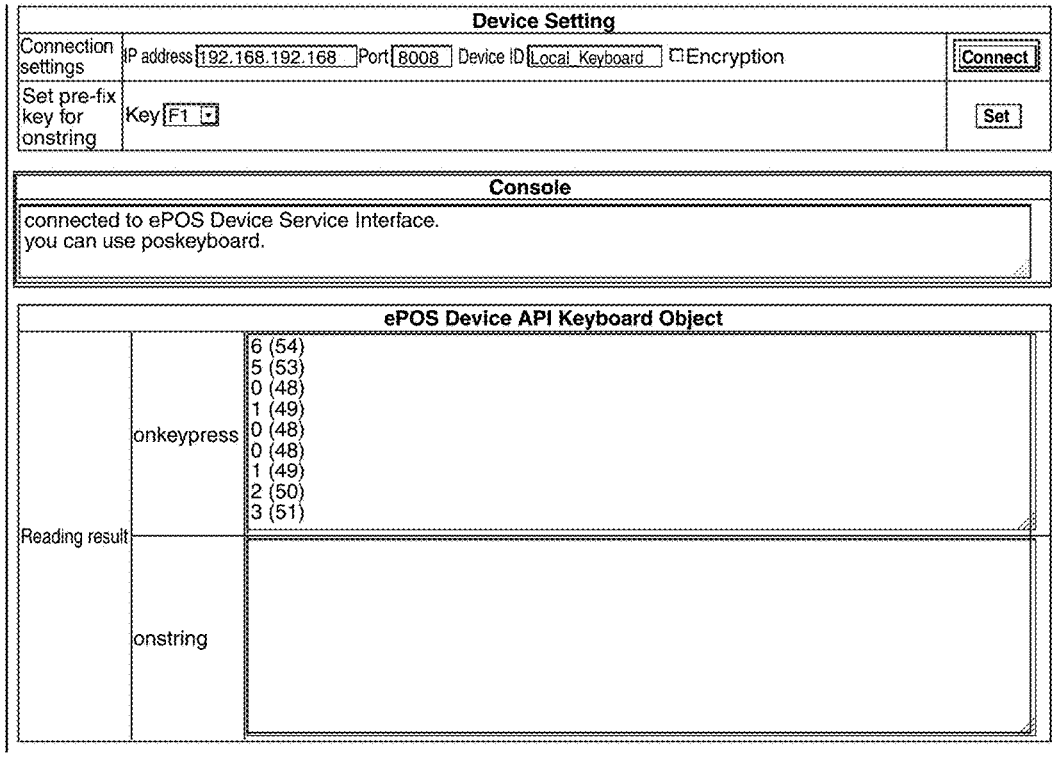
FIG. 100C

| Description | Each | Qty | Total |
|---|---|---|---|
| Parka | 70 | 1 | 70 |
| T-shirt | 25 | 1 | 25 |
| Sox | 6 | 2 | 12 |
| | | Subtotal | $107 |

| Total | $107 |
|---|---|
| Cash | $0 |
| Change | $0 |

| C | Qty | Subtotal |
|---|---|---|
| 7 | 8 | 9 |
| 4 | 5 | 6 |
| 1 | 2 | 3 |
| 0 | 00 | 0000 |

Ent

Delete Item | Delete All | Code

Settings

FIG. 104A

| Description | Each | Qty | Total |
|---|---|---|---|
| Parka | 70 | 1 | 70 |
| T-shirt | 25 | 1 | 25 |
| Sox | 6 | 2 | 12 |
| | | | |
| | | Subtotal | $107 |

Delete Item | Delete All | Code

| Total | $107 |
|---|---|
| Cash | $0 |
| Change | $0 |

| C | Qty | Subtotal |
|---|---|---|
| 7 | 8 | 9 |
| 4 | 5 | 6 |
| 1 | 2 | 3 |
| 0 | 00 | 0000 |

Ent

Settings

FIG. 104B

| Description | Each | Qty | Total |
|---|---|---|---|
| Parka | 70 | 1 | 70 |
| T-shirt | 25 | 1 | 25 |
| Sox | 6 | 2 | 12 |
| | | | |
| | | Subtotal | $107 |

| | |
|---|---|
| Total | $107 |
| Cash | $110 |
| Change | $3 |

| C | Qty | Subtotal |
|---|---|---|
| 7 | 8 | 9 |
| 4 | 5 | 6 |
| 1 | 2 | 3 |
| 0 | 00 | 0000 |

Ent

Delete Item | Delete All | Code

Settings

FIG. 104C

PRINTER COMMUNICATING WITH A COMPUTING DEVICE THAT HAS ACCESS TO A TARGET-DEVICE SCRIPT THAT INITIATES A CONTROL OBJECT TO CONTROL A TARGET DEVICE

CROSS-REFERENCE TO RELATED APPLICATIONS

This application is a continuation of, and claims priority under 35 U.S.C. § 120 on, application Ser. No. 14/702,362, filed May 1, 2015, which is a continuation of, application Ser. No. 14/140,268, filed Dec. 24, 2013, now, U.S. Pat. No. 9,052,853, issued Jun. 9, 2015, which claims priority under 35 U.S.C. § 119(e) on provisional application no. 61/748,232, filed Jan. 2, 2013. The content of each such related application is incorporated by reference herein in its entirety.

TECHNICAL FIELD

The present invention relates to a device control system that controls a device, a printer, and a control method of the device control system.

BACKGROUND

A device (such as a computer) used as a controller for controlling devices is conventionally part of a system that controls devices such as a keyboard and barcode scanner by means of a terminal connected to a network.

CITATION LIST

Patent Literature

[PTL 1] JP-A-2004-152256

SUMMARY OF INVENTION

Technical Problem

However, there is also a need to use devices such as above by means of a simple configuration.

The present invention is directed to the foregoing problem, and an object of the invention is to provide a device control system, a printer, and a control method of a device control system that can control devices by a terminal connected to a network.

Solution to Problem

To achieve the foregoing object, a device control system according to the invention has a device; a device control device including a connection unit configured to connect to the device, and a device control unit configured to control the device connected to the connection unit; and a terminal that runs a web browser executing a device application programming interface that connects to the device control device, displays a web application, and controls the device.

The invention enables controlling a device connected to a device control device through the web browser of a terminal.

In the invention, the device application programming interface has an object that supports the device; and the web application calls the object and sends a request to the device control device.

In another aspect of the invention, the device control device executes a device control script that controls the device; and the device control script connects to the object, receives the request sent by the terminal, and controls the device connected to the connection unit.

In another aspect of the invention, the device control script has a device connection object that sends and receives data with the device, and a client connection object that sends data to the device API.

In another aspect of the invention, the request is a start control request specifying the device connected to the device control device and instructing starting control of the device; the command is a start control command instructing starting control of the device; and when the terminal sends the start control request to the device control device, the device control device sends the start control command to the device specified by the start control request, and enables control of the device by the terminal.

Another aspect of the invention also has a second terminal running a web browser that executes a second device application programming interface that connects to the device control device, displays a second web application, and controls the device; the second the device application programming interface having a second object that supports the device.

In another aspect of the invention, when the device can be controlled by the terminal, the device control device exclusively locks the device, and if the second web application calls the second object and sends a second request to the device control device, does not allow control of the device in the second request.

In another aspect of the invention, if the second terminal sends the second request to the device control device when the device can be controlled by the terminal, the device control device sends a report indicating the device is busy to the second terminal.

In another aspect of the invention, the device is a printer configured to print; and if the second terminal sends the second request to the device control device when the printer can be controlled by the terminal, the device control device enables the second terminal to control the printer by the device control script based on the second request.

In another aspect of the invention, the web application of the terminal calls the object and sends a stop control request specifying the device and instructing ending control of the device to the device control device; and when the terminal sends the stop control request to the device control device, the device control device sends a second command instructing stopping control by the device control script to the device specified by the stop control request, and stops control of the device by the terminal.

In another aspect of the invention, when the second terminal sends the second request to the device control device after the device control device stops control of the device by the terminal, the device control device enables control by the second terminal of the device by the device control script based on the second request.

In another aspect of the invention, the device application programming interface detects connection of the object and the device control script of the device control device.

In another aspect of the invention, the object calls an event contained in the device control script.

In another aspect of the invention, the device is a display configured to display content; the request is a display request that specifies the display and requests displaying content on the display; and when the terminal sends the display request to the device control device, the device control device sends a display command requesting display by the device control script to the display specified by the display request.

In another aspect of the invention, the display request requests displaying time on the display.

In another aspect of the invention, the request is a registration request that specifies the device and requests registering image data in the device; and when the terminal sends the registration request to the device control device, the device control device sends a registration command instructing registering the image by the device control script to the device specified by the registration request.

The terminal also sends the image data to the device control device; and the device control script converts the image data to the raster image data.

The request is also an encryption request that specifies the device, and instructs whether or not to encrypt data sent and received between the device and the terminal.

Another aspect of the invention is a printer including: a connection unit configured to connect to a device; a device control unit configured to execute a device control script that controls a device, and to control the device connected to the connection unit; and a print unit configured to print.

Another aspect of the invention is a control method of a device control system, including: a terminal that runs a web browser, a device, and a device control device configured to connect to the device; calling an object supporting the device by a web application that runs on the web browser; sending a request to the device control device; executing a device control script that controls the device by the device control device; sending to the device a command that controls the device by the device control script based on the request received by the device control device; and establishing control of the device by the terminal.

The request is a start control request specifying the device connected to the device control device and instructing starting control of the device; and when the terminal sends the start control request to the device control device, the device control device sends the control command to the device, and starts control of the device by the terminal.

Objects of the invention are also met in a printer having: a communication interface configured to communicate with a first computing device that has access to a target-device application programming interface (API) that initiates a control object configured to control a target device; a connector configured to connect to the target device; and a controller configured as a command interface between the first computing device and the target device connected to the connector.

Preferably, the printer is further configured to receive instruction requests from the first computing device, the instruction requests being generated by the control object by use of the API for controlling the target device; and the controller applies commands via the connector to the target device for executing the received instruction requests and sends back to the first computing device any data responses received from the target device.

Additionally, the target device may be selected from among a plurality of periphery devices; the connector is configured to connect to each of the plurality of periphery devices; the controller executes a device control script that controls the target device; and the device control script connects to the control object, receives the instruction requests sent by the first computing device, and issues commands that control the target device connected to the connector in accordance with the received instruction requests.

Preferably, the connector includes a plurality of physical connection ports, each physical connection port being connected to a respective one of the plurality of periphery devices; and the device control script has a target-device connection object that sends and receives data to and from the target device, and has a client connection object that sends data to the target-device API.

Further preferably, one of the instruction requests may be a start-control request specifying the target device connected to the connector and instructing starting control of the target device; the command sent in accordance with the start-control request is a start-control command instructing starting control of the target device; and when the controller receives the start-control request from the first computing device, the controller sends the start-control command to the target device specified by the start-control request, and enables control of the target device by the first computing device.

Additionally, the controller may communicate with a second computing device that has access to a second target-device API that instantiates a second control object configured to control the target device, and the controller optionally functions as a command interface between the second computing device and the target device connected to the connector. In this case, the second computing device optionally controls the target device by using the second target-device API to cause the second control object to send second instruction requests to the controller, and the controller applies the received second instruction requests to the target device and sends back to the second computing device any data responses received from the target device.

In this case, if the target device is currently being controlled by the first computing device and the controller receives a second instruction request from the second control object requesting control of the target device, the controller does not allow control of the target device by the second computing device.

Preferably, if the controller receives a second instruction request for controlling the target device from the second computing device when the target device is being controlled by the first computing device, the controller sends to the second computing device a report indicating that the target device is busy.

The printer may further be designated a first printer. Additionally, the target device is a second printer configured to print. In this case, if the controller receives a second instruction request for controlling the second printer from the second computing device when the first printer is being controlled by the first computing device, then the controller enables the second computing device to control the second printer by the device control script based on the second instruction request.

Additionally, another of the instruction requests received by the controller from the first computing device may be a stop control request specifying the target device and instructing ending control of the target device. Preferably, in response to the first computing device sending the stop control request to the controller, the controller sends a second control command to the target device instructing stopping control of the target device by the first computing device, and stops control of the target device by the first computing device. Preferably, when the controller receives a second instruction request requesting control of the target device from the second computing device after the controller stops control of the target device by the first computing device, the controller enables control of the target device by the second computing device using the device control script.

Further preferably, the target device is a display configured to display content, and one of the instruction requests sent by the first computing device is a display request that specifies the display and requests displaying content on the display. When the controller receives the display request from the first computing device, the controller uses the device control script to send a display command requesting display of the content to the display specified by the display request.

Alternatively, one of the instruction requests sent by the first computing device is a registration request that specifies the target device and requests registering image data in the target device. In this case, when the controller receives the registration request from the first computing device, the controller uses the device control script to send a registration command to the target device specified by the registration request, wherein the registration command instructs registering the image.

Further preferably, the controller receives the image data from the first computing device; and the device control script converts the image data to a raster image data.

BRIEF DESCRIPTION OF DRAWINGS

FIG. 9 shows examples of key codes that can be acquired from a keyboard.
FIG. 10 shows the work flow of building a system.
FIG. 11 shows a method of registering web content.
FIG. 14 shows a method of registering a device.
FIG. 15 shows types of devices selected in device registration.
FIG. 16 shows input items when registering a network printer.
FIG. 17 shows input items when registering a customer display.
FIG. 18 shows input items when registering a key input device.
FIG. 19 shows input items when registering a serial communication device.
FIG. 20 shows input items when registering another device.
FIG. 22 shows a device object.
FIG. 23 shows an object of a Common to Device Object.
FIG. 24 shows a display object.
FIG. 25 shows a keyboard object.
FIG. 26A shows a printer object.
FIG. 26B shows a printer object.
FIG. 26C shows a printer object.
FIG. 27 shows a scanner object.
FIG. 28 shows a SimpleSerial object.
FIG. 29 shows a specific example of a connect method.
FIG. 30 shows an isConnect method.
FIG. 31 shows a createDevice method.
FIG. 32 shows a createDevice method.
FIG. 33 shows a deleteDevice method.
FIG. 34 shows a createWindow method.
FIG. 35 shows a moveCursorPosition method.
FIG. 36 shows a setCursorType method.
FIG. 37 shows a addText method.
FIG. 38 shows a addReverseText method.
FIG. 39 shows a addMarquee method.
FIG. 40 shows a addMarquee method.
FIG. 41 shows a setBrightness method.
FIG. 42A describes an onreceive event.
FIG. 42B describes an onreceive event.
FIG. 42C describes an onreceive event.
FIG. 43 describes an onkeypress event.
FIG. 44 describes an onstring event.
FIG. 45A describes an addTextAlign method.
FIG. 45B describes an addTextAlign method.
FIG. 45C describes an addTextAlign method.
FIG. 46A describes an addTextLineSpace method.
FIG. 46B describes an addTextLineSpace method.
FIG. 47A describes an addTextRotate method.
FIG. 47B describes an addTextRotate method.
FIG. 47C describes an addTextRotate method.
FIG. 48A describes an addText method.
FIG. 48B describes an addText method.
FIG. 48C describes an addText method.
FIG. 49A describes an addTextLang method.
FIG. 49B describes an addTextLang method.
FIG. 49C describes an addTextLang method.
FIG. 50A describes an addTextFont method.
FIG. 50B describes an addTextFont method.
FIG. 50C describes an addTextFont method.
FIG. 51A describes an addTextSmooth method.
FIG. 51B describes an addTextSmooth method.
FIG. 51C describes an addTextSmooth method.
FIG. 52A describes an addTextDouble method.
FIG. 52B describes an addTextDouble method.
FIG. 52C describes an addTextDouble method.
FIG. 52D describes an addTextDouble method.
FIG. 53A describes an addTextSize method.
FIG. 53B describes an addTextSize method.
FIG. 53C describes an addTextSize method.
FIG. 53D describes an addTextSize method.
FIG. 54A describes an addTextStyle method.
FIG. 54B describes an addTextStyle method.
FIG. 54C describes an addTextStyle method.
FIG. 54D describes an addTextStyle method.
FIG. 54E describes an addTextStyle method.
FIG. 54F describes an addTextStyle method.
FIG. 55A describes an addTextPosition method.
FIG. 55B describes an addTextPosition method.
FIG. 56A describes an addFeedUnit method.
FIG. 56B describes an addFeedUnit method.
FIG. 57A describes an addFeedLine method.
FIG. 57B describes an addFeedLine method.
FIG. 58A describes an addImage method.
FIG. 58B describes an addImage method.
FIG. 58C describes an addImage method.
FIG. 58D describes an addImage method.
FIG. 59A describes an addLogo method.
FIG. 59B describes an addLogo method.
FIG. 60A describes an addBarcode method.
FIG. 60B describes an addBarcode method.
FIG. 60C describes an addBarcode method.
FIG. 60D describes an addBarcode method.
FIG. 60E describes an addBarcode method.

FIG. 60F describes an addBarcode method.
FIG. 60G describes an addBarcode method.
FIG. 60H describes an addBarcode method.
FIG. 60I describes an addBarcode method.
FIG. 61A describes an addSymbol method.
FIG. 61B describes an addSymbol method.
FIG. 61C describes an addSymbol method.
FIG. 61D describes an addSymbol method.
FIG. 61E describes an addSymbol method.
FIG. 61F describes an addSymbol method.
FIG. 61G describes an addSymbol method.
FIG. 62A describes an addHLine method.
FIG. 62B describes an addHLine method.
FIG. 62C describes an addHLine method.
FIG. 63A describes an addVLineBegin method.
FIG. 63B describes an addVLineBegin method.
FIG. 63C describes an addVLineBegin method.
FIG. 64A describes an addVLineEnd method.
FIG. 64B describes an addVLineEnd method.
FIG. 64C describes an addVLineEnd method.
FIG. 65 describes an addPageBegin method.
FIG. 66 describes an addPageEnd method.
FIG. 67A describes an addPageArea method.
FIG. 67B describes an addPageArea method.
FIG. 68A describes an addPageDirection method.
FIG. 68B describes an addPageDirection method.
FIG. 68C describes an addPageDirection method.
FIG. 69A describes an addPagePosition method.
FIG. 69B describes an addPagePosition method.
FIG. 70A describes an addPageLine method.
FIG. 70B describes an addPageLine method.
FIG. 70C describes an addPageLine method.
FIG. 71A describes an addPageRectangle method.
FIG. 71B describes an addPageRectangle method.
FIG. 71C describes an addPageRectangle method.
FIG. 72A describes an addCut method.
FIG. 72B describes an addCut method.
FIG. 72C describes an addCut method.
FIG. 73A describes an addPulse method.
FIG. 73B describes an addPulse method.
FIG. 73C describes an addPulse method.
FIG. 73D describes an addPulse method.
FIG. 74A describes an addSound method.
FIG. 74B describes an addSound method.
FIG. 74C describes an addSound method.
FIG. 74D describes an addSound method.
FIG. 75A describes an addCommand method.
FIG. 75B describes an addCommand method.
FIG. 76A describes a print method.
FIG. 76B describes a print method.
FIG. 76C describes a print method.
FIG. 77 describes a halftone property.
FIG. 78A describes an onreceive event.
FIG. 78B describes an onreceive event.
FIG. 78C describes an onreceive event.
FIG. 78D describes an onreceive event.
FIG. 79 describes an onerror event.
FIG. 80 describes an ondata event.
FIG. 82 describes an object of a device control script.
FIG. 83 shows a list of device control script properties.
FIG. 84 shows a list of device control script properties.
FIG. 85 shows a specific example of device control script 502.
FIG. 86 shows an API list of the ClientConnection.
FIG. 87 shows an API list of the DeviceConnection object.
FIG. 88 shows an API list of the device control script name object.
FIG. 89 describes an API of the ClientConnection object.
FIG. 90 describes an onDeviceData event.
FIG. 97 shows an example of device settings.
FIG. 99A shows a example of a Customer Display Sample screen.
FIG. 99B shows a example of a Customer Display Sample screen.
FIG. 99C shows a example of a Customer Display Sample screen.
FIG. 100A shows an example of Keyboard Sample screen.
FIG. 100B shows an example of input and the result to the Keyboard Sample screen.
FIG. 100C shows an example of a Keyboard Sample screen.
FIG. 102A shows an example of a Barcode Scanner Sample screen.
FIG. 102B shows an example of a Barcode Scanner Sample screen.
FIG. 104A shows an example of a POS Terminal Sample screen.
FIG. 104B shows an example of a POS Terminal Sample screen.
FIG. 104C shows an example of a POS Terminal Sample screen.

DESCRIPTION OF EMBODIMENTS

A preferred embodiment of the invention is described below with reference to the accompanying figures.

Figure 1:
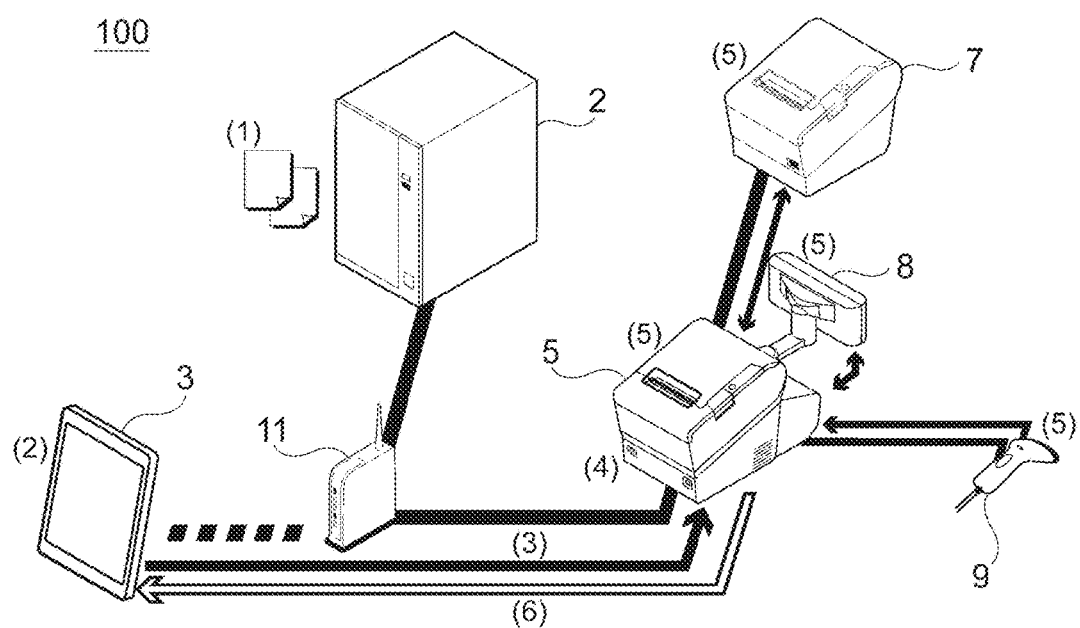
FIG. 1 illustrates a device control system according to a first embodiment of the invention.

FIG. 1 shows the configuration of a device control system 100 including an application server 2 according to a first embodiment applying the invention.

The device control system 100 includes the application server 2, a terminal 3, and a printer 5 (intelligent printer). In this device control system 100, the application server 2, terminal 3, and printer 5 are connected over a communication network. In the example shown in FIG. 1, the device control system 100 has a wireless LAN access point 11, and the application server 2, printer 5, and wireless LAN access point 11 are connected by a wired LAN. The wireless LAN access point 11 connects the terminal 3 to the wired LAN. The terminal 3 can therefore be used anywhere within communication range of the wireless LAN access point 11.

A network printer 7, customer display 8, and barcode scanner 9 are connected to the printer 5 as controlled devices. The network printer 7 is connected to the printer 5 through a network. The customer display 8 and barcode scanner 9 are connected through a USB interface described below. These devices are generally called peripheral devices (peripherals), and are referred to below as devices.

Devices that connect to the printer 5 are not limited to the devices shown in FIG. 1. For example, displays, and key input devices such as keyboards are also included. Also included are devices that can be controlled by a HID (human interface device) driver standard to the OS, serial communication devices that can be operated using a serial communication driver standard to the OS, and USB devices that can be controlled in the same way as serial communication devices.

The terminal 3 has a network-connectable web browser, and devices connected to the printer 5 can be controlled through this web browser.

The terminal 3 can be any terminal with a network-connectable web browser, and a tablet computer known from the literature such as shown in FIG. 1 can be used. A separate device (such as a computer) used as a controller for controlling the devices does not to be included in the device control system 100.

Operation of the device control system 100 is described next.

(1) Place a web application on the application server 2.

(2) Display the web application with the web browser of the terminal 3.

(3) The web browser of the terminal 3 sends a request message to the printer 5.

(4) The printer 5 receives the request message. Based on the received request message, the printer 5 sends data to a device that can be controlled by the printer 5.

(5) The network printer 7, customer display 8, and barcode scanner 9 connected to the printer 5 are controlled.

(6) The printer 5 returns a response to the web application.

Figure 2:
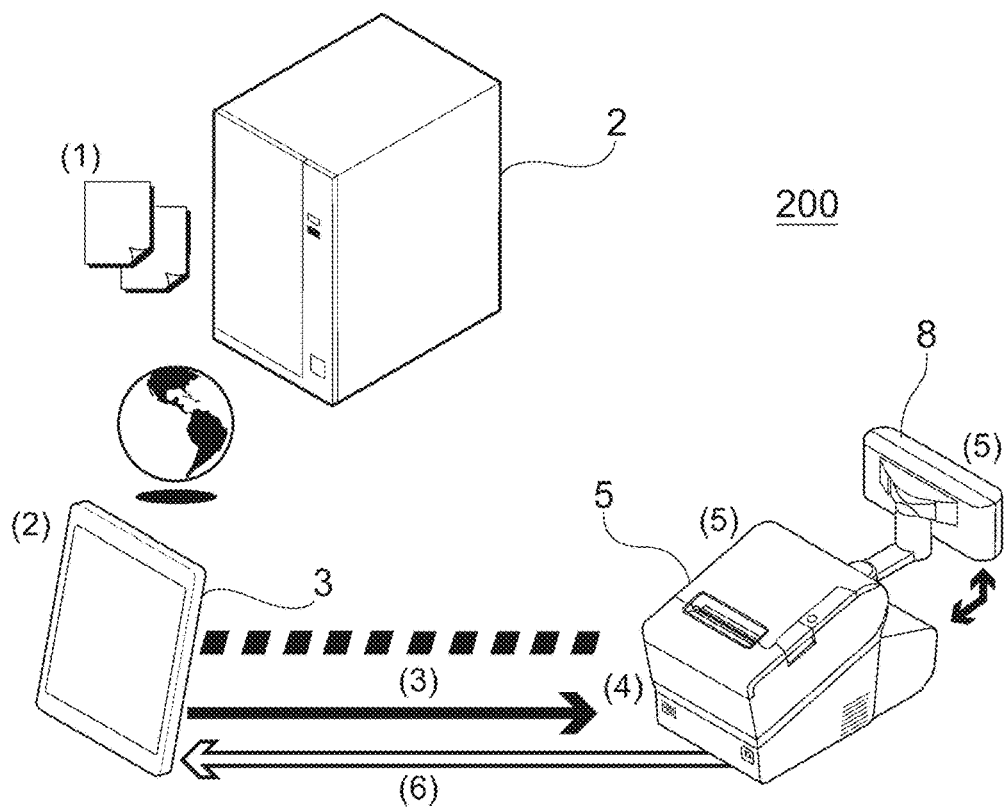
FIG. 2 illustrates a device control system according to a second embodiment of the invention.

FIG. 2 shows the configuration of a device control system 200 with an application server 2 according to a second embodiment of the invention. This device control system 200 has a terminal 3 and a printer 5. In this device control system 200, the application server 2 is connected to the terminal 3 through a telecommunication network such as the Internet. In the example in FIG. 2, a customer display 8 is connected to the printer 5.

Operation of this device control system 200 is described next.

(1) Place a web application on the application server 2.

(2) Display the web application with the web browser of the terminal 3.

(3) The web browser of the terminal 3 sends a request message to the printer 5.

(4) The printer 5 receives the request message. Based on the received request message, the printer 5 sends data to a device that can be controlled by the printer 5.

(5) The network printer 7, customer display 8, and barcode scanner 9 connected to the printer 5 are controlled.

(6) The printer 5 returns a response to the web application.

Figure 3:
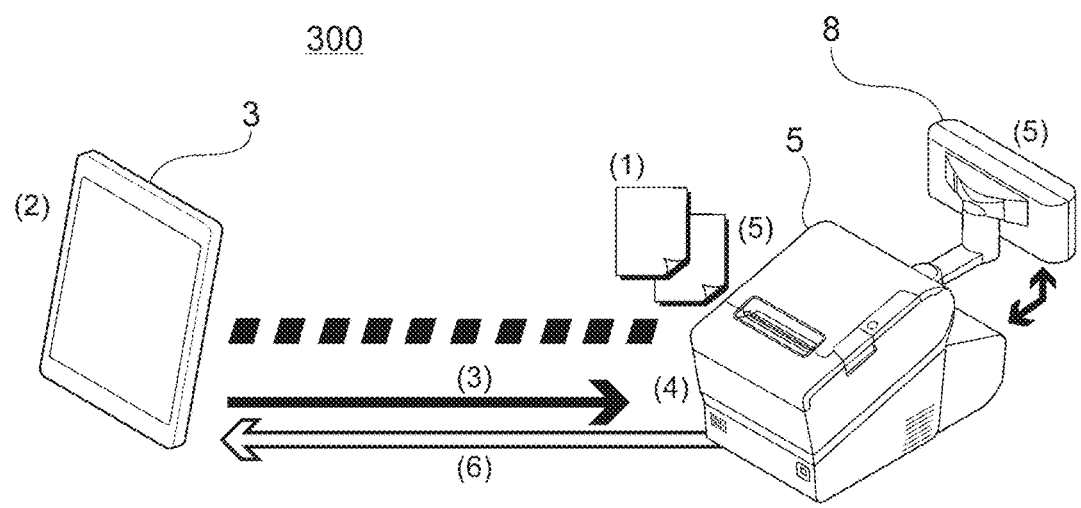
FIG. 3 illustrates a device control system according to a third embodiment of the invention.

FIG. 3 shows the configuration of a device control system 300 according to a third embodiment of the invention. This example uses the device control system 300 as an application server. In this device control system 300, the terminal 3 is connected to the printer 5.

Operation of the device control system 300 is described next.

(1) Place a web application on the printer 5.

(2) Display the web application with the web browser of the terminal 3.

(3) The web browser of the terminal 3 sends a request message to the printer 5.

(4) The printer 5 receives the request message. Based on the received request message, the printer 5 sends data to a device that can be controlled by the printer 5.

(5) The network printer 7, customer display 8, and barcode scanner 9 connected to the printer 5 are controlled.

(6) The printer 5 returns a response to the web application.

In a system applying the invention, a terminal 3 with an installed web browser can thus display a web application and control a device connected to the printer 5.

The configuration of the printer 5 is described next.

The printer 5 has a CPU, RAM, flash ROM, nonvolatile memory, a video controller, an auxiliary storage device (SSD: solid state drive), interface, and a local printer (print unit). The printer 5 could also have a speaker. The local printer is a thermal printer that can print on 80 mm wide or 58 mm wide roll paper.

The printer 5 can be installed in a POS (point of sale) system. The operating system (OS) of the printer 5 is Windows® based, for example, and is stored in the auxiliary storage device.

A device control program, which is software for the terminal 3 to control devices connected to the printer 5, is installed to the printer 5. As a result, installing a driver program to the terminal 3 is not necessary.

The printer 5 also has a Windows® standard device driver program (APD), UPOS driver, OPOS driver, or other software for controlling devices and the local printer of the printer 5.

A web application can be installed to the printer 5. This enables using the printer 5 as an application server as shown in FIG. 3. The web application could, for example, be a PHP and Perl server-side script or SQLite database access script (server-side script).

Figure 4:
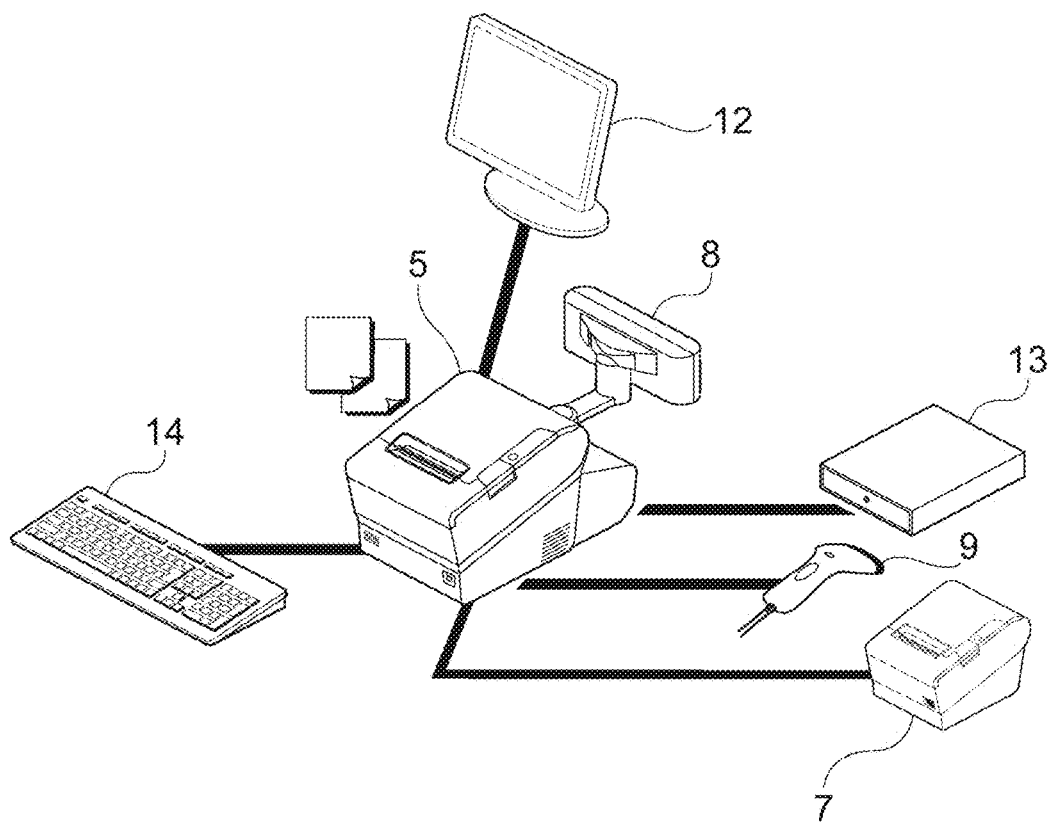
FIG. 4 shows an example of device connections to an intelligent printer.

FIG. 4 shows an example of device connections to the printer 5.

Figure 5:
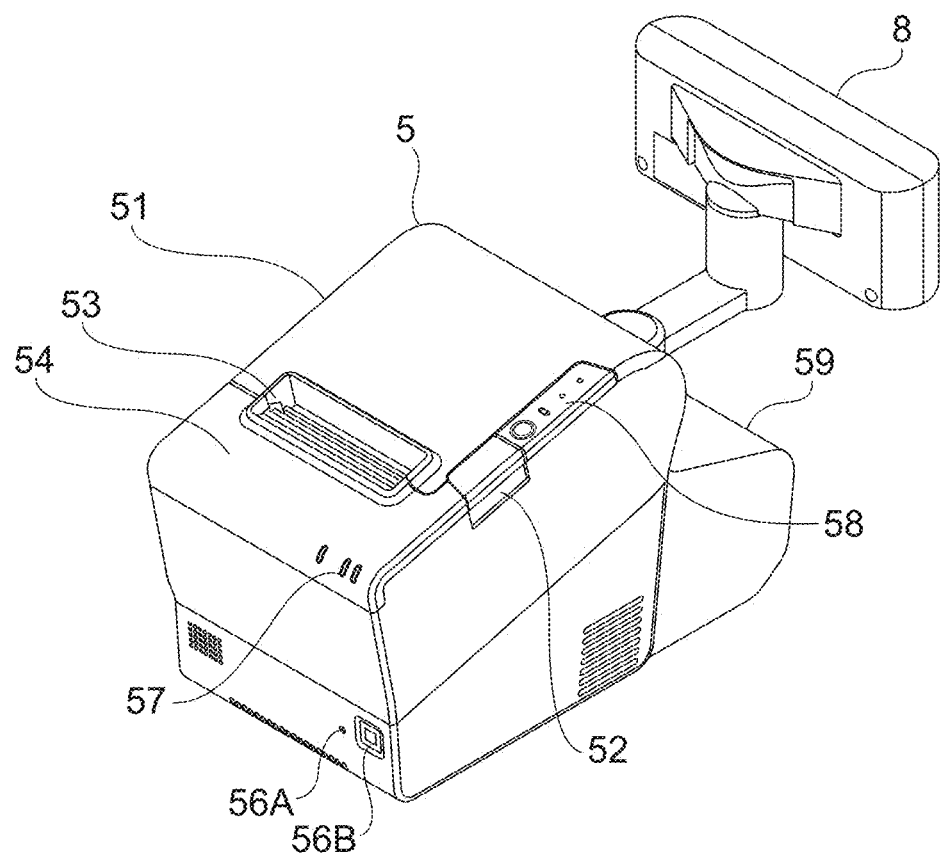
FIG. 5 shows an example of a device connection to an intelligent printer.

The foregoing network printer 7, customer display 8, and barcode scanner 9 can be connected to the printer 5. A display 12, cash drawer 13, and keyboard 14 can also be connected to the printer 5. FIG. 5 shows the external appearance of the printer 5.

A roll paper cover 51 is disposed to the top of the printer 5. The roll paper cover opens when the cover open button 52 is pressed, and roll paper can be loaded. A manual cutter 53 for manually cutting the roll paper, and a cutter cover 54, are disposed to the paper exit from which the roll paper is discharged after printing. The cutter cover 54 is opened when a paper jam occurs in the local printer of the printer 5, and when the roll paper cover 51 does not open. The blade of the manual cutter 53 returns to the home position when the cutter cover 54 opens. The printer 5 also has a power switch 56B, reset button 56A, LED display unit 57, and control panel 58. The LED display unit 57 includes a disc access LED indicating accessing the auxiliary storage device, and status LEDs. The status LEDs report the operating state of the OS, the standby mode of the OS, that the power is off, the OS start-up sequence, and a high CPU temperature warning.

The control panel 58 includes a power LED, error LED, roll paper LED, and paper feed button. The power LED lights when power is supplied. The error LED is off during normal operation, and lights when the printer resets and when the end of the roll paper is detected and printing stops. The paper LED is off when sufficient roll paper remains, lights steady when little paper is left, and blinks when the self-diagnostic test is running. Pressing the feed button advances the roll paper one line at a time or continuously.

A connector cover 59 is disposed to the back of the printer 5. Removing the connector cover 59 exposes the connector panel (connection panel) on the back of the printer 5.

Figure 6:
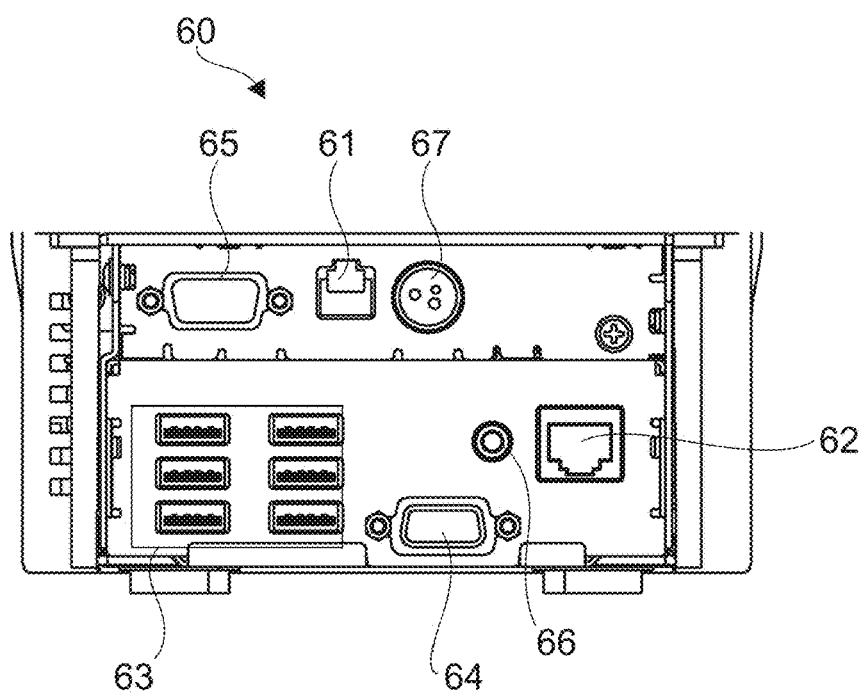
FIG. 6 shows a connector panel.

FIG. 6 shows the connection panel 60. The connection panel 60 includes a drawer kick-out connector 61, Ethernet connector 62, USB connector 63, VGA connector 64, COM connector 65, line output 66, and DC input connector 67. The connection panel 60 is the connection unit of the accompanying claims. However, the local printer 55 incorporated in the printer 5 is also one of the devices connected to the printer 5. The connection unit therefore includes the connection panel 60 and an internal interface of the printer 5.

The cash drawer 13 or an optional buzzer is connected to the drawer kick-out connector 61. The Ethernet connector 62 is connected to the network. The USB connector 63 has six USB ports. The customer display 8, barcode scanner 9, keyboard 14, and other devices are connected to the USB connector 63. The display 12 is connected to the VGA connector 64. A serial interface for serial communication devices connects to the COM connector 65. The line output 66 connects to an external speaker.

Figure 7:
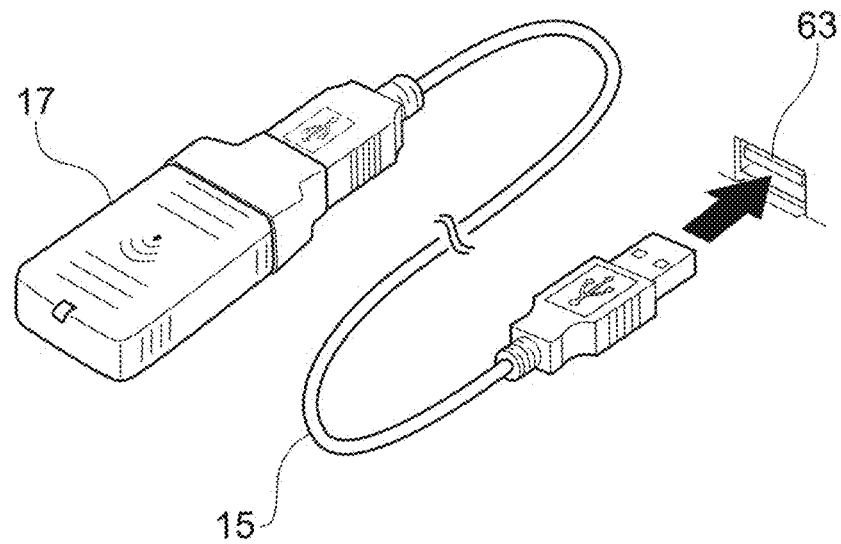
FIG. 7 illustrates connection of a wireless LAN unit.

FIG. 7 illustrates connection of a wireless LAN unit 17. The wireless LAN unit 17 plugs into a USB extension cable 15, and the USB extension cable 15 plugs into the USB connector 63. The printer 5 can thus be connected to a wireless LAN.

An embodiment of the invention is described in detail below using the device control system 100 as an example.

Figure 8:
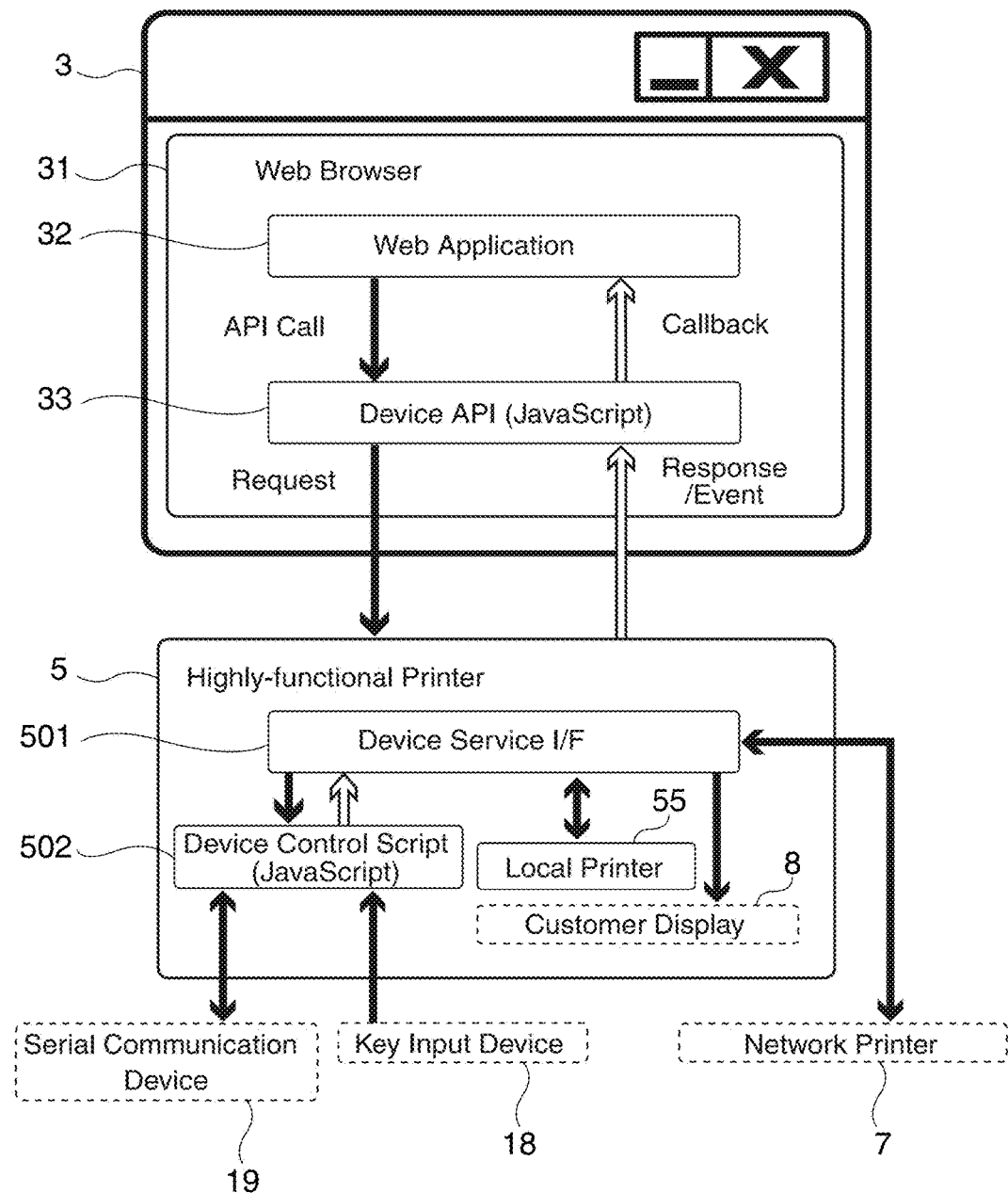
FIG. 8 shows the functional configuration of the device control system.

FIG. 8 illustrates the functional configuration of the device control system 100.

The web browser 31 of the terminal 3 displays a web application 32 provided by the application server 2. The web application 32 calls a device application programming interface (API) 33 of the web browser 31. The device API 33 is, for example, a Java® script, and as described below instantiates an object that controls a device connected to the printer 5. The web application 32 calls (APICall) an object of the device API 33. The device API 33 sends a request (Request) to the printer 5 by a function of the called object.

The device service interface 501 of the printer 5 receives the request, and controls a device control script 502. The device control script 502 controls a key input device 18 and serial communication device 19. The device control script 502 acquires data input by the key input device 18, and outputs data to the device service interface 501. The device control script 502 handles data communication with the serial communication device 19, and outputs data received from the serial communication device 19 to the device service interface 501. The key input device 18 in this example includes the keyboard 14, and the serial communication devices 19 include the barcode scanner 9 and cash drawer 13.

The device service interface 501 exchanges data with the local printer 55. The local printer 55 is the local print unit of the printer 5. The device service interface 501 also exchanges data with the network printer 7 and customer display 8. The device service interface 501 outputs device events (Event) and device responses (Response) to the device API 33. The device API 33 outputs a response (Callback) to the web application 32.

A terminal 3 controls a device connected to a printer 5 in the device control system 100 by the operation described above.

The invention is thus used to control devices (peripherals) connected to a printer 5 in a multi-platform environment. By using this system, devices can be controlled using a personal computer, smartphone, or tablet computer in which a web browser is installed.

The device API 33 has the following features.

Can encrypt the content of device communications.

Devices that operate according to a driver standard to the OS of the printer 5 can be used through the device control script 502 without installing a specific driver on the printer 5. Because the device control script 502 is written in JavaScript®, the device control script 502 can be developed in the same language as the web application 32.

When a device is accessed using the device API 33, the device is automatically exclusively locked. Multiple terminals therefore cannot access and control a device at the same time. When the terminal 3 controlling a device releases the device, the device can then be controlled from another terminal 3.

The device API 33 also has the following features.

Commands that print lines can be used when the network printer 7 or the local printer 55 of the printer 5 supports a line command.

Buzzer functions can be used when the printer 5 or network printer 7 is connected to a buzzer.

Key codes that can be acquired from the keyboard 14 are limited. Key codes that can be acquired from the keyboard 14 are shown in FIG. 9.

Building a device service interface 501 environment is described next.

FIG. 10 shows the flow of work when building an environment.

1. Network Settings

Configure the system and printer 5 network. These settings can be made using the same procedure used for configuring a Windows® network.

2. Register Web Content

Register the web content in the printer 5 from the web browser.

The printer 5 can function as a web server to register web content. The registered web content can be viewed from the web browser 31 of the terminal 3.

The registered web content is compressed to a single file in ZIP format containing all content files. The name of the ZIP file can be specified as desired. The ZIP filename and subfolder names are written using ASCII characters.

Web content cannot be appended, and all files are registered by overwriting the old files. When accessing web content registered in the printer 5 from the terminal 3, for example, the URL that is accessed differs according to the folder structure of the ZIP file. Specific examples are shown in FIGS. 11 (1) and (2).

3. Connect a Device to the Printer 5

Connect a device to the printer 5. As described above, connectable devices include the customer display 8, barcode scanner 9, display 12, cash drawer 13, and keyboard 14. Also included are devices that can be controlled by a HID driver standard to the OS, serial communication devices that can be operated using a serial communication driver standard to the OS, and USB devices that can be controlled in the same way as serial communication devices. The connection panel 60 in FIG. 6 shows only one COM connector 65, but plural serial communication devices can be connected if a serial-USB conversion cable is used and the driver program is compatible with serial-USB conversions.

4. Register Device Control Script

A device control script prepared by the user is registered in order for the printer 5 to control devices other than products with which the printer 5 is compatible. Registration is done from the web browser.

5. Register Device

Register the device connected to the printer 5 in the printer 5 software. Registration is done from the web browser.

The web browser used for steps 1 to 5 includes the web browser 31.

The method of registering web content in step 2 is described in detail.

Figure 12:
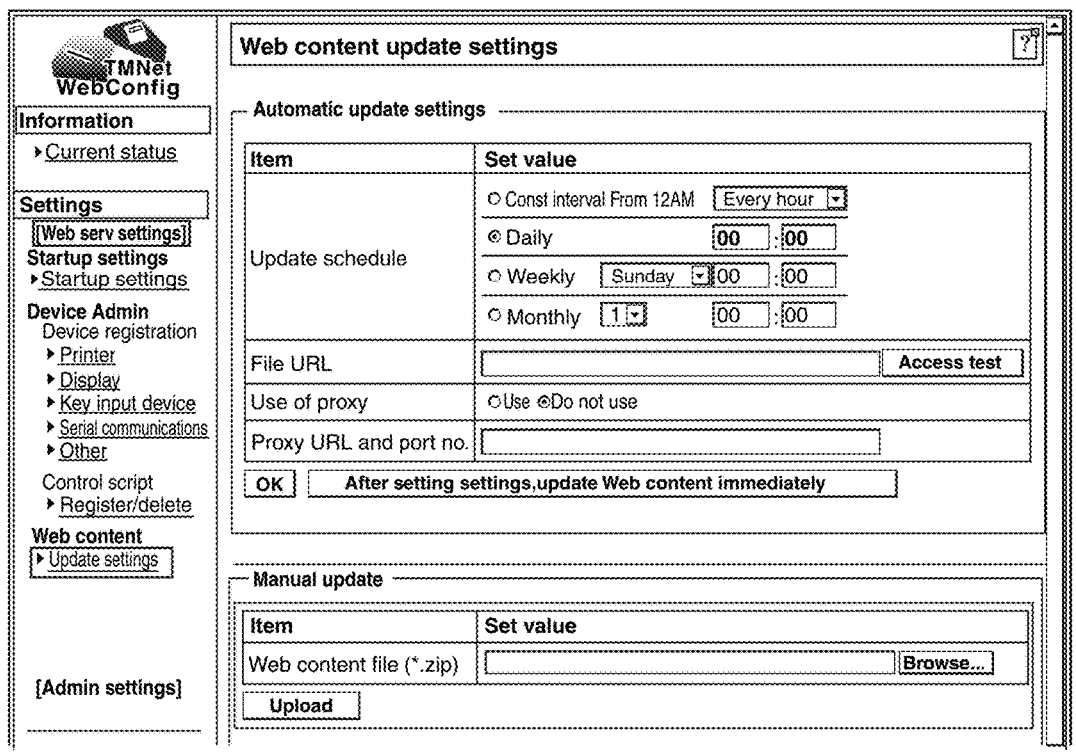
FIG. 12 shows a method of registering web content.

The web content registration file is registered by the web browser displaying the TMNetWebConfig utility as shown in FIG. 12.

The registration steps are as follow.

(1) Combine the web content to register in a single ZIP file.

(2) Turn the printer 5 power on.

(3) Start the web browser, and input the URL (http://IP address of printer 5/TMNetWebConfig/).

(4) The TMNetWebConfig utility starts. Click on [Web service settings]-[Update settings] in the window shown in FIG. 11.

(5) The Web Content Update Settings screen is displayed. Click on [Browse] in the web content file field, and select the ZIP file containing the web content that was prepared in step (1).

(6) Click [Upload].

Registering a device control script in step 4 is described in detail.

Figure 13:
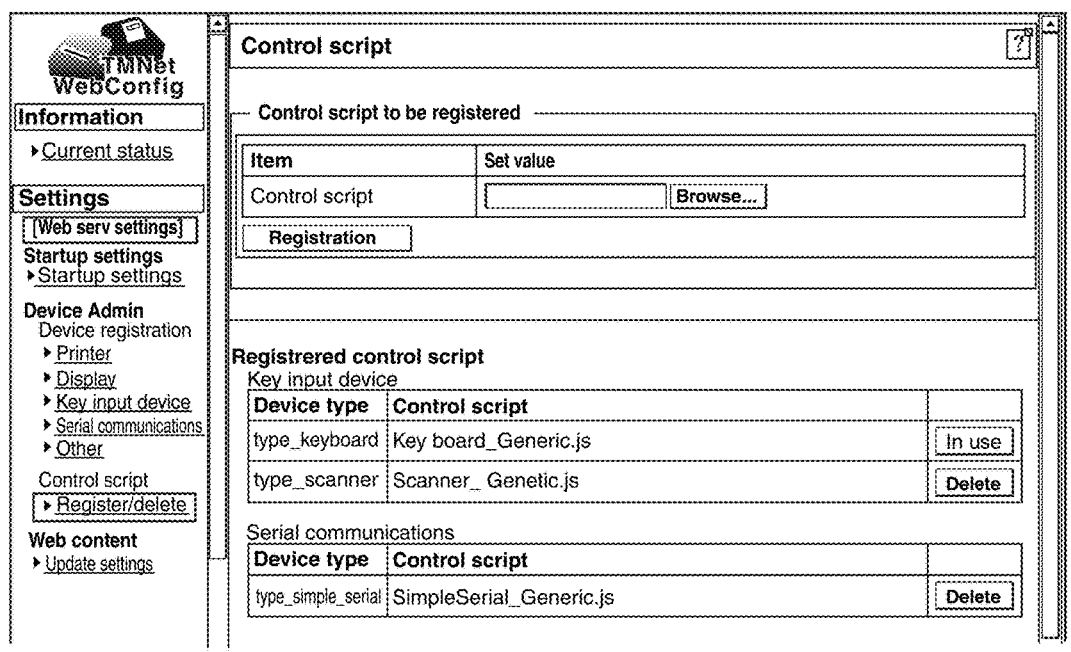
FIG. 13 shows a method of registering a device control script.

The device control script prepared by the user is registered by the web browser displaying the TMNetWebConfig tool as shown in FIG. 13. This method enables the user to connect a prepared device to the printer 5 and control the device, and enables the user to develop and register a device control script to customize device data processing.

The registration steps are as follow.

(1) Prepare a customized device control script.

(2) Turn the printer 5 power on.

(3) Start the web browser, and input the URL (http://IP address of printer 5/TMNetWebConfig/).

(4) Start the TMNetWebConfig utility. Click on [Web service settings]-[Register/delete] in the window shown in FIG. 12.

(5) The Control Script screen is displayed. Click on [Browse] in the Control script to be registered field, and select the device control script to register.

(6) Click [Register]. The device control script is registered and listed in the Registered control scripts field in the bottom of the window.

Registering a device in step 5 is described in detail.

Figure 14:
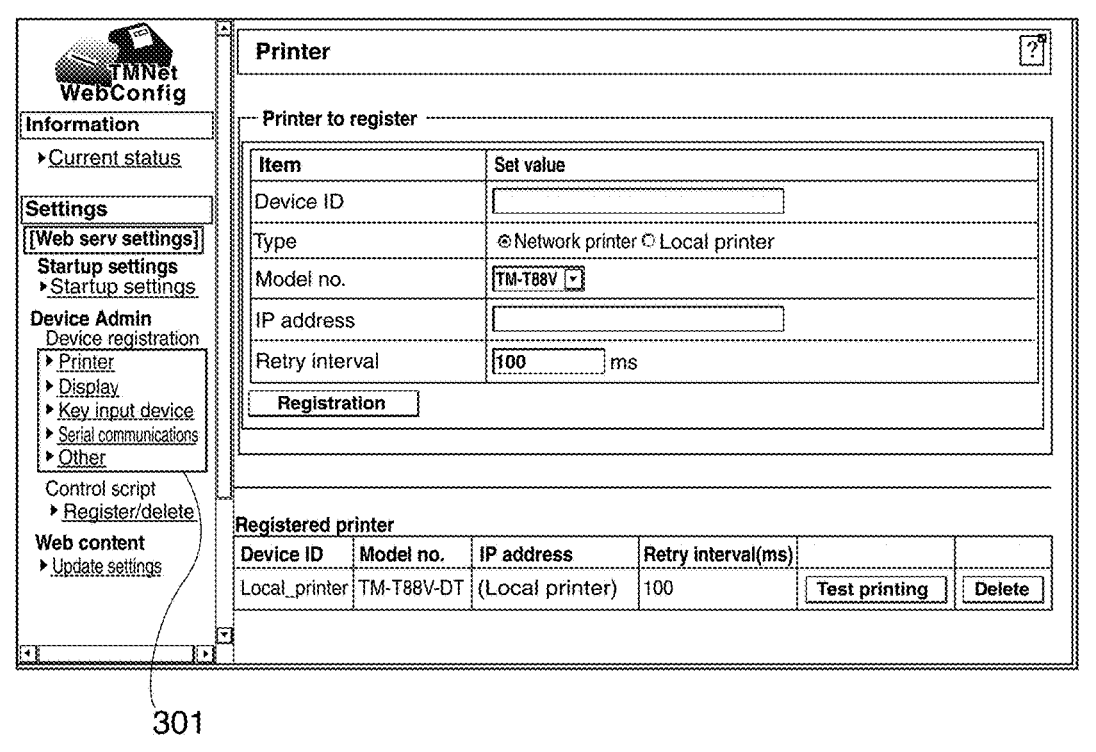

A device is registered by the web browser displaying the TMNetWebConfig tool as shown in FIG. 14.

The registration steps are as follow.

(1) Start the web browser, and input the URL (http://IP address of printer 5/TMNetWebConfig/).

(2) Start the TMNetWebConfig utility. From [Web service settings]-[Device registration] in the window shown in FIG. 14, click on the type of device to register. A device list 301 is displayed under Device registration in the screen shown in FIG. 14. Click on the type of device to register from the device list 301. The type of device in this embodiment can be selected from five types, printer, display, key input device, serial communication device, and other as shown in FIG. 15. Details about the types of devices are as shown in FIG. 15.

(3) A configuration screen is displayed for each device. The connected device is registered in the printer 5.

(3-1) To register a printer

Registration of the local printer incorporated in the printer 5 can be confirmed as follows.

(3-1-1) Check that "printer 5" is registered for the device ID "local_printer" in the Registered Printer field in the screen shown in FIG. 14.

(3-1-2) Click on [Test printing]. Check that TEST_PRINT is printed by the local printer.

(3-1-3) Register the connected network printer 7.

Register the network printer 7 by the following steps.

(3-1-3-1) Set the items shown in FIG. 16 (device ID, type, model number, IP address, retry interval), and click [Register].

(3-1-3-2) After confirming the printer is added to the Registered Printer list, click [Test printing]. Confirm that TEST_PRINT is printed by the registered network printer 7.

(3-2) To register a display (customer display 8)

The device ID of the customer display is a constant, "local_display". Register the connected customer display 8 by the following steps.

(3-2-1) Select Use in the screen shown in FIG. 14.

(3-2-2) Set the items (communication settings, brightness settings) in FIG. 17, and click [Register].

(3-2-3) Click [Test display]. Confirm that text is displayed on the customer display 8.

(3-3) To register a key input device 18

Register the connected key input device 18 by the following steps.

(3-3-1) Set the items (device ID, device name, control script) in FIG. 18, and click [Register].

(3-3-2) After confirming the registered device was added to the Registered Key Input Device field, click [Operating test].

(3-3-3) A screen will be displayed by the web browser. Operate the key input device 18, and confirm that the result is displayed as operated.

(3-4) To register a serial communication device 19

Register the connected serial communication device 19 by the following steps.

(3-4-1) Set the items (device ID, device name, control script, communication speed, data bit, parity, stop bit, flow control) shown in FIG. 19 for the connected serial communication device 19, and click [Register].

(3-4-2) Confirm that the device is added to the Registered Serial Communication Device field.

(3-5) To register another device

Register another connected device by the following steps.

(3-5-1) Set the items (device ID, control script) shown in FIG. 20 for the connected device, and click [Register].

(3-5-2) Confirm that the device is added to the Registered Other Devices field.

The programming method for developing an application using the device API 33 is described next.

The device API 33 is embedded as follows.

The device API 33 is provided to enable using the device control function of this system from a client-side JavaScript. The device API 33 is written in JavaScript. An example of a filename is device-*.js.

First, embed the device-*.js file in the application for use.

In preparation, place the device-*.js file on the web server to use the device API 33.

Next, embed the script in the web page. Embed the script in the web page using the HTML <script> tag.

(Sample tag)
<scripttype="text/javascript"src="device-1.0.0.js">
</script>

Figure 21:
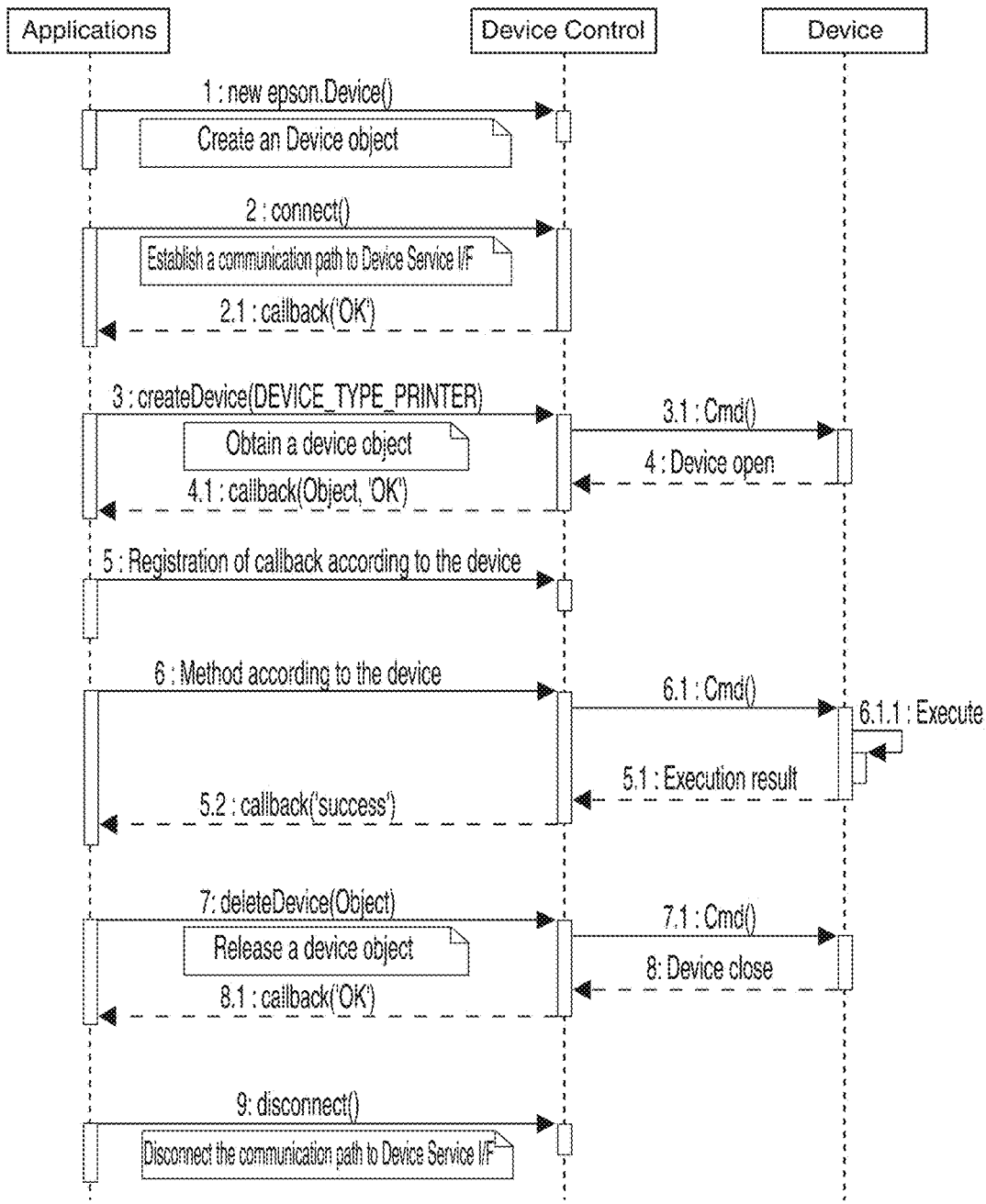
FIG. 21 shows the programming flow.

The programming flow is shown in FIG. 21.

Applications in FIG. 21 corresponds to a web application 32, Device Control corresponds to a device control function (device API 33 and device service interface 501), and Device denotes the controlled device.

1: Web application 32 sends the "newEpsonDevice( )" command, and a device object is instantiated.

2: Web application 32 sends the "Connect( )" command, and establishes a communication path to the device control function.

2.1: The device control function returns "Callback(OK)".

3: Web application 32 sends the "CreateDevice(DE-VICE_ TYPE_PRINTER)" command.

3.1: Device service interface 501 sends the "Cmd( )" command to the device.

4: Device returns "Deviceopen".

4.1: Device control function returns "callback(Object, 'OK')".

Web application 32 gets a device object by steps 3 to 4.1.

5: Web application 32 registers a callback according to the device.

6: Web application 32 calls a method according to the device.

6.1: "Cmd( )" command is sent to the device.

6.1.1: Device executes the command.

5.1: Device returns the result of command execution.

5.2: Device control function returns "callback ('success')".

7: Web application 32 sends "deleteDevice(Object)", and releases the device object.

7.1: "Cmd( )" command is sent to the device.

8: Device returns device closed.

8.1: Device control function returns "callback('OK')".

9: Web application 32 sends "disconnect( )" command, closes communication link to device service interface 501.

The device API 33 is described in detail next.

The device API 33 provides the following objects.

Device object (FIG. 22)
Common to Device Object (FIG. 23)
Display object (FIG. 24)
Keyboard object (FIG. 25)
Printer object (FIG. 26A, FIG. 26B, FIG. 26C)
Scanner object (FIG. 27)
SimpleSerial object (FIG. 28)

The Device object is described in detail.

Constructor

Constructor of a Device object. Instantiates and initializes a Device object.

[Syntax]
Device( );
[Return value]
Device object connect method

Establishes communication link to device service interface 501.

[Syntax]
connect (ipAddress, port, callback);
[Parameters]
ipAddress:object type: (String)
Specifies the IP address of☐ printer 5.
port: object type: (Number)
Specifies 8008 (port number of device service interface 501).
callback: object type: (Function)
Specifies the callback that receives the process result. A string shown in FIG. 28 is returned in the first parameter of the callback.

disconnect method

Closes the communication path established by the connect method.

[Syntax]
disconnect( );

isConnect method

Obtains the status of the communication path established by the connect method.

[Syntax]
isConnect( );
[Return value]
The return value is the status of the communication path as shown in FIG. 30.

The deviceAP object is described in detail.

createDevice method

Gets a device object to act as the interface to the device.

When this method executes successfully, the specified device is exclusively locked, and DEVICE_IN_USE is returned when createDevice is called from another browser. Because the printer is not exclusively locked, a device object can be obtained by createDevice from plural browsers.

If createDevice is executed immediately during a return process after an ondisconnect event, DEVICE_IN_USE is returned. In this event, the createDevice method retries until a value other than DEVICE_IN_USE is obtained.

[Syntax]
createDevice (deviceId, deviceType, crypto, callback);
[Parameters]
deviceId: object type: (String)
Specifies the device ID.
Declare "local_display" when DEVICE_TYPE_DIS-PLAY is specified in the second parameter (deviceType).
deviceType: object type: (String)
Specifies any device type shown in FIG. 31.
crypto: object type: (Boolean)
Specifies whether or not to encrypt communications data.
callback: object type: (Function)
Specifies the callback that receives the process result. If the second parameter of the callback is OK, the device object is returned in the first parameter. The second parameter is a string shown in FIG. 32.

deleteDevice method

Releases a device for use by another client.

[Syntax]
deleteDevice (deviceObject, callback);
[Parameters]
deviceObject: object type: (Object)
Specifies the device object.
callback: object type: (Function)
Specifies the callback that receives the process result. The parameter of the callback is a string shown in FIG. 33.

getAdmin method

Obtains the administrator set in the printer 5. (The administrator can be set using the TMNetWebConfig utility.

[Syntax]
getAdmin( );
[Return value]
String of administrator's name (String)

getLocation method

Gets the installation location value set in the printer 5. The location string can be set using the TMNetWebConfig utility.

[Syntax]
getLocation( );
[Return value]
String of the installation location (String)
ondisconnect event
Obtains failure of the reconnect process. When this event occurs, a process for handling the network disconnection, such as establishing a connection again, is executed.
[Syntax]
Function( )
The Common to Device Object object is described next.
callEvent method
Calls any event on the device control script 502 side corresponding to the device object. Details about device control script 502 events are described below in the description of the device control script 502.
[Syntax]
callEvent (eventName, data);
[Parameters]
eventName:object type: (String)
Specifies the event name on the device control script side.
data: object type: (Object)
Specifies the data passed to the called event.
Simple JSON data comprising a property name and value set can be declared.
The Display object is described next.
reset method
Adds the initialization settings of the customer display 8 to the command buffer. Initialization results in the following.
  All displayed characters are deleted, and all registered windows are cleared.
  Cursor returns to default state and moves to the home position on the display.
  Display blinking and display brightness return to the default settings.
[Syntax]
reset( );
[Return value]
Display object
createWindow method
Adds window settings to the command buffer. Windows are defined to not overlap previously defined windows. A window size that fits in the size of the display (20 columns× 20 rows) is specified.
[Syntax]
createWindow (number, x, y, width, height, scrollMode);
[Parameters]
number: object type: (Number)
Specifies a window number in the range 1 to 4.
x: object type: (Number)
Specifies the x-coordinate of the window origin on the display. Specify a value from 1 to 20.
y: object type: (Number)
Specifies the y-coordinate of the window origin on the display. Specify 1 or 2.
width: object type: (Number)
Specifies the width of the window.
height: object type: (Number)
Specifies the height of the window.
scrollMode: object type: (String)
Specifies the scrolling mode of the window. Select from the parameters shown in FIG. 34.
[Return value]
Display object
destroyWindow method
Adds the destroy setting of a defined window to the command buffer.
[Syntax]
destroyWindow (number);
[Parameters]
number: object type: (Number)
Specifies the number of the window to destroy. Specify a number from 1 to 4.
[Return value]
Display object
setCurrentWindow method
Adds a setting to change the current window to the command buffer. Makes the specified window the current window, and then moves the cursor to the origin of the current window.
[Syntax]
setCurrentWindow (number);
[Parameters]
number: object type: (Number)
Specifies the number of the window to switch to. Specify a number from 1 to 4.
[Return value]
Display object
clearWindow method
Adds a command to clear the current window to the command buffer.
[Syntax]
clearWindow( );
[Return value]
Display object
setCursorPosition method
Adds a cursor position setting to the command buffer.
[Syntax]
setCursorPosition (x, y);
[Parameters]
x: object type: (Number)
Specifies the x-coordinate of the destination. Specify a value from 1 to 20.
y: object type: (Number)
Specifies the y-coordinate of the destination. Specify 1 or 2.
[Return value]
Display object
moveCursorPosition method
Adds the cursor position settings in the current window to the command buffer.
[Syntax]
moveCursorPosition (position);
[Parameters]
position: object type: (String)
Specifies the destination of the cursor in the current window. Select from the parameters shown in FIG. 35.
[Return value]
Display object
setCursorType method
Adds the cursor display settings to the command buffer.
[Syntax]
setCursorType (type);
[Parameters]
type: object type: (String)
Specifies the cursor display method. Select from the parameters shown in FIG. 36.
[Return value]
Display object
addText method
Adds string display to the command buffer.
[Syntax]
addText (data);
addText (data, lang);

addText (data, x, y);
addText (data, x, y, lang);
[Parameters]
data: object type: (String)
Specifies the string to be displayed.
lang: object type: (String)
Specifies the display language of the string. Select from the strings shown in FIG. 37.
x: object type: (Number)
Specifies the x-coordinate of the display position. Specify a value from 1 to 20.
y: object type: (Number)
Specifies the y-coordinate of the display position. Specify 1 or 2.
[Return value]
Display object
addReverseText method
Adds reversed string display to the command buffer.
[Syntax]
addReverseText (data);
addReverseText (data, lang);
addReverseText (data, x, y);
addReverseText (data, x, y, lang);
[Parameters]
data: object type: (String)
Specifies the string to be displayed.
lang: object type: (String)
Specifies the display language of the string. Select from the strings shown in FIG. 38.
x: object type: (Number)
Specifies the x-coordinate of the display position. Specify a value from 1 to 20.
y: object type: (Number)
Specifies the y-coordinate of the display position. Specify 1 or 2.
[Return value]
Display object
addMarquee method
Adds a marquee display to the command buffer. The marquee is displayed in the horizontal scroll mode on one line regardless of the scroll mode setting of the display window.
[Syntax]
addMarquee (data, format, unitWait, repeatWait, repeatCount, lang);
[Parameters]
data: object type: (String)
Specifies the string to be displayed.
format: object type: (String)
Specifies the string display method. Select from FIG. 39.
unitWait: object type: (Number)
Specifies the display interval (ms) for each character. A value from 1 to 2000 can be set.
repeatWait: object type: (Number)
Specifies the interval (ms) for repeating the string display. A value from 1 to 2000 can be set.
repeatCount: object type: (Number)
Specifies the number of times to repeat the string display. A value from 0 to 127 can be set. Display repeats indefinitely if 0 is specified.
lang: object type: (String)
Specifies the display language of the string. Select from the strings shown in FIG. 40.
[Return value]
Display object
setBlink method
Adds the screen blinking settings to the command buffer.

[Syntax]
setBlink (interval);
[Parameters]
interval: object type: (Number)
Specifies the blinking interval (ms). Specify a number from 0 to 12700. The specified setting is rounded in 50 ms increments. The display lights steady when 0 is specified.
[Return value]
Display object
setBrightness method
Adds the display brightness setting to the command buffer.
[Syntax]
setBrightness (brightness);
[Parameters]
brightness: object type: (Number)
Specifies the display brightness setting. Select from the parameters shown in FIG. 41.
[Return value]
Display object
showClock method
Adds a clock display to the command buffer.
When the clock is displayed, all displayed strings are cleared. Clock display ends if another command is sent while the clock is displayed.
[Syntax]
showClock( );
[Return value]
Display object
addCommand method
Adds a command to the command buffer.
[Syntax]
addCommand (data);
[Parameters]
data: object type: (String)
Specifies an ESC/POS command as a string. The command string is separated by "¥x". Example: "¥x1B¥x40"
[Return value]
Display object
send method
Sends the command in the command buffer.
[Syntax]
send( );
onreceive event
Receives the command execution results.
[Syntax]
Function (response);
[Parameters of the callback function]
response: object type: (Object)
Receives the result of command execution. The properties shown in FIG. 42A are included. Success values are shown in FIG. 42B; code values are shown in FIG. 42C.
The Keyboard object is described next.
setPrefix method
Specifies the key code used to detect the beginning of a string when keyboard input is received as a batch of strings.
[Syntax]
setPrefix (data);
[Parameters]
data: object type: (Array)
Specifies the key code array. The key codes are as shown in the key code list in FIG. 9, for example.
onkeypress event
Receives a key press event.

[Syntax]
Function (data);
[Parameters of the callback function]
data: object type: (Object)
Receives the properties shown in FIG. 43.
onstring event
Receives a string of character input starting with any character combination specified by setPrefix and ending when the Enter key is detected.
[Syntax]
Function (data);
[Parameters of the callback function]
data: object type: (Object)
Receives the properties shown in FIG. 44.
The Printer object is described next.
addTextAlign method
Adds the text alignment setting to the command buffer.
This API setting also applies to barcodes and 2D symbols.
To set text rotation when the print mode is set to the page mode, use the addPageDirection method described below instead of this API.
[Syntax]
addTextAlign (align);
[Parameters]
align (Required parameter, object type: String)
Specifies the text alignment.
Constants are shown in FIG. 45A, return values in FIG. 45B, and exceptions in FIG. 45C.
addTextLineSpace method
Adds the line feed distance setting to the command buffer.
[Syntax]
addTextLineSpace (linespc);
[Parameters]
linespc: (Required parameter, object type: Number)
Specifies the line feed distance (in dots). Specify an integer from 0 to 255.
The return value is shown in FIG. 46A, exceptions in FIG. 46B.
addTextRotate method
Adds the text rotation setting to the command buffer.
This API setting also applies to barcodes and 2D symbols.
To set text rotation when the print mode is set to the page mode, use the addPageDirection method described below instead of this API.
[Syntax]
addTextRotate (rotate);
[Parameters]
rotate (Required parameter, object type: Boolean)
Specifies whether or not to rotate text.
Settings are shown in FIG. 47A, return values in FIG. 47B, exceptions in FIG. 47C.
addText method
Adds printing text to the command buffer.
To print content other than text after printing text, execute a line feed or paper feed.
In the page mode, characters are printed from the current character position referenced to the baseline dot of the character (see appendix on page 141).
[Syntax]
addText (data);
[Parameters]
data (Required parameter, object type: String)
Specifies a character string to be printed.
For the horizontal tab/line feed, use the escape sequences shown in FIG. 48A.

Return values are shown in FIG. 48B, and exceptions in FIG. 48C.
addTextLang method
Adds the language setting to the command buffer.
[Syntax]
addTextLang (lang);
[Parameters]
lang: (Required parameter, object type: String)
Specifies the target language as shown in FIG. 49A. The printable character codes depend upon the printer specifications.
Return values are shown in FIG. 49B, exceptions in FIG. 49C.
addTextFont method
Adds the character font setting to the command buffer.
[Syntax]
addTextFont (font);
[Parameters]
font: (Required parameter, object type: String)
Specifies the font as shown in FIG. 50A.
The return values are shown in FIG. 50B, exceptions in FIG. 50C.
addTextSmooth method
Adds a text smoothing setting to the command buffer.
[Syntax]
addTextSmooth (smooth);
[Parameters]
smooth: (Required parameter, object type: Boolean)
Specifies whether to apply text smoothing.
The return values are shown in FIG. 51B, exceptions in FIG. 51C.
addTextDouble method
Adds a double-size text setting to the command buffer.
[Syntax]
addTextDouble (dw, dh);
[Parameters]
dw: (Optional parameter, object type: Boolean)
Specifies the double-size width. Settings are shown in FIG. 52A.
dh (Optional parameter, object type: Boolean)
Specifies the double-size height.
When both dw and dh parameters are set to ture/1, double width and double height characters are printed. Settings are shown in FIG. 52B.
The return values are shown in FIG. 52C, exceptions in FIG. 52D.
addTextSize method
Adds the text scaling setting to the command buffer.
[Syntax]
addTextSize (width, height);
[Parameters]
width: (Optional parameter, object type: Number)
Specifies the horizontal scaling. Settings are shown in FIG. 53A.
height (Optional parameter, object type: Number)
Specifies the vertical scaling. Settings are shown in FIG. 53B.
The return values are shown in FIG. 53C, exceptions in FIG. 53D.
addTextStyle method
Adds a text styling setting to the command buffer.
[Syntax]
addTextStyle (reverse, ul, em, color);
[Parameters]
reverse: (Optional parameter, object type: Boolean)
Specifies black/white inversion for text. Settings are shown in FIG. 54A.
ul (Optional parameter, object type: Boolean)
Specifies underlining. Settings are shown in FIG. 54B.

em (Optional parameter, object type: Boolean)

Specifies bold text. Settings are shown in FIG. 54C.

color (Optional parameter, object type: String)

Specifies the text color. Settings are shown in FIG. 53D.

The return values are shown in FIG. 54E, exceptions in FIG. 54F.

addTextPosition method

Adds the horizontal print start position to the command buffer.

[Syntax]

addTextPosition (x);

[Parameters]

x: (Required parameter, object type: Number)

Specifies the horizontal print start position (in dots). Specify an integer from 0 to 65535.

The return values are shown in FIG. 55A, exceptions in FIG. 55B.

addFeedUnit method

Adds paper feeding in dot units to the command buffer.

[Syntax]

addFeedUnit (unit);

[Parameters]

unit: (Required parameter, object type: Number)

Specifies the paper feed distance (in dots). Specify an integer from 0 to 255.

The return values are shown in FIG. 56A, exceptions in FIG. 56B.

addFeedLine method

Adds paper feeding in line units to the command buffer.

[Syntax]

addFeedLine (line);

[Parameters]

line: (Required parameter, object type: Number)

Specifies the paper feed distance (in lines). Specify an integer from 0 to 255.

The return values are shown in FIG. 57A, exceptions in FIG. 57B.

addImage method

Adds raster image printing to the command buffer.

Prints graphics rendered in HTML5Canvas.

Converts the specified range in a RGBA full-color HTML5 Canvas image to raster image data according to the halftone property and brightness property settings. One pixel in an image equals one printer dot. When an image includes a transparent color, the background of the image is assumed to be white.

To print a raster image at high speed, specify ALIGN LEFT for the addTextAlign method described above, and set the width parameter of this API to a multiple of 8 not exceeding the paper width of the printer.

In page mode, a raster image is printed at the current print position referenced to the bottom left dot of the raster image. The print position does not move.

HTML5 Canvas images containing images downloaded from a different domain cannot be printed. A security error is returned in accordance with JavaScript's same-origin policy.

[Syntax]

addImage (context, x, y, width, height, color, mode);

[Parameters]

context: (Required parameter, object type: Context)

Specifies the HTML5Canvas 2D context.

x: (Required parameter, object type: Number)

Specifies the horizontal starting position of the print area. Specify an integer from 0 to 65535.

y: (Required parameter, object type: Number)

Specifies the vertical starting position of the print area. Specify an integer from 0 to 65535.

width: (Required parameter, object type: Number)

Specifies the width of the print area. Specify an integer from 0 to 65535.

height: (Required parameter, object type: Number)

Specifies the height of the print area. Specify an integer from 0 to 65535.

color: (Optional parameter, object type: String)

Specifies the color. Settings are shown in FIG. 58A.

mode (Optional parameter, object type: String)

Specifies the color mode. Settings are shown in FIG. 58B.

The return values are shown in FIG. 58C, exceptions in FIG. 58D.

addLogo method

Adds printing a logo stored in nonvolatile memory to the command buffer.

Prints a logo stored in nonvolatile memory in the printer.

The logo is previously registered in the printer using a model-specific utility or a logo registration utility (TM-FLogo).

In page mode, a logo is printed from the current printing position referenced to the bottom left dot of the logo.

[Syntax]

addLogo (key1, key2);

[Parameters]

key1 (Required parameter, object type: Number)

Specifies key code 1 of a logo in nonvolatile memory. Specify an integer from 0 to 255.

key2 (Required parameter, object type: Number)

Specifies key code 2 of a logo in nonvolatile memory. Specify an integer from 0 to 255.

The return values are shown in FIG. 59A, exceptions in FIG. 59B.

addBarcode method

Adds barcode printing to the command buffer.

In page mode, the barcode is printed from the current print position referenced to the bottom left dot (except for HRI) of the barcode.

[Syntax]

addBarcode (data, type, hri, font, width, height);

[Parameters]

data (Required parameter, object type: String)

Specifies the barcode data as a string. Barcode types are shown in FIG. 60A, FIG. 60B, and FIG. 60C.

To specify binary data that cannot be expressed by a character string, use the escape sequences in FIG. 60D.

type (Required parameter, object type: String)

Specifies the barcode type. Constants are shown in FIG. 60E.

hri (Optional parameter, object type: String)

Specifies the HRI position. Constants are shown in FIG. 60F.

font (Optional parameter, object type: String)

Specifies the HRI font. Constants are shown in FIG. 60G.

width (Optional parameter, object type: Number)

Specifies the width of one module in dots. Specify an integer from 2 to 6.

height (Optional parameter, object type: Number)

Specifies the barcode height in dots. Specify an integer from 1 to 255.

The return values are shown in FIG. 60H, exceptions in FIG. 60I.

addSymbol method

Adds 2D symbol ping to the command buffer.

In page mode, the barcode is printed from the current printing position referenced to the bottom left dot of the 2D symbol.

[Syntax]
addSymbol (data, type, level, width, height, size);
[Parameters]
data (Required parameter, object type: String)
Specifies the 2D symbol data as a character string. 2D code types are shown in FIG. 61A and FIG. 61B.
Specifies an escape sequence shown in FIG. 61C to pass binary data that cannot be expressed by a character string.
type (Required parameter, object type: String)
Specifies the type of the two-dimensional symbol. Constants are shown in FIG. 61D.
level (Optional parameter, object type: String)
Specifies the error correction level. Constants are shown in FIG. 61E.
The error correction level is selected according to the type of two-dimensional symbol. LEVEL DEFAULT is selected for MaxiCode and two-dimensional GS1DataBar symbols.
width (Optional parameter, object type: Number)
Specifies the module width. Specify an integer from 0 to 255. This parameter is ignored for MaxiCode symbols.
height (Optional parameter, object type: Number)
Specifies the module height. Specify an integer from 0 to 255. This parameter is ignored for QRCode and MaxiCode symbols.
size (Optional parameter, object type: Number)
Specifies the maximum size of the two-dimensional symbol. Specify an integer from 0 to 65535. This parameter is ignored for QRCode and MaxiCode symbols.
The return values are shown in FIG. 61F, exceptions in FIG. 61G.

addHLine method
Adds horizontal line printing to the command buffer. Draws horizontal lines. Cannot be used in page mode.
[Syntax]
addHLine (x1, x2, style);
[Parameters]
x1: (Required parameter, object type: Number)
Specifies the start position of the horizontal line (in dots). Specify an integer from 0 to 65535.
x2: (Required parameter, object type: Number)
Specifies the end position of the horizontal line (in dots). Specify an integer from 0 to 65535.
style: (Optional parameter, object type: String)
Specifies the type of line. Constants are shown in FIG. 62A.
The return values are shown in FIG. 62B, exceptions in FIG. 62C.

addVLineBegin method
Adds the beginning of a vertical line to the command buffer. Starts drawing vertical lines. Cannot be used in page mode. Vertical lines are drawn until the end is specified by addVLineEnd. This API function is used together with the addVLineEnd method.
[Syntax]
addVLineBegin (x, style);
[Parameters]
x (Required parameter, object type: Number)
Specifies the start position of the vertical line (in dots). Specify an integer from 0 to 65535.
style (Optional parameter, object type: String)
Specifies the type of line. Constants are shown in FIG. 63A.
The return values are shown in FIG. 63B, exceptions in FIG. 63C.

addVLineEnd method
Adds the end of a vertical line to the command buffer. Finishes drawing vertical lines. Cannot be used in page mode. This API is used together with the addVLineBegin method described above.
[Syntax]
addVLineEnd (x, style);
[Parameters]
x (Required parameter, object type: Number)
Specifies the end position of the vertical line (in dots). Specify an integer from 0 to 65535.
style (Optional parameter, object type: String)
Specifies the type of line to stop drawing. Constants are shown in FIG. 64A.
The return values are shown in FIG. 64B, exceptions in FIG. 64C.

addPageBegin method
Adds starting the page mode to the command buffer. Page mode processing starts.
Vertical lines are processed in page mode until the page mode is ended by the PageEnd method described below. This API is used together with the PageEnd method.
[Syntax]
addPageBegin( );
The return values are shown in FIG. 65.

addPageEnd method
Adds the end of the page mode to the command buffer. Processing in page mode ends. This API is used together with the addPageBegin method described above.
[Syntax]
addPageEnd( );
The return values are shown in FIG. 66.

addPageArea method
Adds the page mode print area to the command buffer. Specifies the page mode print area (coordinates). After this API function, specify a print data API function such as the addText method.
The print area is specified according to the content to be printed. If the print data extends beyond the print area, the print data will not be completely printed in the printout. This API is used between the above addPageBegin method and the above PageEnd method.
[Syntax]
addPageArea (x, y, width, height);
[Parameters]
x (Required parameter, object type: Number)
Specifies the origin of the horizontal axis (in dots). Specify an integer from 0 to 65535. 0 is at the left edge of the printable area of the printer.
y (Required parameter, object type: Number)
Specifies the origin of the vertical axis (in dots). Specify an integer from 0 to 65535. 0 is the position without feeding the paper.
width (Required parameter, object type: Number)
Specifies the width of the print area (in dots). Specify an integer from 0 to 65535.
height (Required parameter, object type: Number)
Specifies the height of the print area (in dots). Specify an integer from 0 to 65535.
The width and height of the print area are determined according to the print direction setting. The print data may otherwise not be completely printed.
The return values are shown in FIG. 67A, exceptions in FIG. 67B.

addPageDirection method
Adds the page mode print direction setting to the command buffer. Specifies the print direction in page mode. This function can be omitted if rotation is not required. This API is used between the above addPageBegin method and the PageEnd method.

[Syntax]

addPageDirection (dir);

[Parameters]

dir (Required parameter, object type: String)

Specifies the page mode print direction. Constants are shown in FIG. 68A.

The return values are shown in FIG. 68B, exceptions in FIG. 68C.

addPagePosition method

Adds the print position setting area in the page mode to the command buffer. Specifies the print start position (coordinates) in the area specified by the addPageArea method. This API is used between the above addPageBegin method and the PageEnd method.

[Syntax]

addPagePosition (x, y);

[Parameters]

x: (Required parameter, object type: Number)

Specifies the print position on the horizontal axis (in dots). Specify an integer from 0 to 65535.

y: (Required parameter, object type: Number)

Specifies the print position on the vertical axis (in dots). Specify an integer from 0 to 65535.

The print start position (coordinates) is set according to the content to be printed. Refer to the following.

To print a character string:

Specify the left end of the baseline for the first character. This can be omitted for left-aligned printing of standard-sized characters. To print double-sized height characters, specify a value equal to or greater than 42 for y.

To print a barcode:

Specify the bottom left of the symbol. Set y to the barcode height.

To print a graphic/logo:

Specify the bottom left of the graphic data. Set y to the height of the graphic data.

To print a two-dimensional symbol:

Specify the top left of the symbol. This can be omitted when printing from the top left.

The return values are shown in FIG. 69A, exceptions in FIG. 69B.

addPageLine method

Adds line drawing in page mode to the command buffer. Draws a line in page mode. Diagonal lines cannot be drawn. This API is used between the above addPageBegin method and the PageEnd method.

[Syntax]

addPageLine (x1, y1, x2, y2, style);

[Parameters]

x1 (Required parameter, object type: Number)

Specifies the start position on the horizontal axis (in dots). Specify an integer from 0 to 65535.

y1 (Required parameter, object type: Number) Specify an integer from 0 to 65535.

x2 (Required parameter, object type: Number)

Specifies the end position on the horizontal axis (in dots). Specify an integer from 0 to 65535.

y2 (Required parameter, object type: Number)

Specifies the end position on the vertical axis (in dots). Specify an integer from 0 to 65535.

style (Optional parameter, object type: String)

Specifies the line type. Constants are shown in FIG. 70A.

The return values are shown in FIG. 70B, exceptions in FIG. 70C.

addPageRectangle method

Adds drawing a rectangle in the page mode. Draws a rectangle in the page mode. This API is used between the above addPageBegin method and the PageEnd method.

[Syntax]

addPageRectangle (x1, y1, x2, y2, style);

[Parameters]

x1 (Required parameter, object type: Number)

Specifies the start position on the horizontal axis (in dots). Specify an integer from 0 to 65535.

y1 (Required parameter, object type: Number)

Specifies the start position on the vertical axis (in dots). Specify an integer from 0 to 65535.

x2 (Required parameter, object type: Number)

Specifies the end position on the horizontal axis (in dots). Specify an integer from 0 to 65535.

y2 (Required parameter, object type: Number)

Specifies the end position on the vertical axis (in dots). Specify an integer from 0 to 65535.

style (Optional parameter, object type: String)

Specifies the line type. Constants are shown in FIG. 71A.

The return values are shown in FIG. 71B, exceptions in FIG. 71C.

addCut method

Adds a paper cut to the command buffer. Sets the paper cut. Cannot be used in page mode.

[Syntax]

addCut (type);

[Parameters]

type (Optional parameter, object type: String)

Specifies the paper cutting method. Settings are shown in FIG. 72A.

The return values are shown in FIG. 72B, exceptions in FIG. 72C.

addPulse method

Adds a drawer kick to the command buffer. Sets the drawer kick. Cannot be used in page mode. The drawer cannot be used with the buzzer.

[Syntax]

addPulse (drawer, time);

[Parameters]

drawer (Optional parameter, object type: String)

Specifies the drawer kick connector. Settings are shown in FIG. 73A.

time (Optional parameter, object type: String)

Specifies the ON time of the drawer kick signal. Settings are shown in FIG. 73B.

The return values are shown in FIG. 73C, exceptions in FIG. 73D.

addSound method

Adds sounding the buzzer to the command buffer. Sets the buzzer.

Cannot be used in page mode.

The buzzer function cannot be used with the drawer.

This API cannot be used if the printer does not have a buzzer.

[Syntax]

addSound (pattern, repeat);

[Parameters]

pattern: (Optional parameter, object type: String)

Specifies the buzzer pattern. Settings are shown in FIG. 74A.

repeat (Optional parameter, object type: String)

Specifies the number of times the buzzer sounds. Settings are shown in FIG. 74B.

To stop the buzzer after setting the repeat parameter to 0, execute this API again and set the pattern parameter to PATTERN_NONE.

The return values are shown in FIG. 74C, exceptions in FIG. 74D.

addCommand method

Adds commands to the command buffer. Sends ESC/POS commands.

When sending a command to the command buffer with the addCommand method, declare the command data strings using ¥x as a separator.

Example: ¥x1B¥x40

[Syntax]

addCommand (data);

[Parameters]

data (Optional parameter, object type: String)

Specifies an ESC/POS command as a character string.

The return values are shown in FIG. 75A, exceptions in FIG. 75B.

send method

Sends a command to the command buffer.

[Syntax]

send( );

print method

Prints an image rendered in HTML5 Canvas.

Converts the specified range in a RGBA full-color HTML5 Canvas image to raster image data according to the halftone property and brightness property settings. One image pixel equals one printer dot. When an image contains a transparent color, the background color of the image is assumed to be white.

HTML5 Canvas images containing images downloaded from a different domain cannot be printed. A security error is returned in accordance with JavaScript's same-origin policy.

[Syntax]

print (canvas, cut, mode);

[Parameters]

canvas (Required parameter, object type: canvas)

Specifies the HTML5 Canvas object to print.

cut (Optional parameter, object type: Boolean)

Specifies whether or not to cut the paper. Settings are shown in FIG. 76A.

mode (Optional parameter, object type: String)

Specifies the color mode. Settings are shown in FIG. 76B. Exceptions are shown in FIG. 76C.

startMonitor method

Enables a status event. Reports the printer status as an event. Updates the status at the interval specified in the interval property.

[Syntax]

startMonitor( );

stopMonitor method

Disables a status event.

[Syntax]

stopMonitor( );

halftone property

Specifies the halftone processing method to apply to monochrome (two tone) printing. The default is HALFTONE_DITHER.

object type: String

Settings are shown in FIG. 77.

brightness property

Specifies brightness correction as a gamma value in the range 0.1 to 10.0. The default is 1.0.

object type: Number timeout property

Specifies the timeout time (ms) of the message sent with the send method described above. The default value is 10,000.

object type: Number interval property

Specifies the interval for updating the status.

object type: Number

[Description]

Specifies the interval for updating the status in milliseconds.

Default value: 3000 (3 second)

Minimum value: 1000 (1 second or more)

If an invalid value is specified, 3000 is used.

onreceive event

Registers a callback function and gets a response message receipt event.

[Syntax]

Function (response)

[Parameters of the callback function]

Parameters: response (see the response object property described below)

Name: response message

Object type: object

[Response object properties]

See the list of properties in FIG. 78A.

[Success value]

See the list of success values in FIG. 78B.

[Code value]

See the list of code values in FIG. 78C.

[Status values]

See the list of status values in FIG. 78D.

onerror event

Registers a callback function and gets a communication error event.

[Syntax]

Function (error)

[Parameters of the callback function]

Parameters: error (see the error object properties described below)

Name: communication error data

Object type: object

[Error object properties]

See the list of error object properties in FIG. 79.

onstatuschange event

Registers a callback function and gets a status change event.

[Syntax]

Function (status)

[Parameters of the callback function]

Parameter: status

Name: status

Object type: Number ononline event

Registers a callback function and gets an online event.

object type: Function( )

onoffline event

Registers a callback function and gets an offline event.

object type: Function( )

onpoweroff event

Registers a callback function and gets a no-response event.

object type: Function( )

oncoverok event

Registers a callback function and gets a cover-closed event.

object type: Function( )

oncoveropen event

Figure 81:
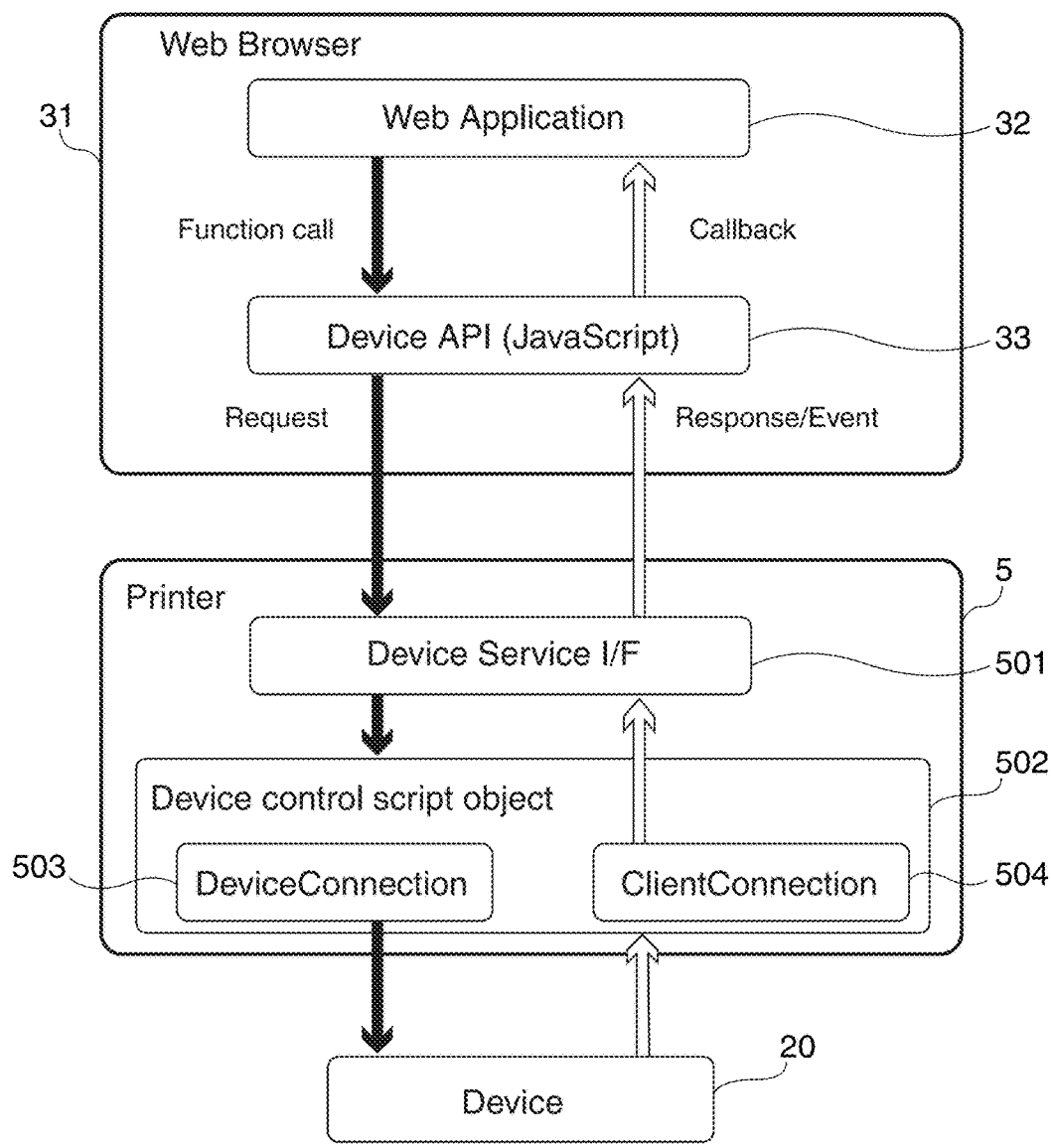
FIG. 81 describes using a device control script.

Registers a callback function and gets a cover-open event.
object type: Function( )
onpaperok event
Registers a callback function and gets a paper-remaining event.
object type: Function( )
onpapernearend event
Registers a callback function and gets a paper near-end event.
object type: Function( )
onpaperend event
Registers a callback function and gets a paper end event.
object type: Function( )
ondrawerclosed event
Registers a callback function and gets a drawer-closed event.
object type: Function( )
ondraweropen event
Registers a callback function and gets a drawer-open event.
object type: Function( )
The Scanner object is described next.
ondata event
Receives a barcode information scanning event.
[Syntax]
Function (data);
[Parameters of the callback function]
data
Object type: (Object)
Receives the property shown in FIG. 80.
The iSimpleSerial object is described next.
The specifications of this API can be customized by creating a device control script.
sendCommand
Sends a desired command.
[Syntax]
sendCommand (data);
[Parameters]
data
Object type: (String)
Specifies the command with a hexadecimal string.
Declare command strings using Ix as a separator.
<Example>
To send 0x020x1F0x03, declare the string ¥x02¥x1F¥x03.
oncommandreply event
Receives a response event from the device.
[Syntax]
Function (data);
[Parameters of the callback function]
data
Object type: (String)
Receives a hexadecimal string of response data.
The received hexadecimal string is separated with Ix.
Example: ¥x1B¥x40
The device control script 502 is described next.
Programming is described first.
FIG. 81 describes using a device control script.
By using a device control script 502 provided by the device control function of the invention, data processing by a device can be customized and new devices can be used from a web application. As shown in FIG. 81, a device control script 502 has a DeviceConnection object 503 and a ClientConnection object 504. In FIG. 81, devices of the printer 5 are collectively referred to as device 20.
When the createDevice method of the Device object described above is executed, an object is instantiated so that the device service interface 501 of the printer 5 can use the device control script corresponding to the requested device. The device can then be controlled through the instantiated object.

The objects shown in FIG. 82 are then passed to the device control script 502 from the device service interface 501. By using the DeviceConnection object 503 and ClientConnection object 504, the device control script 502 can communicate with the web application 32 and device 20 as shown in FIG. 81. The DeviceConnection object 503 is an object that sends/receives data with the device 20. The ClientConnection object 504 is an object that sends data to a device object on the web browser 31 side, and accesses the device service interface 501.

Functions using objects of the device control script are described next.

The following functions can be used using device control script APIs.

Desired events of browser-side device objects can be called.

Data can be sent to a device.

Generated data can be received from the device.

The configuration of a device control script is described next.

A device control script is coded to meet the following conditions.

The code required for device control must be contained in a single file.

(Only one file can be registered when configuring a device using the TMNetWebConfig utility.)

The part of the file name up to the first dot "." must be the same as the constructor name.

(Example) file name: Keyboard_Generic.ver1.0.js→constructor name: Keyboard_ Generic Declare exports to externally reference a constructor.

(Example) exports. Keyboard_Generic=Keyboard_Generic;

The device control script must have the properties shown in FIG. 83 and FIG. 84. Set an appropriate name with constructor.

DEVICE_TYPE property (object type: String)

A list of settings is shown in FIG. 83.

DEVICE GROUP property (object type: String

A list of settings is shown in FIG. 84.

Create an "onDeviceData" method to receive data generated by the device. For details, see the device control script Name object described below.

Create a method corresponding to the device object method that runs on the browser. For details, refer to the Any event described below.

The configuration of a sample device control script 502 is shown in FIG. 85.

The device control script API is described next.

The following objects are provided in the device control script API.

Client connection (ClientConnection) object (The API is shown in FIG. 86.)

Device connection (DeviceConnection) object (The API is shown in FIG. 87.)

Device control script Name object (The API is shown in FIG. 88.)

The ClientConnection object is described next.

This object is passed to the first parameter of the constructor of the device control script 502.

The API "send" command sends data to a device object that runs on a browser.

[Syntax]
send (event, data);
[Parameters]
event: object type: (String)
Sets the event name of the device object.
data: object type: (Object)
Specifies the data passed to the device object event.

An example is shown in FIG. 89. In this example, the onkeypress event of the device object is called, and 49 is received from data.keycode and 1 is received from data.ascii using the data parameter of the onkeypress event.

The DeviceConnection object is described next.

This object is passed to the second parameter of the constructor of the device control script 502.

The API "send" command sends data to a serial communication device.

Note that data is not sent to an input device that can be controlled by an HID driver.

[Syntax]
send (data);
[Parameters]
data: object type: (Buffer)
Specifies the data to send to the device.

The device control script Name object is described next.

onDeviceData event (input device that can operate with an HID driver)

This event receives data detected from a key input device.

Events are described in this format in a device control script 502 for a key input device.

[Syntax]
onDeviceData (event, keycode, ascii);
[Parameters]
event: object type: (Number)
Receives the direction of key operation. For a list of values, see FIG. 90.
keycode: object type: (Number)
Receives the key code. For a list of key codes, see FIG. 9.
ascii: object type: (String)
Receives the character corresponding to the operated key. If no character corresponds to the key code (such as with the F1 key), undefined is returned.

onDeviceData event "(serial communication device)

This event receives data detected from a serial communication device.

Events are described in this format in a device control script 502 for serial communication.

[Syntax]
onDeviceData (data);
[Parameters]
data: object type: (Buffer)
Receives data received from a serial communication device.

Any event
This event is used to receive the results of API execution by a device object that runs on a browser.

[Syntax]
Name specified by callEvent (data);
[Parameters]
data: object type: (Object)
Receives the object specified by the callEvent parameter of the device object.

A sample program is described next.

The sample program described below enables use as a POS system. Sample code for a device API 33 can be created for each device.

Figure 91:
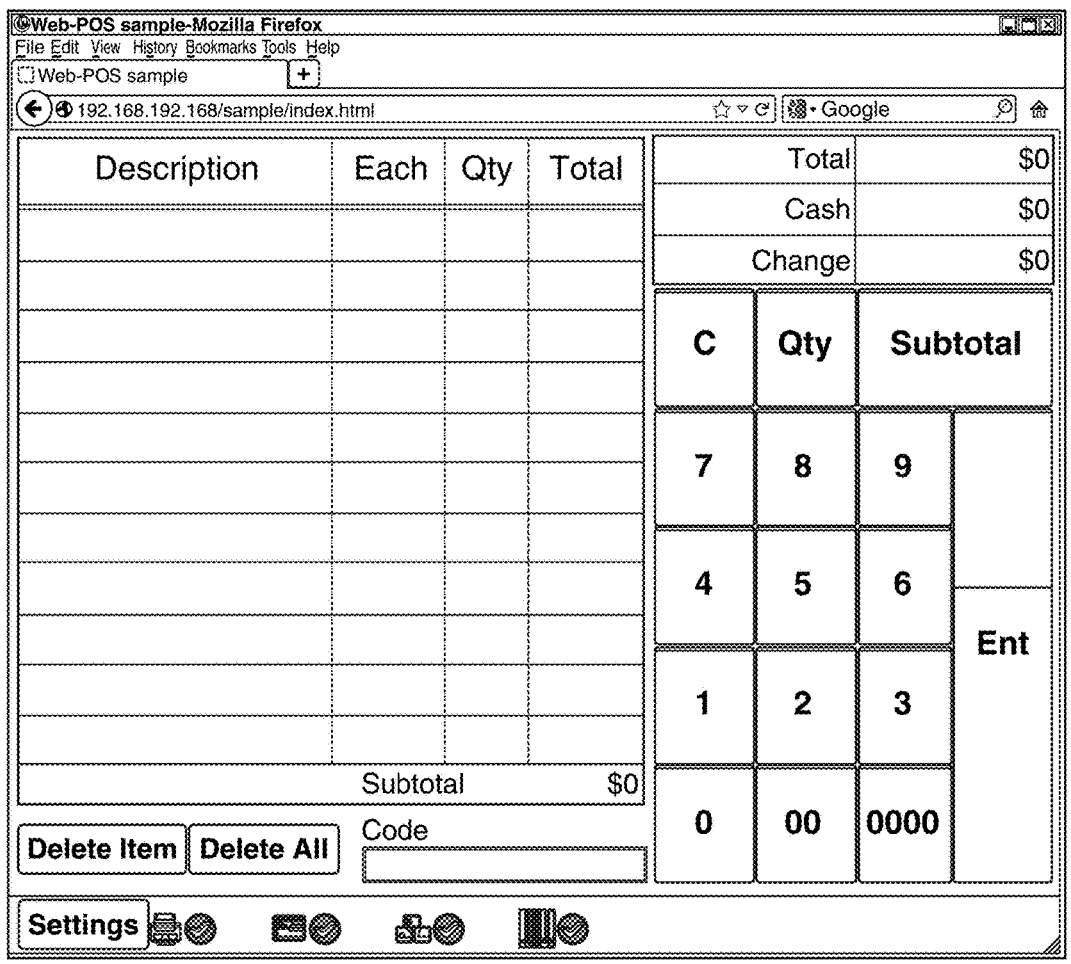
FIG. 91 shows an example of a POS terminal.
Figure 92:
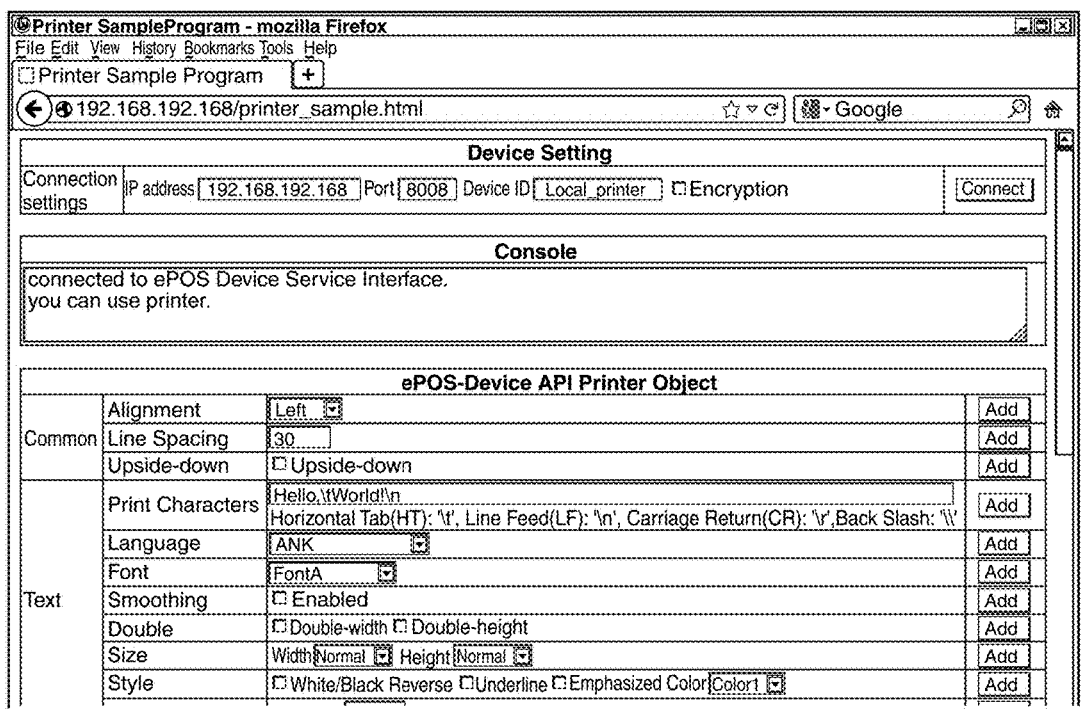
FIG. 92 shows a sample program for a printer.

FIG. 91 shows an example of a POS terminal. FIG. 92 shows a sample program for a printer.

The environment required to run the sample program is described below.

Figure 93:
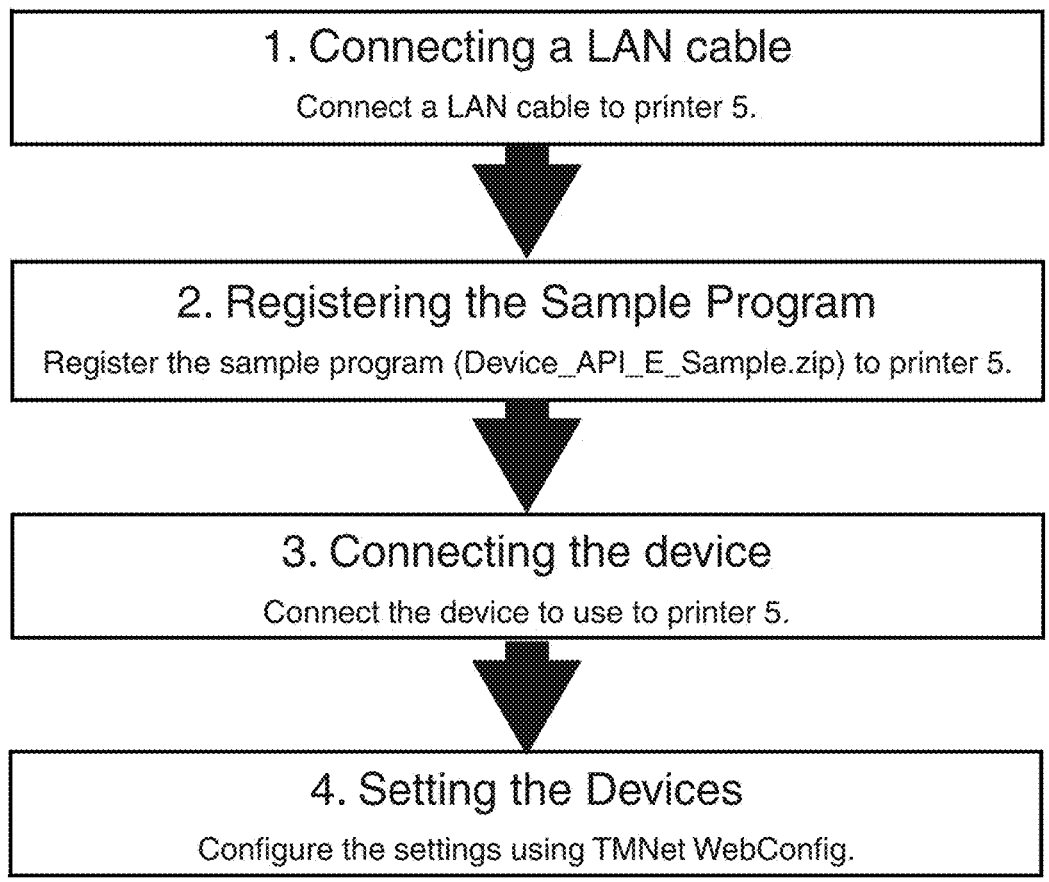
FIG. 93 shows the flow of setting the sample program environment.

(1) Required devices (The sample program can be used without having all of the devices.)
☐ Printer 5
Customer display 8
POS keyboard
Barcode scanner
(2) ☐ Required to operate the printer 5
Display
Keyboard
Mouse
(3) Other
LAN cable
Sample program The work flow for configuring the sample program environment is shown in FIG. 93.

If the Windows Security screen appears while using the TMNet TMNetWebConfig utility, enter your username and password.

1. Connect LAN cable
Connect LAN cable to☐ printer 5.
2. Register sample program
Register the sample program (device_API_J_Sample.zip) in the☐ printer 5.
3. Connect devices
Connect the devices to be used to the printer 5.
4. Configure devices
Configure the devices using the TMNet TMNetWebConfig utility.

Registering the sample program is described next.

Figure 94:
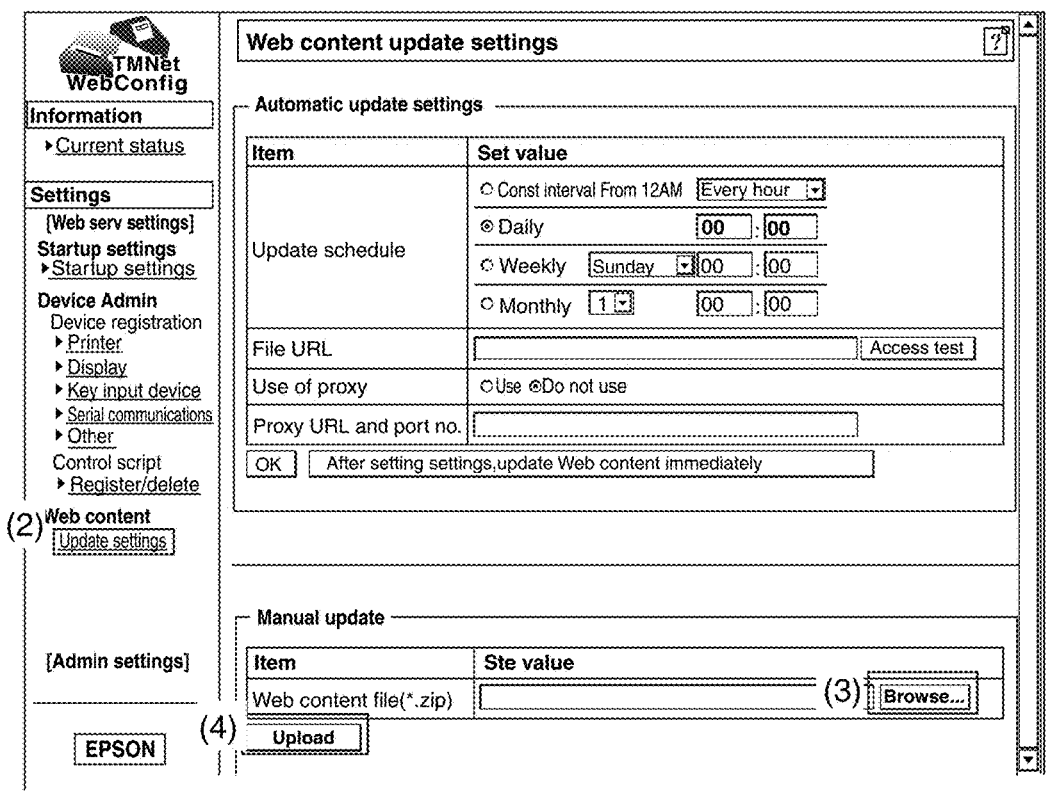
FIG. 94 shows an example of a screen for registering the sample program.

FIG. 94 shows a screen for registering the sample program. Register the sample program (device_API_UM_J_Sample.zip) in the printer 5 using the TMNet TMNetWebConfig utility.

Register the program using the following procedure.
1. Turn the printer 5 on.
2. Start the TMNet TMNetWebConfig using the shortcut on the desktop.
Select [Web service settings], [Web content], and then [Update settings] indicated by [2] in FIG. 94.
3. The "Web content update settings" screen is displayed as shown in the frame on the right side of FIG. 94. Click on [Browse] indicated by [3] in FIG. 94, and select the sample program.
4. Next, click the [Upload] button indicated by [4] in FIG. 94 to register the sample program in the printer 5.

Configuring devices is described next.

Devices are configured using the TMNet TMNetWebConfig utility in this example.
Customer display
POS keyboard
Barcode scanner
Configuring the customer display is described next.

Figure 95:
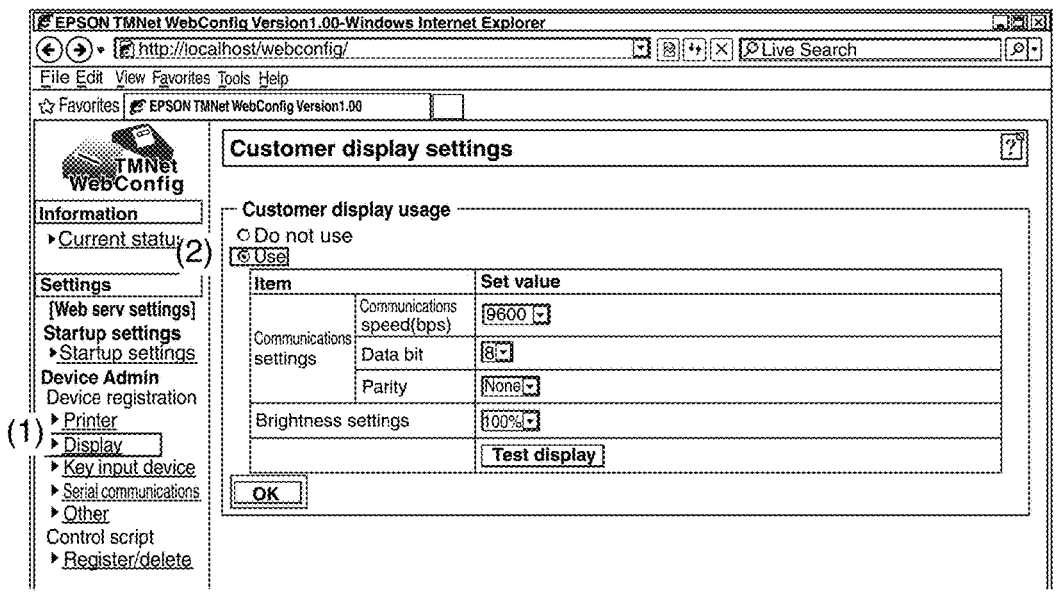
FIG. 95 shows a window for setting the customer display.

FIG. 95 shows a customer display configuration screen.
Register the display using the following procedure.
1. Start the TMNet TMNetWebConfig using the shortcut on the desktop.
Select [Web service settings], [Device Admin], and then [Display] as indicated by [1] in FIG. 95.
2. The customer display settings screen shown in FIG. 95 is displayed. Select [Use] indicated by [2] in FIG. 95 and click the [Apply] button. There is no need to change the settings in this example.

Configuring a POS keyboard/barcode scanner is described next.

Figure 96:
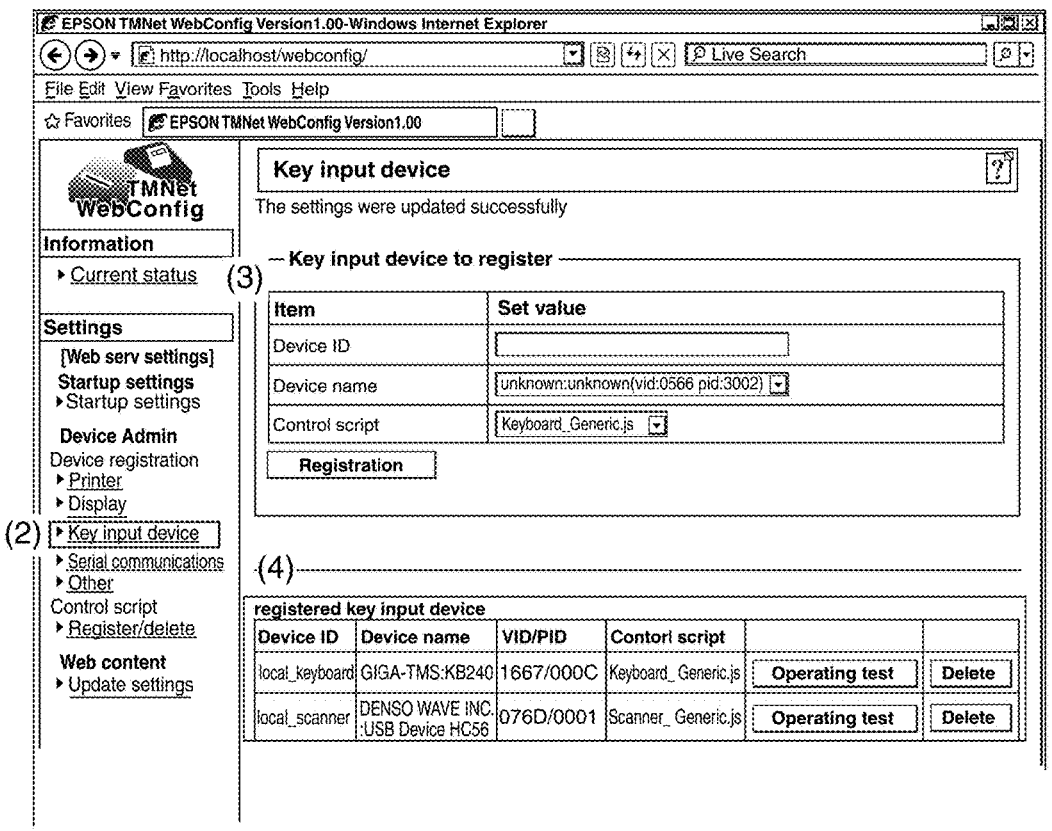
FIG. 96 shows a window for setting the POS keyboard/barcode scanner.

FIG. 96 shows a POS keyboard/barcode scanner configuration screen.

Register the devices using the following procedure.

1. Check that a POS keyboard/MSR/barcode scanner is connected to the printer 5.

2. Start the TMNet TMNetWebConfig using the shortcut on the desktop.

Select [Web service settings], [Device Admin], and then [Key input device] as indicated by [2] in FIG. 96.

3. The Key Input device screen shown in FIG. 96 is displayed. Set the Device ID, Device name, and Control script for each device in the appropriate places indicated by [3] in FIG. 96, and click the [Registration] button. Sample settings are shown in FIG. 97. Register one device at a time.

4. The registered device will be displayed in the [Registered key input device] field at [4] in FIG. 96.

Starting the sample program is described next.

Start the sample program (device_API_UM_J_Sample.zip) as follows.

1. Start the web browser, and enter the IP address of the printer 5 to the address bar. The default IP address of the printer 5 is "192.168.192.168".

Figure 98:
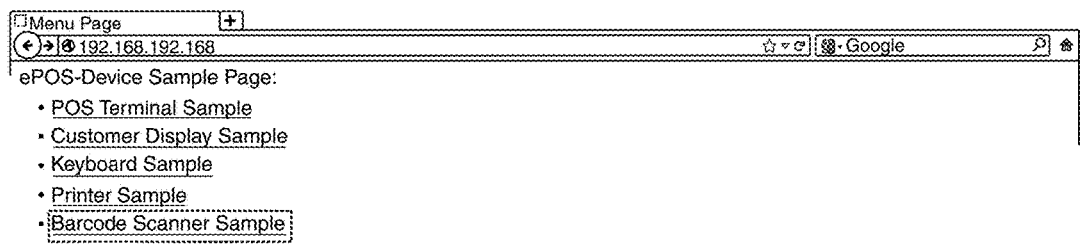
FIG. 98 shows a display sample of the sample program.

2. The sample program is displayed. An example of the display is shown in FIG. 98. If the sample program is not displayed, check if the LAN cable is connected.

Using the Sample Program

The sample program includes the following items. Selecting an item goes to the corresponding screen. Details of each sample are described below.

POS Terminal Sample
Customer Display Sample
Keyboard Sample
Printer Sample
Barcode Scanner Sample The Customer Display Sample is described in detail next.

This sample program enables operating the customer display and generating sample code for the customer display.

This sample is used as follows.

1. Start the sample program. Select [Customer Display Sample] in FIG. 98.

2. The Customer Display Sample screen shown in FIG. 99A is displayed. Click the [Connect] button in this screen. If connection is successful, the following message will be displayed in the Console frame. The display on the customer display will also change.

There is no need to change the settings in the Device Setting frame. However, if the IP address, for example, has changed, change the setting in the Device Setting frame accordingly.

3. Select the function to use in the screen shown in FIG. 99B, and click the [Add] button.

4. The source code of the function added in step 3 is displayed in the [Display Object Sample Code] frame in FIG. 99C. This code can be copied and reused.

5. When the [Send] button in the screen in FIG. 99C is clicked, the screen display will change according to the function added in step 3.

The Keyboard Sample is described in detail next.

This sample program enables acquiring input from a POS keyboard.

This sample is used as follows.

1. Start the sample program. Select [Keyboard Sample] in FIG. 98.

2. The Keyboard Sample screen shown in FIG. 100A is displayed. Click the [Connect] button. If connection is successful, the following message will be displayed in the Console frame.

There is no need to change the settings in the Device Setting frame. However, if the IP address, for example, has changed, change the setting in the Device Setting frame accordingly.

3. Select the key used to determine the beginning of a string, and click the [Set] button.

This setting must first be made on the POS keyboard side.

Example: F1+specified string+Enter

4. When there is input from the POS keyboard, the input result is displayed in the ePOS Device API Keyboard Object shown in FIG. 100C. An example of input and the result is shown in FIG. 100E.

The Printer Sample is described in detail next.

This sample program enables operating the printer and generating sample code for the printer.

The Printer Sample is used as follows.

1. Start the sample program. Select [Printer Sample] in FIG. 98.

Figure 101A:
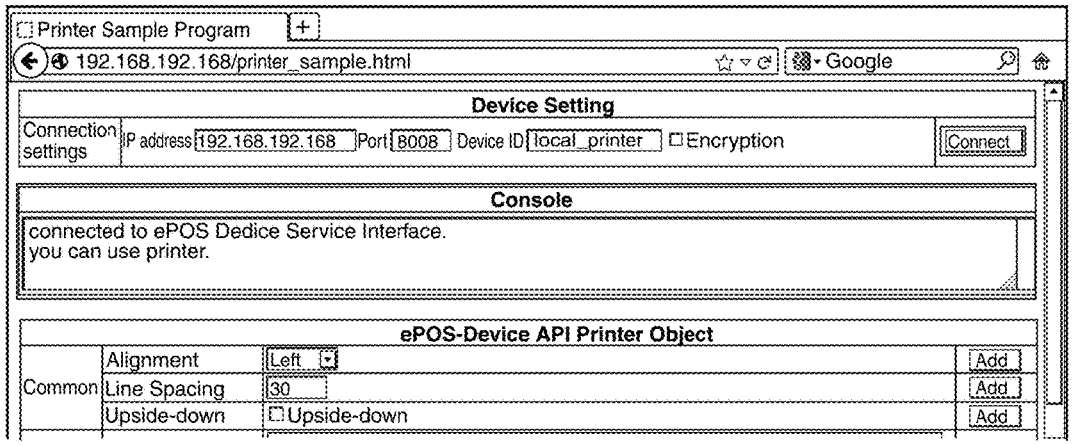
FIG. 101A shows an example of a Printer Sample screen.

2. The Printer Sample screen in FIG. 101A is displayed. Click the [Connect] button. If connection is successful, the following message will be displayed in the Console frame.

There is no need to change the settings in the Device Setting frame. However, if the IP address, for example, has changed, change the setting in the Device Setting frame accordingly.

Figure 101B:
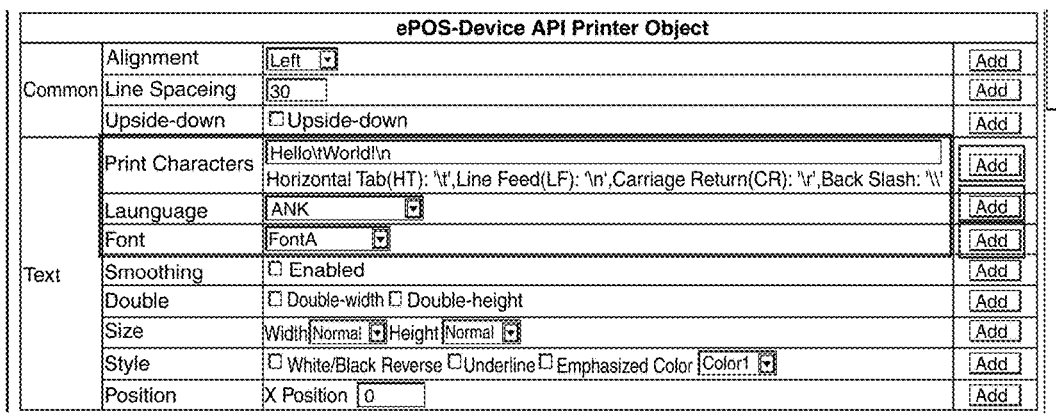
FIG. 101B shows an example of a Printer Sample screen.

3. Select the function to use in the screen shown in FIG. 101B, and click the [Add] button.

Figure 101C:
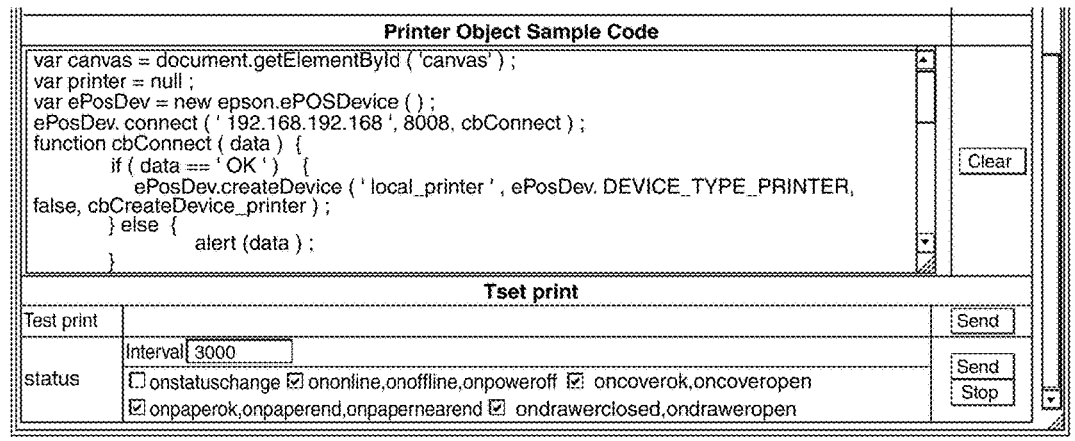
FIG. 101C shows an example of a Printer Sample screen.

4. The source code of the function added in step 3 is displayed in the [printer-Print API Sample Code] frame in FIG. 101C. This code can be copied and reused.

5. When the [Send] button in the screen is clicked, a test print will be printed according to the function added in step 3.

The Barcode Scanner Sample is described in detail next.

This sample program enables acquiring input from a barcode scanner.

The Barcode Scanner Sample is used as follows.

1. Start the sample program. Select [Barcode Scanner Sample] in FIG. 98.

Figures 102A, 102B:
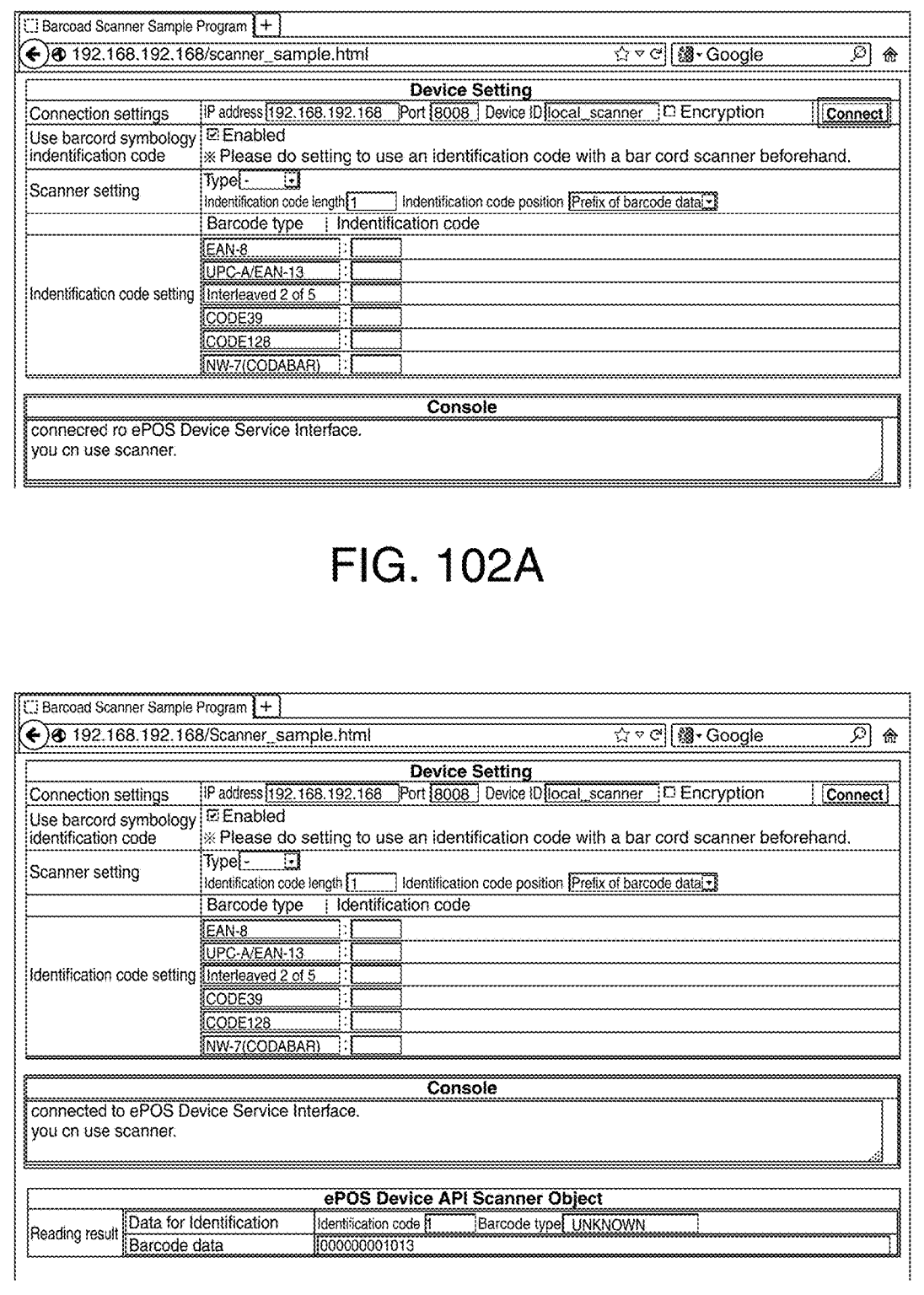

2. The Barcode Scanner Sample screen in FIG. 102A is displayed. Click the [Connect] button. If connection is successful, the following message will be displayed in the Console frame.

There is no need to change the settings in the Device Setting frame. However, if the IP address, for example, has changed, change the setting in the Device Setting frame accordingly.

3. When there is input from the barcode scanner, the read information is displayed in the ePOS Device API Scanner Object shown in FIG. 102B.

The POS Terminal Sample is described in detail next.

This sample program enables operating like a POS system.

The POS Terminal Sample is used as follows.

Preparation is required first. In this preparation, start the sample program and configure each device.

1. Start the sample program. Select [POS Terminal Sample] in FIG. 98.

Figure 103A:
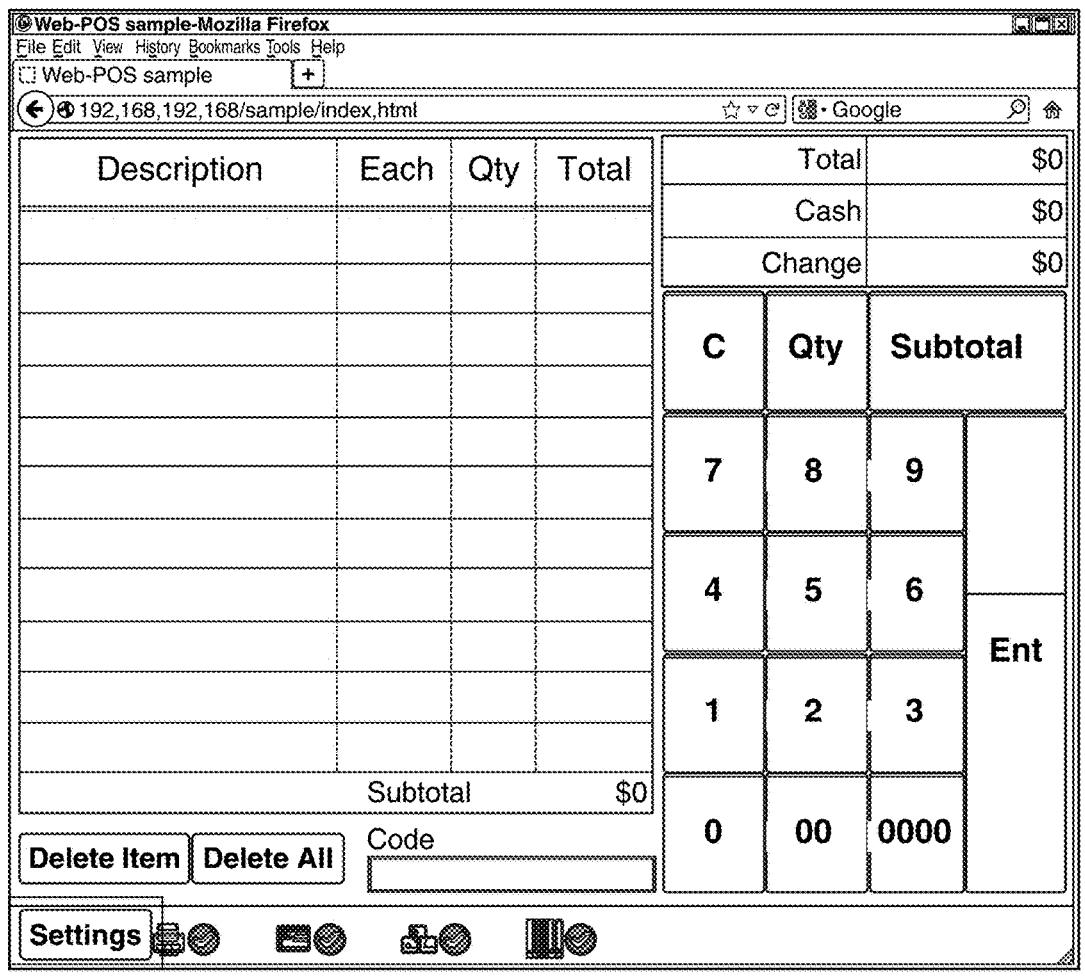
FIG. 103A shows an example of a POS Terminal Sample screen.

2. The POS Terminal Sample screen in FIG. 103A is displayed. Click the [Settings] button.

Figure 103B:
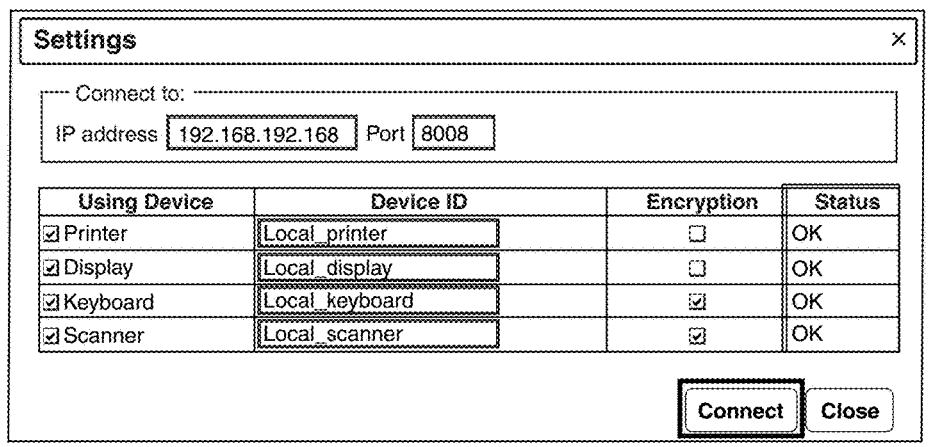
FIG. 103B shows an example of a Settings screen.

3. The Settings screen in FIG. 103B is displayed. The IP address, port, and device ID can be set in this screen. If a setting is changed, click the [Connect] button and confirm that the status is OK. After confirmation, close the window. Note that there is usually no need to change a setting.

Operation is described next.

The procedure from reading a product to issuing a receipt is described below.

1. Input a product from the barcode scanner or POS keyboard.

After inputting the products, click the [Subtotal] button in the screen shown in FIG. 104A.

If the [Delete Item] button is clicked, the selected item will be deleted. Clicking the [Delete All] button deletes all items.

To change a quantity, click the [Qty] button after inputting the product, and input the number. Click the [Ent] button to confirm the quantity.

2. Enter the amount received in the screen shown in FIG. 104B. Click the [Ent] button after entering the amount.

3. The amount of change due is displayed as shown in FIG. 104C, and a receipt is printed from the printer.

As described above, a device control system 100 according to this embodiment of the invention has an application server 2 that serves a web application 32; a terminal 3 that is connected to the application server 2 through a network and has a web browser 31 that displays the web application 32; and a printer 5 that has a connection panel 60 to which a device connects, and controls the device connected to the connection panel 60. By means of the web application 32, the terminal 3 calls an object that controls a device and is instantiated by the device API 33 to support the device, and sends a request to the printer 5 by the web application 32; and the printer 5 executes a device control script 502 that controls the device, receives requests sent through the device API 33, and controls the device connected to the connection panel 60.

The invention is not limited to device control system 100, and device control systems 200, 300 can be similarly configured. In device control system 300, the printer 5 has the functions of the application server 2 (FIG. 1).

In device control system 100, the device control script 502 has a DeviceConnection object that sends/receives data with a device, and a ClientConnection object that sends data to the device control API.

In device control system 100, the terminal 3 specifies a device connected to the printer 5 and sends a request to start control of the device to the printer 5, and the printer 5 sends a command by the device control script 502 to the device specified by the request and enables controlling the device.

When the device control system 100 has a first terminal 3 and a second terminal 3, the first terminal 3 specifies a device connected to the printer 5, sends a request to start control of the device to the printer 5, and the printer 5 enables controlling the device specified in the request, the device is exclusively locked and cannot be controlled by a request sent by the second terminal 3.

In this configuration, the printer 5 reports to the second terminal 3 that the device is busy when the second terminal 3 calls an object corresponding to the device of the device API 33.

In the device control system 100, the device connected to the printer 5 is a local printer or a network printer 7, and when the printer 5 enables control of the device specified by the request, the local printer or the network printer 7 can be controlled by the device control script 502 according to the request sent by the second terminal 3.

In the device control system 100, the terminal 3 specifies a device connected to the printer 5 and sends a request instructing ending device control to the printer 5, and the printer 5 sends a command by the device control script 502 to the device specified by the request and terminates the state enabling control of the device.

In the device control system 100, the terminal 3 specifies a device connected to the printer 5 and sends a request instructing ending device control to the printer 5; the printer 5 sends a command by the device control script 502 to the device specified by the request and terminates the state enabling control of the device; and the device can be controlled by the printer 5 in response to a request sent by the second terminal 3.

In the device control system 100, the terminal 3 detects the connection status of an object instantiated by the device API 33 and the device control script 502 of the printer 5 by means of the device API 33.

In the device control system 100, the terminal 3 controls an object of the device API 33 by the web application 32, and calls an event of the device control script 502.

In the device control system 100, a customer display is connected to the printer 5 as a device, the terminal 3 sends a request to display on the customer display, and the printer 5 controls displaying on the customer display by the device control script 502 in response to the request.

In the device control system 100, a customer display is connected to the printer 5 as a device, the terminal 3 sends a request to display on the customer display, and the printer 5 displays the time on the customer display by the device control script 502 in response to the request, and stops displaying the time when a second request is sent while the time is displayed.

In the device control system 100, a printer is connected to printer 5 as a device, the terminal 3 sends a request to register image data in the printer by an object of the device control API, the printer 5 registers the image data in the printer specified by the request, and the printer prints the registered image data.

In the device control system 100, color image data rendered by HTML5 Canvas is converted to raster image data and registered in the printer according to a request sent by the terminal 3.

In the device control system 100, the terminal 3 specifies a device and sends a request instructing whether or not to encrypt data sent and received between the device and the terminal 3 by an object of the device control API.

The terminal 3 has an application server 2 that serves a web application 32, and a connection panel 60 to which devices connect, is connected through a network to a printer 5 that controls a device connected to the connection panel 60, has a web browser 31 that displays a web application 32, and through the web application 32 calls an object that controls a device and is instantiated by the device API 33 to support the device, sends a request to the printer 5, and causes the printer 5 to execute a device control script 502 that controls the device.

The foregoing embodiment obviously describes one example of the invention, and can be modified and adapted as desired within the scope of the accompanying claims.

The invention claimed is:

1. A printer comprising:
   a communication interface configured to communicate with a first computing device that has access to a target-device script that, when executed, initiates a control object configured to control a target device;
   one or more connection ports configured to connect to the target device; and a controller configured as a command interface between the first computing device and the target device connected to the one or more connection ports;

wherein:

the printer is further configured to receive instruction requests from the first computing device, the instruction requests being generated by the control object by use of the script for controlling the target device;

the controller is configured to apply commands via the one or more connection ports to the target device for executing the received instruction requests and send back to the first computing device any data responses received from the target device;

the target device is selected from among a plurality of periphery devices;

the one or more connection ports are configured to connect to each of the plurality of periphery devices;

the controller is configured to execute a device control script that controls the target device;

the device control script, when executed by the controller, causes the controller to connect to the control object, receive the instruction requests sent by the first computing device, and issue commands that control the target device connected to the one or more connection ports in accordance with the received instruction requests;

one of the instruction requests is a start-control request specifying the target device connected to the one or more connection ports and instructing starting control of the target device;

the command sent in accordance with the start-control request is a start-control command instructing starting control of the target device;

the controller is configured such that, when the controller receives the start-control request from the first computing device, the controller sends the start-control command to the target device specified by the start-control request, and enables control of the target device by the first computing device;

the controller is configured to communicate with a second computing device that has access to a second target-device script that, when executed, instantiates a second control object configured to control the target device, and the controller is configured to optionally function as a command interface between the second computing device and the target device connected to the one or more connection ports;

the second computing device is configured to optionally control the target device by using the second target-device script to cause the second control object to send second instruction requests to the controller, the controller applying the received second instruction requests to the target device and sending back to the second computing device any data responses received from the target device; and the controller is configured such that, if the target device is currently being controlled by the first computing device and the controller receives a second instruction request from the second control object requesting control of the target device, the controller does not allow control of the target device by the second computing device.

2. A printer comprising:

a communication interface configured to communicate with a first computing device that has access to a script that, when executed, initiates a control object configured to control a target device of a plurality of devices connectable to the printer;

one or more connection ports configured to connect to the target device; and a controller configured as a command interface between the first computing device and the target device connected to the one or more connection ports, wherein the controller is configured to receive a first communication from the first computing device in a first format incompatible with the target device, and generate, based on the first communication from the first computing device, a second communication in a second format compatible with the target device for controlling how the target device operates, the printer is further configured to receive instruction requests from the first computing device, the instruction requests being generated by the control object by use of the script for controlling the target device, the controller is configured to apply commands via the one or more connection ports to the target device for executing the received instruction requests and to send back to the first computing device any data responses received from the target device, the target device is selected from among the plurality of devices, the one or more connection ports are respectively configured to connect to the plurality of devices, the controller is configured to execute a device control script that controls the target device, the device control script, when executed by the controller, causes the controller to connect to the control object, receive the instruction requests sent by the first computing device, and issue commands that control the target device connected to the one or more connection ports in accordance with the received instruction requests, one of the instruction requests is a start-control request specifying the target device connected to the one or more connection ports and instructing starting control of the target device, the command sent in accordance with the start-control request is a start-control command instructing starting control of the target device, the controller is configured such that, when the controller receives the start-control request from the first computing device, the controller sends the start-control command to the target device specified by the start-control request, and enables control of the target device by the first computing device, the controller is configured to communicate with a second computing device that has access to a second target-device script that, when executed, instantiates a second control object configured to control the target device, and the controller is configured to optionally function as a command interface between the second computing device and the target device connected to the one or more connection ports, the second computing device is configured to optionally control the target device by using the second target-device script to cause the second control object to send second instruction requests to the controller, the controller applying the received second instruction requests to the target device and sending back to the second computing device any data responses received from the target device, and the controller is configured such that, if the controller receives a second instruction request for controlling the target device from the second computing device when the target device is being controlled by the first computing device, the controller sends to the second computing device a report indicating that the target device is busy.

3. A first printer comprising:

a communication interface configured to communicate with a first computing device that has access to a target-device script that, when executed, initiates a control object configured to control a target device;

one or more connection ports configured to connect to the target device; and a controller configured as a command interface between the first computing device and the target device connected to the one or more connection ports;

wherein:

the first printer is further configured to receive instruction requests from the first computing device, the instruction requests being generated by the control object by use of the script for controlling the target device;

the controller is configured to apply commands via the one or more connection ports to the target device for executing the received instruction requests and to send back to the first computing device any data responses received from the target device;

the target device is selected from among a plurality of periphery devices;

the one or more connection ports are respectively configured to connect to the plurality of periphery devices;

the controller is configured to execute a device control script that controls the target device;

the device control script, when executed by the controller, causes the controller to connect to the control object, receive the instruction requests sent by the first computing device, and issue commands that control the target device connected to the one or more connection ports in accordance with the received instruction requests;

one of the instruction requests is a start-control request specifying the target device connected to the one or more connection ports and instructing starting control of the target device;

the command sent in accordance with the start-control request is a start control command instructing starting control of the target device;

the controller is configured such that, when the controller receives the start-control request from the first computing, the controller sends the start-control command to the target device specified by the start-control request, and enables control of the target device by the first computing device;

the controller is configured to communicate with a second computing device that has access to a second target-device script that, when executed, instantiates a second control object configured to control the target device, and the controller is configured to optionally function as a command interface between the second computing device and the target device connected to the one or more connection ports;

the second computing device is configured to optionally control the target device by using the second target-device script to cause the second control object to send second instruction requests to the controller, the controller applying the received second instruction requests to the target device and sending back to the second computing device any data responses received from the target device;

the target device is a second printer configured to print; and the controller is configured such that, if the controller receives a second instruction request for controlling the second printer from the second computing device when the first printer is being controlled by the first computing device, the controller enables the second computing device to control the second printer by the device control script based on the second instruction request.

* * * * *